(12) United States Patent
Oliphant et al.

(10) Patent No.: US 10,547,631 B1
(45) Date of Patent: *Jan. 28, 2020

(54) REAL-TIME VULNERABILITY MONITORING

(71) Applicant: SecurityProfiling, LLC, Woodville, TX (US)

(72) Inventors: Brett M. Oliphant, Plano, TX (US); John P. Blignaut, West Lafayette, IN (US)

(73) Assignee: SecurityProfiling, LLC, Garland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/608,983

(22) Filed: May 30, 2017

Related U.S. Application Data

(63) Continuation of application No. 14/834,102, filed on Aug. 24, 2015, which is a continuation of application
(Continued)

(51) Int. Cl.
*H04L 29/06* (2006.01)
*G06F 21/50* (2013.01)

(52) U.S. Cl.
CPC .......... *H04L 63/1433* (2013.01); *G06F 21/50* (2013.01); *H04L 63/1416* (2013.01); *H04L 63/20* (2013.01); *H04L 63/0263* (2013.01)

(58) Field of Classification Search
CPC . H04L 63/1433; H04L 63/1416; H04L 63/20; H04L 63/0263; G06F 21/50
(Continued)

(56) References Cited

U.S. PATENT DOCUMENTS 5,796,942 A    8/1998  Esbensen
5,819,255 A   10/1998  Celis et al.
(Continued)

FOREIGN PATENT DOCUMENTS

FR        2819322 A1    7/2002
WO   1999056196 A1   11/1999
(Continued)

OTHER PUBLICATIONS

National Institute of Standards and Technology, "Mell, Peter, et al., NIST Special Publication 800-40," Aug. 2002.
(Continued)

*Primary Examiner* — Dant B Shaifer Harriman
(74) *Attorney, Agent, or Firm* — Patrick E. Caldwell, Esq.; The Caldwell Firm, LLC

(57) ABSTRACT

An apparatus is provided including at least one platform; an intrusion prevention system configured to communicative couple with the at least one platform; a firewall configured to communicative couple with the at least one platform; at least one first data storage configured to communicative couple with the at least one platform; and at least one second data storage configured to communicative couple with the at least one platform. The at least one platform is configured to perform a plurality of operations that collective protect one or more networked devices, by causing a reporting of at least a first occurrence based on a determination that the first occurrence includes at least one first occurrence packet that is capable of taking advantage of at least one of the actual vulnerability to which the at least one networked device is actually vulnerable.

13 Claims, 12 Drawing Sheets

Related U.S. Application Data

No. 14/138,014, filed on Dec. 21, 2013, now Pat. No. 9,117,069, which is a continuation of application No. 10/882,852, filed on Jul. 1, 2004, now abandoned.

(60) Provisional application No. 60/484,085, filed on Jul. 1, 2003.

(58) Field of Classification Search
USPC .......................................................... 726/23
See application file for complete search history.

(56) References Cited

U.S. PATENT DOCUMENTS

| | | |
|---|---|---|
| 5,822,750 A | 10/1998 | Jou et al. |
| 5,872,931 A | 2/1999 | Chivaluri |
| 5,951,698 A | 9/1999 | Chen et al. |
| 5,960,170 A | 9/1999 | Chen et al. |
| 6,088,804 A | 7/2000 | Hill et al. |
| 6,119,165 A | 9/2000 | Li et al. |
| 6,119,236 A | 9/2000 | Shipley |
| 6,185,689 B1 | 2/2001 | Todd et al. |
| 6,275,942 B1 | 8/2001 | Bernhard et al. |
| 6,279,113 B1 | 8/2001 | Vaidya |
| 6,298,445 B1 | 10/2001 | Shostack et al. |
| 6,301,668 B1 | 10/2001 | Gleichauf et al. |
| 6,405,318 B1 | 6/2002 | Rowland |
| 6,408,391 B1 | 6/2002 | Huff et al. |
| 6,513,122 B1 | 1/2003 | Magdych et al. |
| 6,530,024 B1 | 3/2003 | Proctor |
| 6,550,012 B1 | 4/2003 | Villa et al. |
| 6,574,639 B2 | 6/2003 | Carey et al. |
| 6,636,845 B2 | 10/2003 | Chau et al. |
| 6,775,675 B1 | 8/2004 | Nwabueze et al. |
| 6,789,202 B1 | 9/2004 | Ko et al. |
| 6,789,215 B1 | 9/2004 | Rupp et al. |
| 6,898,632 B2 | 5/2005 | Gordy et al. |
| 6,952,779 B1 | 10/2005 | Cohen et al. |
| 7,000,247 B2 | 2/2006 | Banzhof |
| 7,007,299 B2 | 2/2006 | Ioele et al. |
| 7,085,934 B1 | 8/2006 | Edwards |
| 7,096,503 B1 | 8/2006 | Magdych et al. |
| 7,124,438 B2 | 10/2006 | Judge et al. |
| 7,152,105 B2 | 12/2006 | McClure et al. |
| 7,159,237 B2 | 1/2007 | Schneier et al. |
| 7,178,166 B1 | 2/2007 | Taylor et al. |
| 7,181,769 B1 | 2/2007 | Keanini et al. |
| 7,222,366 B2 | 5/2007 | Bruton et al. |
| 7,234,168 B2 | 6/2007 | Gupta et al. |
| 7,278,161 B2 | 10/2007 | Lingafelt et al. |
| 7,308,493 B2 | 12/2007 | Liang |
| 7,308,715 B2 | 12/2007 | Gupta et al. |
| 7,331,061 B1 | 2/2008 | Ramsey et al. |
| 7,359,626 B2 | 4/2008 | McMurdie et al. |
| 7,359,962 B2 | 4/2008 | Willebeek-LeMair et al. |
| 7,398,272 B2 | 7/2008 | Hindawi et al. |
| 7,409,714 B2 | 8/2008 | Gupta et al. |
| 7,412,721 B2 | 8/2008 | Torii et al. |
| 7,418,730 B2 | 8/2008 | Chu et al. |
| 7,424,746 B1 | 9/2008 | Magdych et al. |
| 7,516,490 B2 | 4/2009 | Riordan et al. |
| 7,574,740 B1 | 8/2009 | Kennis |
| 7,610,610 B2 | 10/2009 | Haeffele et al. |
| 7,624,444 B2 | 11/2009 | Gupta et al. |
| 7,650,638 B1 | 1/2010 | Njemanze et al. |
| 7,694,128 B2 | 4/2010 | Judge et al. |
| 7,739,722 B2 | 6/2010 | Okajo et al. |
| 7,823,204 B2 | 10/2010 | Gupta et al. |
| 7,941,854 B2 | 5/2011 | Baffes et al. |
| 8,176,553 B1 | 5/2012 | Magdych et al. |
| 8,201,257 B1 | 6/2012 | Andres et al. |
| 8,225,407 B1 | 7/2012 | Thrower et al. |
| 8,266,703 B1 | 9/2012 | Magdych et al. |
| 8,766,553 B2 | 7/2014 | Lin et al. |
| 8,984,644 B2 | 3/2015 | Oliphant et al. |
| 9,100,431 B2 | 8/2015 | Oliphant et al. |
| 9,117,069 B2 | 8/2015 | Oliphant et al. |
| 9,118,708 B2 | 8/2015 | Oliphant et al. |
| 9,225,686 B2 | 12/2015 | Oliphant et al. |
| 10,075,466 B1 | 9/2018 | Oliphant |
| 2002/0087882 A1 | 7/2002 | Schneier et al. |
| 2002/0100036 A1 | 7/2002 | Moshir et al. |
| 2003/0051026 A1 | 3/2003 | Carter et al. |
| 2003/0056116 A1 | 3/2003 | Bunker et al. |
| 2003/0126472 A1 | 7/2003 | Banzhof |
| 2003/0196123 A1 | 10/2003 | Rowland et al. |
| 2004/0006704 A1 | 1/2004 | Dahlstrom et al. |
| 2004/0064726 A1 | 4/2004 | Girouard |
| 2004/0064731 A1 | 4/2004 | Nguyen et al. |
| 2004/0073800 A1 | 4/2004 | Shah et al. |
| 2004/0111637 A1 | 6/2004 | Baffes et al. |
| 2004/0117640 A1 | 6/2004 | Chu et al. |
| 2004/0167806 A1 | 8/2004 | Eichhorn et al. |
| 2004/0250107 A1 | 12/2004 | Guo |
| 2005/0005152 A1 | 1/2005 | Singh et al. |
| 2005/0022021 A1 | 1/2005 | Bardsley et al. |
| 2005/0216957 A1 | 9/2005 | Banzhof et al. |
| 2008/0060073 A1 | 3/2008 | Haeffele et al. |
| 2012/0210434 A1 | 8/2012 | Curtis et al. |

FOREIGN PATENT DOCUMENTS

| | | |
|---|---|---|
| WO | 2001091350 A3 | 1/2003 |
| WO | 2003060717 A1 | 7/2003 |

OTHER PUBLICATIONS

National Institute of Standards and Technology, "NIST ITL Bulletin ("NIST Bulletin")," Jul. 2000.
Nessus, "'Features' ("Nessus Features")," Apr. 11, 2003.
Nessus, "'Nessus F.A.Q.' ("Nessus FAQ")," Apr. 2, 2003.
Nessus, "'Nessus Machine report 10.163.156" ("Nessus Machine Report")," Apr. 15, 2003.
Nessus, "Download the Stable Version of the Nessus Security Scanner for Unix-compatible Systems ("Nessus Unix Download")," Jun. 3, 2003.
Nessus, "Last Step: The Report Interpretation ("Nessus Demonstration—Last Step")," Apr. 1, 2003.
Nessus, "Second Step: The Client Configuration ("Nessus Demonstration—Second Step")," Feb. 1, 2003.
NetIQ Corporation, "Comprehensive Security Analysis Report, http://www.netiq.com/products/sa/reports/full/full_01_b.HTM," Apr. 16, 2003.
NetIQ Corporation, "http://netiq.com/products/sm/default.asp," Jun. 7, 2002.
NetIQ Corporation, "http://www.netiq.com/products/sa/default.asp?men u=solutions_security_vulnerability_c_menu.xml," Jun. 25, 2003.
NetIQ Corporation, "http://www.netiq.com/products/sm/firewall.asp," Feb. 9, 2002.
NetIQ Corporation, "NetIQ Corporation, Security Manager White Paper ("SMWP")," 2002.
NetIQ Corporation, "NetIQ Security Manager ("NSM")," 2004.
NetIQ Corporation, "NetIQ, Enterprise Security: Moving from Chaos to Control with Integrated Security Management from NetIQ ("ES")," 2002.
NetIQ Corporation, "NetIQ, Reporting and Incident Management for Firewalls ("Firewalls")," 2001.
NetIQ Corporation, "NetIQ, User Guide Vulnerability Manager ("UGVM")," 2004.
NetIQ Corporation, "NetIQ, User Guide, VigilEnt Security Manager ("UGVSM")," 2003.
NetScreen Technologies, Inc., ""About Firewall Rulebases,"," Dec. 9, 2004.
NetScreen Technologies, Inc., ""About Rulebases,"," Dec. 9, 2004.
NetScreen Technologies, Inc., ""About the Report Manager,"," Dec. 9, 2004.
NetScreen Technologies, Inc.,""Adding DI Profiles,"," Dec. 9, 2004.
NetScreen Technologies, Inc.,""Adding Rules to a Firewall Rulebase,"," Dec. 9, 2004.

(56) References Cited

OTHER PUBLICATIONS

NetScreen Technologies, Inc., ""Application Note: Hardening Netscreen Firewalls," Team CYMRU," Jul. 18, 2002.
NetScreen Technologies, Inc., ""Configuring Antivirus Scanner Settings,"," Dec. 9, 2004.
NetScreen Technologies, Inc., ""Configuring Events Reporting,"," Dec. 9, 2004.
NetScreen Technologies, Inc., ""Configuring Signature Attack Objects,"," Dec. 9, 2004.
NetScreen Technologies, Inc., ""Configuring SNMP Reporting,"," Dec. 9, 2004.
NetScreen Technologies, Inc., ""Editing Rules to a Firewall Rulebase,"," Dec. 9, 2004.
NetScreen Technologies, Inc., "Concepts & Example Guide—NetScreen—IDP Fundamentals Version 2.1," 2003.
NetScreen Technologies, Inc., "IDP Concepts Guide, Version 2.0," 2002.
NetScreen Technologies, Inc., "Implementation Guide, Version 2.0," 2002.
NetScreen Technologies, Inc., "Juniper Networks "Juniper SPG Platforms BBL"," Aug. 10, 2004.
NetScreen Technologies, Inc., "Juniper Networks NetScreen ScreenOS Migration Guide," 2004.
NetScreen Technologies, Inc., "NetScreen "Antivirus Performance in NetScreen—5GT/GateLock 5000"," Mar. 2004.
NetScreen Technologies, Inc., "NetScreen "Configuring IDP for Standalone High Availability"," Dec. 16, 2002.
NetScreen Technologies, Inc., "NetScreen "Creating Custom Attack Objects—Juniper Networks NetScreen—IDP"," 2004.
NetScreen Technologies, Inc., "NetScreen "General Understanding of the 'Debug Flow Basic' Command in Screen OS 5.0"," Sep. 29, 2003.
NetScreen Technologies, Inc., "NetScreen "Performance of the Deep Inspection Firewall"," Nov. 2003.
NetScreen Technologies, Inc., "NetScreen "Test Cases for [IDP Sensor Routing]"," Jul. 1, 2003.
NetScreen Technologies, Inc., "NetScreen "Test Cases for IDP 3.0—Log Investigator Test"," Aug. 6, 2003.
NetScreen Technologies, Inc., "NetScreen "Test Cases for IDP 3.0—Log Viewer"," Aug. 6, 2003.
NetScreen Technologies, Inc., "NetScreen "Test Cases for IDP 3.0—Reports"," Apr. 11, 2003.
NetScreen Technologies, Inc., "NetScreen Concepts & Examples—ScreenOS Reference Guide," 2004.
NetScreen Technologies, Inc., "NetScreen High Availability QuickStart Guide IDP 100," 2002.
NetScreen Technologies, Inc., "NetScreen Product Description Document "Project Coconut: Phase II Antivirus Requirements for EDISON"," Jan. 19, 2004.
NetScreen Technologies, Inc., "NetScreen QuickStart Guide IDP 10, 100, 500 & Bypass Unit," 2003.
NetScreen Technologies, Inc., "NetScreen-500 Installer's Guide," 2001.
NetScreen Technologies, Inc., "NetScreen-5000 Installer's Guide," 2002.
NetScreen Technologies, Inc., "NetScreen—IDP 500 V3.0 Technical Evaluation," Mar. 2004.
NetScreen Technologies, Inc. / Juniper Networks, Inc., "Concepts & Example Guide—NetScreen—IDP Fundamentals Version 3.0," 2004.
NetScreen Technologies, Inc. / Juniper Networks, Inc., "Juniper Networks NetScreen CLI Reference Guide (2004)," 2004.
NetScreen Technologies, Inc. / Juniper Networks, Inc., "Juniper Networks® "Integration of: Firewall, Virtual Private Networking, Intrusion Detection & Prevention"," Jul. 7, 2004.
Network Associates Technology, Inc., "About McAfee Active Virus Defense—Press Room ("McAfee Press Room")," Oct. 26, 2000.
Network Associates Technology, Inc., "McAfee Desktop Firewall Version 8.0 Installation Guide Revision 1.0 ("Desktop Firewall Installation Guide")," Jun. 2003.
Network Associates Technology, Inc., "McAfee Desktop Firewall Version 8.0 Product Guide Revision 1.0 ("Desktop Firewall Product Guide")," Apr. 2003.
Network Associates Technology, Inc., "McAfee ePolicy Orchestrator 3.0 Centralized Control and Visibility of Malicious Code Protection ("ePO 3.0 Data Sheet")," 2003.
Network Associates Technology, Inc., "McAfee ThreatScan Version 2.5 Product Guide," version 1.0 ("Product Guide Version 2.5)," 2003.
Network Associates Technology, Inc., "The Enterprise Strikes Back: Defending Against Blended Threats—Proactive Strategies to Protect Networks from Today's Most Virulent Security Threat ("Defending Against Blended Threats")," Nov. 2002.
Network Associates Technology, Inc., "ThreatScan Product Release—Engine Version 2.0 ("ThreatScan Release Note")," Mar. 28, 2002.
Network Associates Technology, Inc., "ThreatScan Version 2.0 Installation Guide ("Installation Guide Version 2.0")," 2002.
Network Associates Technology, Inc., "ThreatScan Version 2.0 Product Guide ("Product Guide Version 2.0");," 2002.
Network Associates Technology, Inc., "ThreatScan Viral Vulnerability Assessment ("Viral Vulnerability Assessment")," Jun. 1, 2002.
Network Associates, "CyberCop Event Orchestrator Getting Started Guide, Version 1.02 ("CCEOGSG")," Jan. 1999.
Network Associates, "CyberCop Monitor Getting Started Guide, Version 2.0 for Windows NT 4.0 ("CCMGSG")," 1999.
Network Associates, "CyberCop Scanner Getting Started Guide, Version 5.5 ("CCSGSG")," 2000.
Network Associates, "Vulnerability Guide for CyberCop Scanner Version 2.5 for Windows NT 4.0 ("CCVG")," 1999.
Network Associates, Inc., ""VirusScan Enterprise Edition: The World's #1 Virus Security Program," http://web.archive.org/web/19990429062544/http://www.nai.com/products/antivirus/virusscan/default. asp," 1999.
Network Associates, Inc., "Gauntlet Administrator's Guide version 5.5," 1999.
Network Computing, "Dragon Claws its Way to the Top, Network Computing," Aug. 20, 2001.
Network Computing, "Michael J. DeMaria, A Rookie's Guide to Defensive Blocks, Network Computing (2002) ("DeMaria")," 2002.
Network World, "Scanning for Weak Links in Server Security," Aug. 30, 1999.
Networks Associates Technology, Inc., "ePolicy Orchestrator Administrator's Guide version 1.0 ("ePO 1.0 Guide")," Mar. 2000.
Networks Associates Technology, Inc., "ePolicy Orchestrator version 3.0 Product Guide, Revision 1.0 ("ePO 3.0 Guide")," Apr. 2003.
Newman, Robert, "Enterprise Security," 2002, Prentice Hall.
NFR Security, Inc., ""NFR BackOfficer Friendly," https://web.archive.org/web/20020611083143/http://www.nfr.com/products/bof/index.html," Jun. 11, 2002
NFR Security, Inc., ""NFR Features and Benefits," https://web.archive.org/web/20021206001404/http:/www.nfr.com/popups/nidfeatures. html," Dec. 6, 2002.
NFR Security, Inc., ""NFR Host Intrusion Detection," https://web.archive.org/web/20020602230641/http://www.nfr.com/products/HID/index.html," Jun. 2, 2002.
NFR Security, Inc, ""NFR Intrusion Management System," https://web.archive.org/web/20020602144053/http://www.nfr.com/products/," Jun. 2, 2002.
NFR Security, Inc., ""NFR Network Intrusion Detection," https://web.archive.org/web/20021204192703/http://www.nfr.com/products/NID/," Dec. 4, 2002.
NFR Security, Inc., ""NFR Rapid Response Team," https://web.archive.org/web/20020202174656/http://www.nfr.com/rrt/," Feb. 2, 2002.
NFR Security, Inc., "Network Intrusion Detection v3 (NID) Data Sheet," 2003.
NFR Security, Inc., "Network Intrusion Detection v3 (NID) Product Overview," 2003.
NFR Security, Inc., "NFR Network Intrusion Detection Data Sheet," Dec. 2002.

(56) References Cited

OTHER PUBLICATIONS

NFR Security, Inc., "NFR Network Intrusion Detection Product Overview," Dec. 2002.
Nicastro et al., "Curing the Patch Management Headache," 2005, Auerbach Publications.
Nicolett, M. and Colville, R., Robust Patch Management Requires Specific Capabilities, Gartner (2003).
Nicolett, M., Vendors in the Gartner IT Security Management Magic Quadrant for 1H03 are Driven by the Need for Real-Time Security Data Analysis and Faster Reactions to Security Incidents, Gartner (2003).
NIST Special Publication 800-40 (2002).
Novak, Kevin, "VA Scanners, Pinpoint Your Weak Spots," Jun. 26, 2003, Network Computing.
OneSecure / NetScreen Technologies, Inc., "OneSecure Product Webpages," 2002.
PC Magazine, ""PC Retina Security Scanner" ("PC Magazine")," Dec. 30, 2003.
PC Magazine, "Finding and Fixing Network Vulnerabilities Review & Rating," ("PC Mag"), Jun. 30, 2002.
Peltier et al., "Managing a Network Vulnerability Assessment," 2003, Auerbach Publications.
Pescatore, J., Easley, M. and Stiennon, R., Network Security Platforms Will Transform Security Markets, Gartner (2002).
PR Newswire, "Internet Security Systems Ships RealSecure for Windows 2000," Jan. 16, 2001.
PR Newswire, "IntruVert Networks Introduces IntruShield (TM)—Next-Generation Intrusion Detection and Prevention System," May 6, 2002.
Fortinet, Inc., "Content Protection Guide Version 2.50," Jun. 23, 2003.
Fortinet, Inc., "FIPS 140-2 Security Policy—FortiGate-3000/3600", Jul. 14, 2004.
Fortinet, Inc., "FortiGate 2000 Datasheet," 2002.
Fortinet, Inc., "FortiGate 300 Datasheet," 2002.
Fortinet, Inc., "FortiGate 3600 Datasheet," 2003.
Fortinet, Inc., "FortiGate 50A Installation and Configuration Guide Version 2.50," Feb. 29, 2004.
Fortinet, Inc., "FortiGate Antivirus Firewall IPS User Guide Version 3," Apr. 11, 2005.
Fortinet, Inc., "FortiGate CLI Reference Guide Version 2.80 MR10," Jun. 17, 2005.
Fortinet, Inc., "FortiGate NIDS Guide Version 2.50 MR2," Aug. 8, 2003.
Fortinet, Inc., "FortiGate SNMP Technical Bulletin," Nov. 21, 2003.
Fortinet, Inc., "FortiGate V2.27 CLI Reference Guide," Jul. 25, 2002.
Fortinet, Inc., "FortiGate-100 Datasheet," Mar. 11, 2002.
Fortinet, Inc., "FortiGate-100 V2.16 User Manual," Feb. 15, 2002.
Fortinet, Inc., "FortiGate-100 V2.2 User Manual," Apr. 18, 2002.
Fortinet, Inc., "FortiGate-100 V2.27 User Manual," Jul. 31, 2002.
Fortinet, Inc., "FortiGate-100 V2.30 User Manual," Oct. 27, 2002.
Fortinet, Inc., "FortiGate-1000A Administration Guide Version 2.80 MR11," Nov. 15, 2005.
Fortinet, Inc., "FortiGate-1000A/FA2 Administration Guide Version 2.80 MR11," Nov. 15, 2005.
Fortinet, Inc., "FortiGate-200 Datasheet," Mar. 11, 2002.
Fortinet, Inc., "FortiGate-200 V2.2 User Manual," Apr. 19, 2002.
Fortinet, Inc., "FortiGate-200 V2.27 User Manual," Jul. 31, 2002.
Fortinet, Inc., "FortiGate-200 V2.30 User Manual," Oct. 27, 2002.
Fortinet, Inc., "FortiGate-2000—for Telco and Service Providers Datasheet," Mar. 11, 2002.
Fortinet, Inc., "FortiGate-2000 V2.2 User Manual," Apr. 24, 2002.
Fortinet, Inc., "FortiGate-2000 V2.27 User Manual," Jul. 31, 2002.
Fortinet, Inc., "FortiGate-2000 V2.30 User Manual," Oct. 30, 2002.
Fortinet, Inc., "FortiGate-2000C V2.30 User Manual," Oct. 30, 2002.
Fortinet, Inc., "FortiGate-300 Datasheet," Mar. 11, 2002.
Fortinet, Inc., "FortiGate-300 V2.16 User Manual," Feb. 11, 2002.
Fortinet, Inc., "FortiGate-300 V2.2 User Manual," Apr. 12, 2002.
Fortinet, Inc., "FortiGate-300 V2.27 User Manual," Jul. 31, 2002.
Fortinet, Inc., "FortiGate-300 V2.30 User Manual," Oct. 27, 2002.
Fortinet, Inc., "FortiGate-400 Datasheet," Mar. 11, 2002.
Fortinet, Inc., "FortiGate-400 V2.27 User Manual," Jul. 31, 2002.
Fortinet, Inc., "FortiGate-400 V2.30 User Manual," Oct. 27, 2002.
Fortinet, Inc., "FortiGate-50 Datasheet," Mar. 11, 2002.
Fortinet, Inc., "FortiGate-50 V2.2 User Manual," Apr. 22, 2002.
Fortinet, Inc., "FortiGate-50 V2.27 User Manual," Jul. 31, 2002.
Fortinet, Inc., "FortiGate-50 V2.30 User Manual," Oct. 27, 2002.
Fortinet, Inc., "FortiGate-500 Datasheet," Mar. 11, 2002.
Fortinet, Inc., "FortiGate-500 V2.27 User Manual," Jul. 31, 2002.
Fortinet, Inc., "FortiGate-500 V2.30 User Manual," Oct. 27, 2002.
Fortinet, Inc., "FortiGate-5000 Series Administration Guide Version 2.80 MR11," Oct. 26, 2005.
Fortinet, Inc., "FortiGate™ Antivirus Firewall Administration Guide Version 3.0," Jul. 11, 2005.
Fortinet, Inc., "Fortine Real Time Network Protection Brochure," 2003.
Fortinet, Inc., "Fortinet FortiCenter Functional Specifications Version 1.0," Jul. 2002.
Fortinet, Inc., "FortiResponse™ Update Infrastructure Technical Note," Dec. 2002.
Fortinet, Inc., "Life of a Packet, White Paper," Oct. 9, 2003.
FR2819322 (Sadirac, 2012).
Pub. No. 800-51, Use of the Common Vulnerabilities and Exposures (CVE) Vulnerability Naming Scheme, NIST (2002).
Pub. No. 800-30, Risk Management Guide for Information Technology Systems, NIST (2002).
Pub. No. 800-31, Intrusion Detection Systems, NIST (2001).
Pub. No. 800-41, Guidelines on Firewalls and Firewall Policy, NIST (2002).
Pub. No. 800-42, Guideline on Network Security Testing, NIST (2003).
Pub. No. 800-61, Computer Security Incident Handling Guide, NIST (2004).
Pub. No. 800-64, Security Considerations in the Information System Development Life Cycle, NIST (2003).
RealSecure "Console User Guide," Version 11, 1999, 88 pages.
RealSecure, "User's Guide," Version 3.0, 1997, 188 pages.
Rehman, Rafeeq, "Intrusion Detection with SNORT : Advanced IDS Techniques Using SNORT, Apache, MySQL, PHP, and ACID ("IDS with Snort")," 2003, Prentice Hall PTR.
Robbins, R., Distributed Intrusion Detection Systems: An Introduction and Review, SANS (2002).
Rohse, M., Vulnerability Naming Schemes and Description Languages: CVE, Bugtraq, AVDL, and VulnXML, SANS (2003).
Russell, Ryan, "Hack Proofing Your Network Internet Tradecraft," 2000, Syngress Media.
SANS Institute, "SANS Institute, Global Information Assurance Certification Paper," 2002.
SC Media, "BindView Adds Patching to its Products," Jan. 6, 2004.
Schnackenberg, D., Djahandri, K., and Sterne, D., Infrastructure for Intrusion Detection and Response, IEEE (2000).
Schnackenberg, D., Holliday, H., Smith, R., Cooperative Intrusion Traceback and Response Architecture (CITRA), IEEE (2001).
Scott et al. , "Snort for Dummies," 2004, Wiley Publishing Inc.
SecurityFocus, "http://www.securityfocus.com/bid/3919/info ("bugtraq_3919_info")," Jan. 21, 2002.
Security Focus, "http://www.securityfocus.com/bid/3919/solution ("bugtraq_3919_solution")," Jan. 21, 2002.
Security Focus, "http://www.securityfocus.com/vdb/top.html?type=c ve, captured by Archive.org on Apr. 17, 2001, available at http://web.archive.org/web/20010417063351fw_/ht tp://www.securityfocus.com/vdb/top.html?type=cve ("cve query")," Apr. 17, 2001.
Security Focus, "http://www.securityfocus.com/vdb/top.html?type=i d, captured by Archive.org on Apr. 18, 2001, available at http://web.archive.org/web/20010418081800fw_/ht tp://www.securityfocus.com/vdb/top.html?type=id ("bugtraq query")," Apr. 18, 2001.
Security Focus, "Nessus, Part 3: Analysing Reports ("Nessus Analysing Report")," Feb. 3, 2004.
Security Focus, "Vulnerability Database Datasheet," 2001.

(56) References Cited

OTHER PUBLICATIONS

SecurityProfiling, Inc., "'New SecurityProfiling Anti-Vulnerability Technology Thwarts Hackers," Business Wire [SCP0069820-69821]," Apr. 3, 2002.
SecurityProfiling, Inc., "'Products," https://web.archive.org/web/20020608001441/http://www.securityprofiling.com/logboss.htm[10/18/201 6 5:38:35 PM]," Jun. 8, 2002.
SecurityProfiling, Inc., "'SecurityProfiling Introduces New Network Software," https://web.archive.org/web/20020608162907/http://www.securityprofiling.com/press2-28-02.htm[Oct. 19, 2016 3:40:24 AM]," Jun. 8, 2002.
SecurityProfiling, Inc., "'Services," https://web.archive.org/web/20020322000503/http://www.securityprofiling.com/services.htm[10/18/20 16 11:07:31 PM]," Mar. 22, 2002.
SecurityProfiling, Inc., "'Web Educational Piece—Anti-Vulnerability™ Technology" [SCP0069611-69613]," 2002.
SecurityProfiling, Inc., "'What is Anti-Vulnerability™ Technology?" [SCP0069689-69691]," 2002.
SecurityProfiling, Inc., "LogBoss Brochure [SCP0069880-69881]," 2002.
SecurityProfiling, Inc., "LogBoss White Paper, Version 1.2 [SCP0017841-17861]," 2002.
SecurityProfiling, Inc., "SecurityProfiling, Inc. SysUpdate Core Database Schema [SCP0052913-52915]," May 15, 2002.
SecurityProfiling, Inc., "SysUpdate Brochure [SCP0069878-69879]," 2002.
SecurityProfiling, Inc., "SysUpdate® Enterprise Edition White Paper, Version 2.5," 2002.
Sequeira, D., Intrusion Prevention Systems—Security's Silver Bullet?, SANS (2002).
Shim et al., "The International Handbook of Computer Security," 2000, Fitzroy Dearborn Publishers; Glenlake Publishing Company Ltd.
Shimonski et al., "Best Damn Firewall Book Period—Everything You Need to Know About Configuring Firewalls and Implementing State-of-the-Art Intrusion Detection Systems," 2003, Syngress Publishing Inc.
Simmonis et al., "Check Point NG, Next Generation Security Administration," 2002, Syngress Publishing Inc.
SonicWALL, Inc., "'Access Security: SonicWALL Internet Security Applications," https://webarchive.org/web/20020602120509/http:// www.sonicwall.com/products/access.asp," Jun. 2, 2002.
SonicWALL, Inc., "'Product Matrix," https://webarchive.org/web/20020606055856/www. sonicwall.com/products/FAQ/ new)faq_matrix.html," Jun. 6, 2002.
SonicWALL, Inc., "'SonicWALL GMS Standard Edition," https://web.archive.org/web/20021006074913/http://www.sonicwall.com/products/sgms/index.html," Oct. 6, 2002.
SonicWALL, Inc., "'SonicWALL Internet Security Solutions," https://webarchive.org/web/20020607184404/http://www.sonicwall.com/products/index.asp," Jun. 7, 2003.
SonicWALL, Inc., "'SonicWALL Security Applications," https://web.archive.org/web/20020607183609/http://www .sonicwall.com/products/securityApps.asp," Jun. 7, 2002.
SonicWALL, Inc., "SonicWALL Global Management System Configuration Guide, Entry Edition, Version 2.1," 2001.
SonicWALL, Inc., "SonicWALL Global Management System Installation Guide, Entry Edition, Version 2.1," 2001.
SonicWALL, Inc., "SonicWALL Global Management System Introduction Guide, Entry Edition, Version 2.1," 2001.
SonicWALL, Inc., "SonicWALL Global Management System ViewPoint Guide, Version 2.1," 2001.
SonicWALL, Inc., "SonicWALL ViewPoint User's Guide," 2001.
Sourcefire, Inc., "Snort User's Manual—Snort Release: 2.0.0 ("Snort Users Manual")," 2003.
Stauder, Tracy, "The Two Sides of the Web We Weave," Crosstalk, Apr. 2001.
Stiennon, R. and Easley, M., Intrusion Prevention Will Replace Intrusion Detection, Gartner (2002).
Stiennon, R., CIO Update: The Gartner Firewall Magic Quadrant for 2H02, Gartner (2002).
Sud et al. , "SECUR Exam Cram 2—Exam 642-501—The Smartest Way to Get Certified, Cisco Certified Security Professional," 2003, Que.
Swiler, L. & Phillips, C., A Graph-Based System for Network—Vulnerability Analysis, 1998 NSPW 9198 (1998).
Swiler, L. and Phillips, C., A Graph-Based System for Network-Vulnerability Analysis, 1998 NSPW Sep. 1998 (1998).
Symantec Corporation, "LiveUpdate Administrator's Guide," 2003.
Symantec Corporation, "LiveUpdate™ Administrator's Guide," 2002.
Symantec Corporation, "Modifications for Windows Security Center in Windows XP2," 2004.
Symantec Corporation, "Norton AntiVirus™ Corporate Edition Implementation Guide," 2001.
Symantec Corporation, "Norton AntiVirus™ Corporate Edition User's Guide," 2001.
Symantec Corporation, "Symantec AntiVirus™ Corporate Edition Administrator's Guide," 2002.
Symantec Corporation, "Symantec AntiVirus™ Corporate Edition Administrator's Guide," 2003.
Symantec Corporation, "Symantec AntiVirus™ Corporate Edition Client Guide," 2002.
Symantec Corporation, "Symantec AntiVirus™ Corporate Edition Installation Guide," 2002.
Symantec Corporation, "Symantec AntiVirus™ Corporate Edition Reference Guide," 2002.
Symantec Corporation, "Symantec AntiVirus™ Corporate Edition, Read this first," Jul. 2002.
Symantec Corporation, "Symantec AntiVirus™ Small Business Edition, Read this first," Jul. 2002.
Symantec Corporation, "Symantec Client Security Business Pack Administrator's Guide," 2004.
Symantec Corporation, "Symantec Client Security Business Pack Getting Started," 2004.
Symantec Corporation, "Symantec Client Security Business Packet Client Guide," 2004.
Symantec Corporation, "Symantec Client Security Getting Started," 2004.
Symantec Corporation, "Symantec Enterprise Firewall and Symantec Enterprise VPN Configuration Guide," 2001.
Symantec Corporation, "Symantec Enterprise Firewall, Symantec Enterprise VPN, and VelociRaptor Firewall Appliance Reference Guide," 2001.
Symantec Corporation, "Symantec Enterprise Product Catalog," 2003.
Symantec Corporation, "Symantec Gateway Security Appliance Installation and Configuration Guide," Feb. 19, 2002.
Symantec Corporation, "Symantec Security Appliances Matrix," Jan. 2004.
Symantec Corporation, "Symantec™ Advanced Manager and Symantec™ Event Manager for Security Gateways (Group 1) v2.0.1, Release notes," Oct. 12, 2005.
Symantec Corporation, "Symantec™ Advanced Manager for Security Gateways, Symantec™ Event Manager for Security Gateways Administrator's Guide, Supported version 2.0.1," Oct. 12, 2004.
Symantec Corporation, "Symantec™ Advanced Manager for Security Gateways, Symantec™ Event Manager for Security Gateways Integration Guide, Supported version 2.0.1," Jul. 16, 2004.
Symantec Corporation, "Symantec™ Central Quarantine Administrator's Guide," 2002.
Symantec Corporation, "Symantec™ Client Firewall Client Guide," 2002.
Symantec Corporation, "Symantec™ Client Firewall Client Guide," 2003.
Symantec Corporation, "Symantec™ Client Firewall Implementation Guide," 2002.
Symantec Corporation, "Symantec™ Client Firewall, Read this first," Jul. 2002.
Symantec Corporation, "Symantec™ Client Security Administrator's Guide," 2004.
Symantec Corporation, "Symantec™ Client Security Brochure," 2002.

(56) References Cited

OTHER PUBLICATIONS

Symantec Corporation, "Symantec™ Client Security Fact Sheet," 2003.
Symantec Corporation, "Symantec™ Gateway Security 5400 Series Administrator's Guide," Jul. 22, 2004.
Symantec Corporation, "Symantec™ Gateway Security 5400 Series Administrator's Guide," Aug. 27, 2003.
Symantec Corporation, "Symantec™ Gateway Security 5400 Series Fact Sheet," 2003.
Symantec Corporation, "Symantec™ Gateway Security 5400 Series Installation Guide," Jul. 23, 2004.
Symantec Corporation, "Symantec™ Gateway Security 5400 Series Installation Guide," Aug. 20, 2003.
"Attack Signatures Glossary," 1998.
"ITL Bulletin," US Department of Commerce, Technology Administration, National Institute of Standards and Technology, Nov. 1999.
"Network Sensor Service Release 1.1 Release Notes," Jan. 2001.
Acquiring and Deploying Intrusion Detection Systems, NIST (1999).
Albanese, Jason, "Network Security Illustrated," 2003, McGraw-Hill.
Alexander, Phillip, "bv-Control for Active Directory," 2001, BindView Development Corp.
Allan, A. Intrusion Detection Systems (IDSs): Perspective, Gartner (2002).
Allen, Julia, "The CERT Guide to System and Network Security Practices," 2001, Addison-Wesley.
Amir Emamjomeh, "GIAC Security Essentials Certification (GSEC) Version 1.4b Option2 Security Vulnerability Assessment Tools ("Two Security Assessment Tools")," Jun. 10, 2004.
Andress, Mandy, "Citadel focuses on vulnerability remediation ("Network World")," Nov. 8, 2004, Network World.
Ant Allan, "Internet Security Systems Enterprise Protection Platform Intrusion Detection System—Product Report ("Gartner Report")"., Aug. 27, 2003, Gartner, Inc.
Axent Technologies, Inc., "NetProwler 3.0 User Manual," 1999.
Baker et al., "Snort 2.1 Intrusion Detection, Second Edition, Jay Beale's Open Source Security Series," 2004, Syngress Publishing Inc.
Baudrion, M., Fighting System Intrusions: From Detection to Prevention, SANS (2002).
Beale et al., "Snort 2.0 Intrusion Detection," 2003, Syngress Publishing Inc.
Bigdoli, H., Handbook of Information Security, vol. 3 (2006).
BigFix, Inc., "Big Fix, Inc. Launches BigFix Enterprise Suite Proactive Technology That Eliminates Security Vulnerabilities Across the Enterprise Network," Feb. 11, 2002.
BigFix, Inc., "BigFix Client Compliance API version 1.4," Oct. 28, 2004.
BigFix, Inc., "BigFix Development Environment™ (BDE) A Guide to Creating Fixlet® Sites and Messages," Mar. 7, 2003.
BigFix, Inc., "BigFix Enterprise Suite (BES)™ Console Operator's Guide," Feb. 17, 2003.
BindView Development Corporation, "BindView Products: bv-Control, The Security Solution to Manage Within and Between Organizations," 2003.
BindView Development Corporation, "BindView RMS Web Console v 8.00 User Guide," Jul. 2004.
BindView Development Corporation, "HackerShield," 2000.
BindView Development Corporation, "Managing Group Policy Objects in Active Directory," 2000.
Blacksheepnetworks.com, "BindView EMS/NOSadmin for NetWare," 2002.
Blake et al., "Making Security Policies Effective," 2002, BindView Development Corp.
Bosworth et al., "Computer Security Handbook, 4th Ed.," 2002, John Wiley & Sons, Inc.
Brackin, C., Vulnerability Management: Tools, Challenges, and Best Practices, SANS (2003).
Bragg et al., "Network Security—The Complete Reference," 2004, McGraw-Hill/Osborne.
Burns, J. et al., Automatic Management of Network Security Policy, Telcordia Technologies (2001).
CA, Inc., "eTrust Audit Getting Started 1.5," 2003.
CA, Inc., "eTrust Intrusion Detection Administrator Guide 2.0," 2001.
CA, Inc., "eTrust Intrusion Detection Gelling Started 2.0," 2002.
CA, Inc., "eTrust Managing eBusiness Security," 2002.
CA, Inc., "eTrust Managing eBusiness Security," 2003.
CA, Inc., "eTrust Policy Compliance Administrator Guide 7.3," 2001.
CA, Inc., "eTrust Policy Compliance Getting Started," 2001.
CA, Inc., "eTrust Vulnerability Manager User Guide Version 1.0," 2003.
Carver, C., Hill, J., and Pooch, U, Limiting Uncertainty in Intrusion Response, IEEE (2001).
CERT Coordination Center, "Carnegie Mellon Software Engineering Institute, CERT Advisory CA-99-05 Vulnerability ("CERT Advisory CA-99-05")," Nov. 9, 1999.
CERT Coordination Center, "Carnegie Mellon Software Engineering Institute, The CERT® Coordination Center FAQ webpage ("CERT FAQ webpage")," Nov. 23, 2001.
CERT Coordination Center, "Carnegie Mellon Software Engineering Institute, Vulnerability Note VU#18287 ("VU#18287")," Nov. 23, 2001.
CERT Coordination Center, "Carnegie Mellon Software Engineering Institute, Vulnerability Note VU#368819 ("VU#368819")," Mar. 16, 2002.
CERT Coordination Center, "Carnegie Mellon Software Engineering Institute, Vulnerability Note VU#654643 (VU#654643)," Apr. 24, 2002.
CERT Coordination Center, "Carnegie Mellon Software Engineering Institute, Vulnerability Note VU#908611 ("VU#908611")," Nov. 20, 2001.
CERT Coordination Center, "CERT Vulnerability Notes Database ("CERT" or "CERT Vulnerability Search document")," Nov. 19, 2001.
Chau, Jonathan, "bv-Control for Internet Security 3.0," Aug. 13, 2001, Windows IT Pro.
Check Point Software Technologies Ltd, "Check Point RealSecure Adminstration" Version 2.5, Sep. 1998, 90 pages.
Clark, David Leon, "Enterprise Security: The Manager's Defense Guide," 2003, Addison-Wesley.
Clercq, Jan De, "Windows Server 2003 Security Infrastructures, Elsevier Digital Press, HP Publishing Partner," 2004, HP Publishing Partners.
CNN.com, "McAfee Ships ThreatScan Software ("CNN Product Release Note")," Apr. 3, 2002.
Cobb, C., Network Security for Dummies, Wiley Publishing, Inc. (2002).
Cobb, Chey, "Network Security for Dummies," 2002, Wiley Publishing Inc.
Colville et. Al, "Patch Management: Identifying the Vendor Landscape," Mar. 18, 2003, Gartner Research.
Colville, R., Wagner R., Nicolett, M., Patch Management Benefits, Challenges, and Prerequisites, Gartner (2002).
Computer World, "CA Users Get an Earful on Sonars Promise," Jul. 21, 2003.
Convery, Sean, "Network Security Architectures—Expert Guidance on Designing Secure Networks," 2004, Cisco Systems, Cisco Press.
CrossTalk Magazine, "Martin, Robert A., The Vulnerabilities of Developing on the Net," Apr. 2001.
CrossTalk, "The Promise of Web-based Applications", vol. 14 No. 4, Apr. 2001.
Brothers, Tim, "Implementing Intrusion Detection Systems—A Hands-On Guide for Securing the Network," 2002, Wiley Publishing Inc.
Cuppens, F., Gombault, S., and Sans, T., Selecting Appropriate Counter-Measures in an Intrusion Detection Framework, IEEE (2004).
Dargan, P.A. "The Ideal Collaborative Environment", CrossTalk, The Journal of Defense Software Engineering, Apr. 2001, pp. 11-31.

(56) References Cited

OTHER PUBLICATIONS

Dasgupta, D. and Brian, H., Mobile Security Agents for Network Traffic Analysis, IEEE (2001).
Delores Etter, "Memorandum for all government software projects," Office of the Director of Defense Research and Engineering, Jan. 30, 2001, as published in Crosstalk, The Journal of Defense Software Engineering, Apr. 2001, p. 4.
Demaine, R., An Overview of Computer Network Security Products & Devices, SANS (2002).
Deraison, Renaud, "Nessus Network Auditing, Jay Beale's Open Source Security Series ("Nessus Book")," 2004, Syngress Publishing Inc.
Diop, M. and Gombault, S. Real Time Intrusion Detection, RTO/NATO (2002).
eEye Digital Security on, ""Welcome to Security—Why a Vulnerability Assessment with eEye" ("Retina Webpage 1")," Feb. 2, 2002.
eEye Digital Security, ""REM Operations Guide—The Security Operator Reference Guide" ("REM Operations Guide")," Nov. 2004.
eEye Digital Security, ""Retina Network Security Scanner—Superior Vulnerability Detection & Remediation" ("Retina Webpage 6")," Jun. 11, 2002.
eEye Digital Security, ""Retina Network Security Scanner Users Manual" ("Users Manual")," 2002.
eEye Digital Security, ""Retina Network Security Scanner" ("Retina Webpage 2")," Feb. 2, 2003.
eEye Digital Security, ""Welcome to Security—CHO's Testimony from Congressional Subcommittee Hearing" ("Retina Webpage 5")," Jun. 15, 2002.
eEye Digital Security, ""Welcome to Security—eEye Digital Security Releases World's First Security Software that Thinks Like a Hacker" ("Retina Product Release")," May 25, 2000.
eEye Digital Security, ""Welcome to Security—Retina Network Scanner" ("Retina Webpage 3")," Jun. 11, 2002.
eEye Digital Security, ""Welcome to Security—The Process Retina Webpage 4")," Feb. 2, 2002.
eEye Digital Security, "eEye Digital Security Whitepaper—Retina Network Security Scanner Understanding CHAM—Common Hacking Attack Methods ("CHAM Whitepaper")," 2002.
eEye Digital Security, "Retina the Network Security Scanner ("Retina Whitepaper")," Jun. 11, 2002.
En Garde Systems, Inc., "T-Sight Overview Webpage ("T-Sight Overview Webpage")," Apr. 15, 2000.
En Garde Systems, Inc., "T-Sight Realtime—Main Window Webpage ("T-Sight")," Aug. 16, 2000.
Endorf et al., "Intrusion Detection and Prevention," 2003, McGraw-Hill.
Enterasys Networks, "Dragon 6.0 Intrusion Detection System Data Sheet (2002)," 2002.
Enterasys Networks, "Dragon 7.0 Network Sensor (2004)," 2004.
Enterasys Networks, "Dragon Enterprise Management Server (2004)," 2004.
Enterasys Networks, "Enterasys Dragon—EAL Intrusion Defense System Security Target," 2004.
Enterasys Networks, "Enterasys Dragon™ Intrusion Defense: Security and Intrusion Defense for Enterprise Networks (2004)," 2004.
Enterasys Networks, "Intrusion Detection Methodologies Demystified (2003) ("Demystified")," 2003.
Entercept Security Technologies, "Entercept User Guide ("Entercept User Guide")," May 2, 2003.
Enterprise Networking Planet, "In Brief: McAfee ThreatScan Targets Network 'Soft Spots' ("April Release Note")," Apr. 1, 2002.
eWeek, "CA Maps Traffic to Processes," Jul. 21, 2003.
Fellinge, Jeff, "Vulnerability Scanners," Sep. 27, 2004, Windows IT Pro.
Fortinet, Inc., ""FortiGate 3000—Real-time Protection for Large Enterprise and Service Providers"," 2004.
Fortinet, Inc., ""FortiGate 400/500—Real-time Network Protection for Enterprises"," 2004.
Fortinet, Inc., ""FortiGate-300 V2.16" User Manual," 2002.
Fortinet, Inc., ""Fortinet Remote VPN Client V1.4" User Manual," Dec. 2, 2002.
Fortinet, Inc., ""The FortiGate™—2000 Network Protection Gateway—The Next Generation Architecture for Gigabit Content Processing" White Paper," Aug. 2002.
Fortinet, Inc., "Break the Barrier to Complete Network Protection, Fortinet Brochure," 2002.
Fortinet, Inc., "Content Protection Guide Version 2.50 MR2," Aug. 8, 2003.
Intrusion Detection Systems: Definition, Need, and Challenges, SANS (2001).
Intrusion.com, Inc., "Building an Enterprise Security Infrastructure: Introduction to Kane Secure Enterprise ("Kane")," Mar. 2000.
IntruVert Networks, Inc., "IntruShield IDS System Getting Started Guide Version 1.1 ("GSG v1.1")," Jul. 2002.
IntruVert Networks, Inc., "IntruShield IDS System Getting Started Guide Version 1.2 ("GSG v1.2")," Oct. 2002.
IntruVert Networks, Inc., "IntruShield IDS System Manager Administrator's Guide Version 1.1 ("MAG v1.1")," Jul. 2002.
IntruVert Networks, Inc., "IntruShield IDS System Manager Administrator's Guide Version 1.2 ("MAG v1.2")," Oct. 2002.
IntruVert Networks, Inc., "IntruShield IDS System Manager Installation Guide version 1.1 ("MIG v1.1")," Jul. 2002.
IntruVert Networks, Inc., "IntruShield IDS System Sensor Installation and Configuration Guide version 1.1 ("SIG v.1.1")," Jul. 2002.
IntruVert Networks, Inc., "IntruShield Product Family: The IntruShield system is a next-generation network IDS that offers real-time network intrusion detection and prevention against known, unknown, and Denial of Service attacks for anterprise networks," Jun. 5, 2002.
IntruVert Networks, Inc., "Press Releases: IntruVert Networks Announces Availability of its IntruShield Product Line," Sep. 3, 2002.
IntruVert Networks, Inc., "Technology: IntruVert is introducing the industry's first real-time network intrusion prevention system that takes Intrusion Detection Systems (IDS) to a new level," Apr. 4, 2002.
ISS Certified User Training, "RealSecure" Version 3.0, 1999.
Kaeo, Merike, "Designing Network Security—A Practical Guide to Creating a Secure Network Infrastructure, Cisco Systems," 2003, Cisco Press.
Kohlenberg et al., "Snort IDS and IPS Toolkit—Featuring Jay Beale's Open Source Security Series," 2007, Syngress Publishing Inc.
Komar et al., "Firewall for Dummies, Second Edition," 2003, Wiley Publishing Inc.
Komar, B., Beekelaar, R., Wettern, J., Firewall for Dummies, Wiley Publishing, Inc. (2003).
Kothari, P., Intrusion Detection Interoperability and Standardization, SANS (2002).
LeClaire, Jennifer, "Symantec Buys BindView in $209 Million Cash Deal," Oct. 4, 2005, E-Commerce Times.
Liu, C. and Richardson, D., Automated Security Checking and Patching Using TestTalk, IEEE (2000).
Lukatsky, Alex, "Protect Your Information with Intrusion Detection—IT Master," 2003, A-List, LLC.
Maiwald, Eric, "Fundamentals of Network Security, Information Series," 2004, McGraw Hill Technology Education.
Maiwald, Eric, "Network Security—A Beginner's Guide," 2001, McGraw-Hill.
Malik, Saadat, "Network Security Principles and Practices,—Expert Solutions for Security Network Infrastructures and VPNs, CCIE Professional Development," 2002, Cisco Systems, Cisco Press.
Mardini, M., Case Study in Firewall and Intrusion Detection Integration, SANS (2002).
Martin, Robert A "The Vulnerabilities of Developing on the NET," Crosstalk, The Journal of Defense Software Engineering, Apr. 2001, pp. 5-10.
Mason et al., "Cisco Secure Internet Security Solutions, Cisco Systems," 2001, Cisco Press.

(56) References Cited

OTHER PUBLICATIONS

Matsuomoto, K., Hashimoto, K., and Obana, S. Design and Implementation of Real-Time Expert System for Troubleshooting in International Telephone Networks, Gordon and Breach Publishers (1995).
McAfee Security/Network Associates Technology, Inc., "Alert Manager™, version 4.7.1, Product Guide Revision 1.0," 2004.
McAfee Security/Network Associates Technology, Inc., "VirusScan Enterprise, version 7.0, Product Guide," 2003.
McAfee Security/Network Associates Technology, Inc., "VirusScan® Enterprise, version 7.1.0, Product Guide Revision 1.0," 2003.
McAfee, Inc., "Updating with VirusScan Enterprise, version 7.0, Implementation Guide document revision 1.0," 2003.
McHugh, J., Intrusion and Intrusion Detection, CERT Coordination Center (2001).
McHugh, John "Intrusion and intrusion detection," IJIS 1:14-35, Jul. 2001.
Mell, P. and Tracy, M., Procedures for Handling Security Patches, NIST Special Publication 800-40 (2002).
Menga et al. , "Secure Intrusion Detection and SAFE Implementation Study Guide (642-531 and 642-541), CCSP," 2004, Sybex.
Microsoft Corporation with Matthew Strebe, "MCSE/MCSA Self-Paced Training Kit—Implementing and Administering Security in a Windows 2000 Network: Exam 70-214," 2003, Microsoft Press.
Microsoft, "Microsoft Hotfix & Security Bulletin Service, Hotfix & Security Bulletin Service Webpage ("Microsoft Security Bulletin Search Webpage")," Feb. 3, 2004.
Microsoft, "Microsoft Security Bulletin MS03-043, Buffer Overrun in Messenger Service Could Allow Code Execution (828035) ("Microsoft Bulletin MS03-043")," Dec. 2, 2003.
Miller, Lawrence C., "Next Generation Firewalls for Dummies," 2011, Wiley Publishing Inc.
Millman, Rene, "bv-Control for Windows and Active Directory," 2004, BindView Development Corp.
MITRE Corporation, "CAN-2002-0059 Vulnerability webpage ("CAN-2002-0059")," Jun. 12, 2002.
MITRE Corporation, "CAN-2003-0717 Vulnerability webpage ("CAN-2003-0717")," Dec. 22, 2016.
MITRE Corporation, "Common Vulnerabilities and Exposures—About CVE webpage ("About CVE webpage")," Jun. 5, 2002.
MITRE Corporation, "CVE Vulnerability Search webpage ("CVE" or "CVE Vulnerability Search document")," Jun. 5, 2002.
Monroe, Kris, "Auditing with BindView bv-Control for Windows and enum, GSNA Practical Version 4.0—Option 1," Mar. 13, 2005, SANS Institute.
Motorola Inc., "Motorola Intrusion Vision—Display Screens Webpage ("Intrusion Vision Display")," Sep. 7, 2001.
Motorola Inc., "Motorola Intrusion Vision—Main Webpage ("Intrusion Vision Main")," Aug. 11, 2001.
Motorola Inc., "Motorola, Motorola Intrusion Vision Datasheet Webpage ("Intrusion Vision Display Datasheet")," Aug. 20, 2001.
National Institute of Standards and Technology, "ICAT Metabase Webpage ("ICAT")," Jun. 5, 2002.
Non Final Office Action from U.S. Appl. No. 14/981,866 dated Dec. 15, 2017.
Non Final Office Action from U.S. Appl. No. 15/608,983 dated Nov. 3, 2017.
Non Final Office Action from U.S. Appl. No. 15/608,984 dated Nov. 1, 2017.
Fratto, Mike, "Policy Enforcers," May 29, 2003, Network Computing.
Frederic Cuppens, Sylvain Gombault, Thierry Sans, "Cuppens, Selecting Appropriate Countermeasures in an Intrusion Detection Framework," 2004.
Gartner, "Gartner, Enterasys Networks Dragon Intrusion Detection System (2003)," 2003.
GFI Software Ltd., "GFI LANguard Network Security Scanner 3.3 Manual," Oct. 22, 2003.
Gilmor, Steve, "BindView Simplifies Security," Aug. 16, 2002, InfoWorld.
Government Computer News GCN Tech Edition, "Patch Management Software Cuts the Manual Labor ("GCN Chart")," Jun. 14, 2004.
Greene, Tim, "Streamlining Intrusion Detection, NetworkWorld article," Feb. 25, 2002, NetworkWorld.
Gucer et al., "Early Experiences with Tivoli Enterprise Console 3.7," 2000, International Business Machines Corporation.
Guirguis, Ragi, "Network and Host-Based Vulnerability Assessments: An Introduction to a Cost Effective and Easy to Use Strategy ("Guirguis Paper")," Jun. 14, 2003, SANS Institute.
Gula, R., Network Security Technology Update for CIOs, Tenable Network Security (2002).
Hagopian, S., Network-Based Intrusion Prevention System Technology Revolution or Evolution?, SANS (2004).
Holden, Greg, "Guide to Firewalls and Network Security: Intrusion Detection and VPNs," 2003, Thomson.
Holden, Greg, "Guide to Network Defense & Countermeasure," 2003, Thomson Course Technology.
Hourihan et a. , "Nokia Network Security: Solutions Handbook—The Complete Guide to Nokia Firewalls and VPNs," 2002, Syngress Publishing Inc.
Hulme, G., Gartner: Intrusion Detection on the Way Out, Information Week (2003).
IEEE, ""Cooperative Intrusion Tracebook and Response Architecture (CITRA)", IEEE 2001 ("CITRA")," 2001.
InfoWorld, ""Eyes on the network—eEye EVA brings manageability to strong vulnerability assessment" ("InfoWorld Article")," Feb. 24, 2003.
InfoWorld, "CA Unifies eTrust Tools," Sep. 19, 2002.
Interface Analysis Associates, "Web Review: Enterprise-level Intrusion Detection (and Prevention) Systems," Sep. 13, 2004.
Internet Security System's website, www.iss.net, ""Enterprise Protection Components" ("EPP Components")," Jun. 2, 2003.
Internet Security System's website, www.iss.net, "Internet Security Systems Introduces ISS Proventia A-Series Protection Appliances ("Proventia A Series Press Release 1")," Apr. 14, 2003.
Internet Security System's website, www.iss.net, "Internet Security Systems Introduces Proventia Family of Protection Appliances to Identify and Prevent All Forms of Network Attack ("Proventia A Series Press Release 2")," Apr. 14, 2003.
Internet Security Systems "RealSecure 6.0", Frequently Asked Questions, Jun. 2001, 21 pages.
Internet Security Systems Certified User Training, "Internet Scanner for Windows NT," Version 5.4, 1998.
Internet Security Systems Technical White Paper, "BlackICE Sentry to RealSecure Network Sensor 7.0 Migration Guide" 2002.
Internet Security Systems, ""Internet Security Systems Reports Third Quarter Results, Achieves Operating Profitability and Earnings Expectations," ("Earning Announcement")," Oct. 17, 2001.
Internet Security Systems, "Internet Security Systems Internet Scanner User Guide, Version 6.2.1 ("ISUG")," Nov. 2001.
Internet Security Systems, "Network Sensor Policy Guide," Version 6.0, 2001, 54 pages.
Internet Security Systems, "RealSecure 5.x to 6.0 Upgrade Considerations," Revision 1.2, May 17, 2001, 5 pages.
Internet Security Systems, "RealSecure 6.0" Revision 1a, Jun. 8, 2001, 3 pages.
Internet Security Systems, "RealSecure Getting Started," 1998, 46 pages.
Internet Security Systems, "RealSecure Getting Started," 1999, 68 pages.
Internet Security Systems, "RealSecure Installation Guide," Version 6.0, 2001, 218 pages.
Internet Security Systems, "RealSecure Network Engine User Guide," Version 3.1, 1999, 28 pages.
Internet Security Systems, "RealSecure Network Sensor and Gigabit Network Sensor Installation Guide" Version 7.0, 2002, 150 pages.
Internet Security Systems, "RealSecure Network Sensor Policy Guide," Version 7.0, 2002, 74 pages.
Internet Security Systems, "RealSecure OS Sensor Policy Guide," Version 5.0, 2001, 50 pages.

(56) References Cited

OTHER PUBLICATIONS

Internet Security Systems, "RealSecure Protection System FAQ," May 21, 2002, 13 pages.
Internet Security Systems, "RealSecure Server Sensor 6.0.1 Frequently Asked Questions," Aug. 2001, 22 pages.
Internet Security Systems, "RealSecure Server Sesnor Policy Guide," Version 6.0, 2001, 100 pages.
Internet Security Systems, "RealSecure Signatures Reference Guide, Version 6.5 ("SRG")," Dec. 2001.
Internet Security Systems, "RealSecure Signatures Reference Guide," Version 6.0, 2001, 778 pages.
Internet Security Systems, "RealSecure Signatures Reference Guide," Version 6.5, 2001, 830 pages.
Internet Security Systems, "RealSecure System Agent User Guide," Version 3.1, 1999, 30 pages.
Internet Security Systems, "RealSecure Version 6.0—Readme" Jun. 2001.
Internet Security Systems, "RealSecure Version 6.0—Readme" Jun. 21, 2001.
Internet Security Systems, "RealSecure Workgroup Manager User Guide, Version 6.5 ("RSUG")," Dec. 2001.
Internet Security Systems, "RealSecure Workgroup Manager User Guide," Version 6.0, 2001, 268 pages.
Internet Security Systems, "Release Notes," Aug. 1, 2002, 14 pages.
Internet Security Systems, "System Requirements RealSecure IDS Application," May 2001, 10 pages.
Trend Micro Incorporated, "Trend Micro InterScan3 Administrator's Guide (Trend InterScan VirusWall Ver. 3 Administrators Guide)," Jul. 1998.
Trend Micro Incorporated, "Trend Micro OfficeScan Corporate Edition Getting Started Guide," Feb. 2003.
Trend Micro Incorporated, "Trend Micro OfficeScan3 Administrator's Guide," Dec. 1999.
Trend Micro Incorporated, "Trend Micro OfficeScan3 Client User's Guide," Dec. 1999.
Trend Micro Incorporated, "Trend Micro OfficeScan3 Getting Started Guide," Oct. 2000.
Trend Micro Incorporated, "Trend Micro(TM) Control Manager 2.5 Readme," Dec. 2002.
Trend Micro Incorporated, "Trend Micro in InterScan VirusWall™ Getting Started Guide," Aug. 2003.
Trend Micro Incorporated, "Trend OfficeScan Corporate Edition Administrator's Guide," 1998.
Tuttle et al., "Centralized Risk Management Using Tivoli Risk Manager 4.2, International Technical Support Organization," 2003, International Business Machines Corporation.
Voldal, D., A Practical Methodology for Implementing a Patch Management Process, SANS (2003).
Vukelich D. Levin, D. and Lowry, J., Architecture for Cyber Command and Control: Experiences and Future Directions, IEEE (2001).
Wassom, D., Intrusion Detection Systems: An Overview of RealSecure, SANS (2002).
Welch-Abemathy, Dameon D., "Essential Check Point FireWall—An Installation, Configuration, and Troubleshooting Guide," 2000, Pearson Education, Inc.
Wickham, T., Intrusion Detection is Dead. Long Live Intrusion Prevention!, SANS (2003).
Wickham, Timothy, "Intrusion Detection is Dead. Long Live Intrusion Prevention!, SANS Institute InfoSec Reading Room," Apr. 21, 2003, SANS Institute.
Windows IT Pro, "Retina 3.0 ("Windows IT Pro Article")," Feb. 25, 2001.
Young, Casey, "Exploring IBM e-business Software, Second Edition," 2003, Maximum Press.
Internet Security Systems, "System Scanner Getting Started," System Scanner for Unix 1.7, 1997, 86 pages.
Internet Security Systems, "System Scanner Getting Started," System Scanner for Widnows Version 1.1, 1997, 50 pages.
Internet Security Systems, Inc., ""Frequently Asked Questions," RealSecure® 6.0," 2001.
Internet Security Systems, Inc., ""RealSecure SiteProtector Strategy Guide," version 1.2, ("Strategy Guide Version 1.2")," Sep. 2002.
Internet Security Systems, Inc., ""System Requirements," RealSecure IDS Application," May 29, 2001.
Internet Security Systems, Inc., "Internet Scanner for Windows NT v.5.4 Student Guide, ISS Certified User Training," 1999.
Internet Security Systems, Inc., "Internet Scanner Getting Started Guide version 6.1 ("Internet Scanner GSG")," Jul. 2000.
Internet Security Systems, Inc., "Internet Security Systems—Internet Scanner ("Internet Scanner")," 2000.
Internet Security Systems, Inc., "Internet Security Systems—Internet Scanner Technical Overview ("Internet Scanner Technical Overview")," Dec. 2000.
Internet Security Systems, Inc., "Internet Security Systems, Inc.'s Form 10-Q ("Q1 10-Q Form")," May 14, 2003, U.S. Securities and Exchange Commission.
Internet Security Systems, Inc., "Internet Security Systems' website at http://www.iss.net/customer_care/resource_center/o nline_doc/," Jan. 24, 2002.
Internet Security Systems, Inc., "Internet Security Systems' website at http://www.iss.net/customer_care/whats_new/index .php," Jan. 23, 2002.
Internet Security Systems, Inc., "Network Vulnerability Assessment Report ("Vulnerability Assessment Report")," Apr. 20, 2003.
Internet Security Systems, Inc., "Proventia A Series ("Proventia A Series Datasheet")," 2003.
Internet Security Systems, Inc., "Proventia A604, A1204, and A1204F Appliance User Guide ("Proventia User Guide")," Jun. 18, 2003.
Internet Security Systems, Inc., "RealSecure Agent Advanced Administration Guide, version 7.0, ("Agent Administration Guide")," Aug. 19, 2003.
Internet Security Systems, Inc., "RealSecure BlackICE™ Sentry to RealSecure® Network Sensor 7.0 Migration Guide," 2002.
Internet Security Systems, Inc., "RealSecure Installation Guide Version 6.0," May 2001.
Internet Security Systems, Inc., "RealSecure Network Sensor and Gigabit Network Sensor Installation Guide Version 7.0," May 2002.
Internet Security Systems, Inc., "RealSecure Network Sensor and Gigabit Network Sensor Policy Guide," version 7.0 ("Network Sensor Policy Guide"), Aug. 2003.
Internet Security Systems, Inc., "RealSecure Network Sensor Installation Guide," version 6.5 ("Network Sensor Installation Guide"), Jan. 2002.
Internet Security Systems, Inc., "RealSecure Network Sensor Policy Guide Version 6.0," Aug. 2001.
Internet Security Systems, Inc., "RealSecure Network Sensor Policy Guide Version 7.0," May 2002.
Internet Security Systems, Inc., "RealSecure Network Sensor Service Release Notes," Jan. 4, 2001.
Internet Security Systems, Inc., "RealSecure Network Sensor Version 6.0—Readme," Jun. 13, 2004.
Internet Security Systems, Inc., "RealSecure OS Sensor Policy Guide Version 5.0," May 2001.
Internet Security Systems, Inc., "RealSecure Release Notes," Aug. 1, 2001.
Internet Security Systems, Inc., "RealSecure Server Sensor Policy Guide Version 6.0," May 2001.
Internet Security Systems, Inc., "RealSecure Server Sensor Policy Guide," version 6.5 ("Server Sensor Policy Guide"), Dec. 2001.
Internet Security Systems, Inc., "RealSecure Servor Sensor Version 6.0—Readme," Jun. 21, 2004.
Internet Security Systems, Inc., "RealSecure Signatures Reference Guide Version 6.0," May 2001.
Internet Security Systems, Inc., "RealSecure Signatures Reference Guide Version 6.5," Dec. 2001.
Internet Security Systems, Inc., "RealSecure SiteProtector Console User Reference Guide, version 2.0, ("Console User Guide")," Jan. 2003.

(56) References Cited

OTHER PUBLICATIONS

Internet Security Systems, Inc., "RealSecure SiteProtector Installation and Configuration Guide, version 2.0, ("SiteProtector Installation Guide" or "ICG")," Jan. 2003.
Internet Security Systems, Inc., "RealSecure SiteProtector Strategy Guide, version 2.0 ("Strategy Guide Version 2.0")," Jan. 2003.
Internet Security Systems, Inc., "RealSecure v3.0 Student Guide, ISS Certified User Training," 1999.
Internet Security Systems, Inc., "RealSecure version 3.0 Attack Signatures Glossary," 1999.
Internet Security Systems, Inc., "RealSecure version 3.0 Getting Started," 1999.
Internet Security Systems, Inc., "RealSecure version 3.0 User's Guide," 1999.
Internet Security Systems, Inc., "RealSecure version 3.1 Attack Signatures Glossary," 1999.
Internet Security Systems, Inc., "RealSecure version 3.1 Console User Guide," 1999.
Internet Security Systems, Inc., "RealSecure version 3.1 Getting Started," 1999.
Internet Security Systems, Inc., "RealSecure version 3.1 Network Engine User Guide," 1999.
Internet Security Systems, Inc., "RealSecure version 3.1 System Agent Guide," 1999.
Internet Security Systems, Inc., "RealSecure Workgroup Manager User Guide Version 6.0," Jul. 2001.
Internet Security Systems, Inc., "RealSecure® Network Sensor 7.0, Gigabit Network Sensor 7.0, Workgroup Manager 6.6 Internal Technical FAQ," May 23, 2002.
Internet Security Systems, Inc., "RealSecure® Protection System FAQ," May 21, 2002.
Internet Security Systems, Inc., "RealSecure™ 5.x to 6.0 Upgrade Considerations," May 17, 2001.
Internet Security Systems, Inc., "RealSecure™ Server Sensor 6.0.1 Frequently Asked Questions," Aug. 2001.
Internet Security Systems, Inc., "RealSecure™ Server Sensor 6.0.1 Internal FAQ," Aug. 2001.
Symantec Corporation, "Symantec™ Gateway Security 5400 Series Reference Guide," Aug. 27, 2003.
Symantec Corporation, "Symantec™ Gateway Security 5400 Series version 2,0 Maintenance Update (Part No. 10281791)," Date Unknown.
Symantec Corporation, "Symantec™ Gateway Security 5400 Series version 2,0 Maintenance Update," Oct. 12, 2004.
Symantec Corporation, "Symantec™ Gateway Security 5400 Series, Third-party attributions," 2004.
Symantec Corporation, "Symantec™ Gateway Security Booklet," 2002.
Symantec Corporation, "Symantec™ Gateway Security Fact Sheet," 2002.
Symantec Corporation, "Symantec™ Gateway Security v2.0.1, License Organizer," Date Unknown.
Symantec Corporation, "Symantec™ Packager Implementation Guide," 2002.
Symantec Corporation, "Symantec™ Security Gateways Reference Guide," 2004.
Tan, S., NIDS—Should You Do Without It?, SANS (2003).
Tarman, T., Witzke, E., Bauer, K, Kellogg, B. and Young, W., Asynchronous Transfer Mode (ATM) Intrusion Detection, IEEE (2001).
TechWeb, "Proactive Virus Protection—McAfee Integrates Policy Management and Reporting Into New Suite ("TechWeb Release Note")," Feb. 7, 2000.
Teo, L., Zheng, Y., and Ahn, G, Intrusion Detection Force: An Infrastructure for Internet-Scale Intrusion Detection, IEEE (2003).
Tere Parnell, Network Computing, "BindView Readies New Version of Compliance Center," Aug. 16, 2005.
The NSS Group, "Intrusion Detection Systems Group Test (Edition 2)," 2001.
Tidswell, Jason, "McAfee's Proactive Threat Protection Strategy ("Proactive Threat Protection Strategy")," Apr. 19, 2003, SANS Institute.
Tim Grieser, et al., "Tim Grieser, et al., Enhancing IT Productivity and Improving ROI with NetIQ Management Software ("Grieser")," 2003.
TippingPoint Technologies, Inc., "Improving Corporate Profitability through Advanced Security," Jan. 2003.
TippingPoint Technologies, Inc., "Product Requirements Document: Adaptive Firewall," Mar. 2002.
TippingPoint Technologies, Inc., "Product Requirements Document: Continuous Vulnerability Assessor (CVA)," Mar. 2002.
TippingPoint Technologies, Inc., "Product Requirements Document: Security Management System (SMS) and Local Security Manager (LSM)," Feb. 2002.
TippingPoint Technologies, Inc., "Product Requirements Document: Threat Management Center (TMC)," Mar. 2002.
Tipping Point Technologies, Inc., "Product Requirements Document: Virtual Private Network," Feb. 2002.
Tipping Point Technologies, Inc., "The TPT-5000TM Optical Switch Processor Platform Datasheet," Aug. 2001.
Tipping Point Technologies, Inc., "The View from RSA—Consolidation, integration, automation ,and vulnerability assessment solutions lead the way, InfoWorld article," Mar. 11, 2002.
Tipping Point Technologies, Inc., "TippingPoint Intrusion Prevention Systems Datasheet," 2005.
Tipping Point Technologies, Inc., "TippingPoint Technologies Announces Availability of UnityOne(TM) Active Network-Defense System, PRNewswire," Sep. 30, 2002.
Tipping Point Technologies, Inc., "TippingPoint Technologies Frequently Asked Questions Sheet," 2003.
TippingPoint Technologies, Inc., "TippingPoint Technologies Introduces UnityOne (TM): Security Industry's First Unified Network-Defenses Appliances, PRNewswire," Feb. 19, 2002.
Tipping Point Technologies, Inc., "TippingPoint Technologies System Requirements Document: Unified Network Defense System (UNDS)," Feb. 6, 2002.
Tipping Point Technologies, Inc., "TippingPoint Technologies to Provide First Programmable Network Platform, Press Release," Sep. 2001.
Tipping Point Technologies, Inc., "TippingPoint Technologies, Inc. UnityOne™ Version 1.2 Security Target," Aug. 14, 2003.
Tipping Point Technologies, Inc., "TippingPoint Unity-One-1200 V1.4 Technical Evaluation," Jan. 2004.
Tipping Point Technologies, Inc., "Unified Network-Defense Appliances . . . A Solution Primer Brochure," 2002.
Tipping Point Technologies, Inc., "UnityOne Datasheet U1001 http://web.archive.org/web/20040727051233/http://www.tippingpoint.com/pdf/resources/datasheets/U1 001.pdf ("UDS")," Apr. 23, 2004.
TippingPoint Technologies, Inc., "UnityOne Network-Defense System Data Sheet," 2002.
Tipping Point Technologies, Inc., "UnityOne™ Solutions, http://web.archive.org/web/20020808144816/http:// www.tippingpoint.com/solu.htm ("solu.htm")," Aug. 8, 2002.
Tipping Point Technologies, Inc., "UnityOne™ Version 1.2 Security Target ("UOST")," Aug. 14, 2003.
Tipping Point Technologies, Inc., "UnityOne™ Intrusion Prevention Appliances Data Sheet," 2003.
Tipton et al., "Information Security Management Handbook, 4th Ed.," 1999, Auerbach Publications.
Toth, T. and Kruegel, C. Evaluating the Impact of Automated Intrusion Response Mechanisms, IEEE (2002).
Travis Jones SecurityProfiling, Inc., "Patch Management Competitive Analysis (SCP0018512)," Jun. 16, 2003.
Trend Micro Incorporated, "Control Manager Agent Development Guide," Jan. 21, 2002.
Trend Micro Incorporated, "Getting Started Guide for Trend Micro Control Manager," Dec. 2002.
Trend Micro Incorporated, "InterScan VirusWall User's Guide," Jul. 1996.
Trend Micro Incorporated, "Trend Micro Client/Server Suite Getting Started Guide," Oct. 2002.

(56) References Cited

OTHER PUBLICATIONS

Trend Micro Incorporated, "Trend Micro Control Manager 2.5 Best Practices Guide," Sep. 2003.
Trend Micro Incorporated, "Trend Micro InterScan® VirusWall® 3 Administrator's Guide ("VirusWall Admin Guide")," 1999.
Trend Micro Incorporated, "Trend Micro InterScan® VirusWall® 3 Quick Start Guide," Nov. 1, 1999.
Check Point Software Technologies Ltd, "Check Point RealSecure Adminstration" Version 3.0, Apr. 1999, 128 pages.
Check Point Software Technologies Ltd, "Check Point RealSecure Attack Signatures Glossary" Version 3.2, Sep. 1999, 177 pages.
Check Point Software Technologies Ltd, "Check Point RealSecure Attack Signatures Glossary" Version 4.1, Jan. 2000, 162 pages.
Check Point Software Technologies Ltd, "Check Point RealSecure Console Guide" Version 3.2, Sep. 1999, 96 pages.
Check Point Software Technologies Ltd, "Check Point RealSecure Console Guide" Version 4.1, Jan. 2000, 99 pages.
Check Point Software Technologies Ltd, "Check Point RealSecure Manager User Guide" Version 4.1, Sep. 1999, 24 pages.
Check Point Software Technologies Ltd, "Check Point RealSecure Network Engine User Guide" Version 3.1, Jul. 1999, 30 pages.
Check Point Software Technologies Ltd, "Check Point RealSecure Network Engine User Guide" Version 3.2, Sep. 1999, 30 pages.
Check Point Software Technologies Ltd, "Check Point RealSecure Network Engine User Guide" Version 4.1, Jan. 2000, 30 pages.
Check Point Software Technologies Ltd, "Check Point RealSecure Release Notes" Version 4.1, Mar. 2000, 15 pages.
Check Point Software Technologies Ltd, "Check Point RealSecure System Agent User Guide" Version 3.1, Jul. 1999, 34 pages.
Check Point Software Technologies Ltd, "Check Point RealSecure Verseion 2.5 Release Notes", Nov. 1998, 4 pages.
Check Point Software Technologies Ltd, "Getting Started with Check Point RealSecure" Version 2.5, Apr. 1998, 50 pages.
Check Point Software Technologies Ltd, "Getting Started with Check Point RealSecure" Version 3.0, Feb. 1999, 54 pages.
Check Point Software Technologies Ltd, "Getting Started with Check Point RealSecure" Version 3.1, Jul. 1999, 54 pages.
Check Point Software Technologies Ltd, "Getting Started with Check Point RealSecure" Version 3.2, Sep. 1999, 62 pages.
Check Point Software Technologies Ltd, "Getting Started with Check Point RealSecure" Version 4.1, Jan. 2000, 50 pages.
Check Point Software Technologies Ltd., "Check Point RealSecure Version 2.5 Release Notes, P/N 77400000100," Nov. 1998.
Check Point Software Technologies Ltd., "Check Point RealSecure Version 2.5 Release Notes," Nov. 1998.
Check Point Software Technologies Ltd., "Check Point RealSecure™ Administration, Version 2.5" Sep. 1998.
Check Point Software Technologies Ltd., "Check Point RealSecure™ Administration, Version 3.0", Apr. 1999.
Check Point Software Technologies Ltd., "Check Point™ RealSecure™ Attack Signatures Glossary, Version 3.1," Sep. 1999.
Check Point Software Technologies Ltd., "Check Point™ Real Secure™ Attack Signatures Glossary, Version 3.2," Sep. 1999.
Check Point Software Technologies Ltd., "Check Point™ RealSecure™ Attack Signatures Glossary, Version 4.1," Jan. 2000.
Check Point Software Technologies Ltd., "Check Point™ RealSecure™ Console Guide, Version 3.1," Sep. 1999.
Check Point Software Technologies Ltd., "Check Point™ RealSecure™ Console Guide, Version 3.2," Sep. 1999.
Check Point Software Technologies Ltd., "Check Point™ RealSecure™ Console Guide, Version 4.1," Jan. 2000.
Check Point Software Technologies Ltd., "Check Point™ RealSecure™ Manager User Guide, Version 4.1," Sep. 1999.
Check Point Software Technologies Ltd., "Check Point™ RealSecure™ Network Engine User Guide, Version 3.1," Jul. 1999.
Check Point Software Technologies Ltd., "Check Point™ RealSecure™ Network Engine User Guide, Version 3.2," Sep. 1999.
Check Point Software Technologies Ltd., "Check Point™ RealSecure™ Network Engine User Guide, Version 4.1," Jan. 2000.
Check Point Software Technologies Ltd., "Check Point™ RealSecure™ Release Notes, Version 4.1," Mar. 2000.
Check Point Software Technologies Ltd., "Check Point™ RealSecure™ System Agent User Guide, Version 3.1," Jul. 1999.
Check Point Software Technologies Ltd., "Getting Started with Check Point RealSecure™, Version 2.5," Aug. 1998.
Check Point Software Technologies Ltd., "Getting Started with Check Point RealSecure™, Version 3.0," Feb. 1999.
Check Point Software Technologies Ltd., "Getting Started with Check Point™ RealSecure™, Version 3.1," Jul. 1999.
Check Point Software Technologies Ltd., "Getting Started with Check Point™ RealSecure™, Version 3.2," Sep. 1999.
Check Point Software Technologies Ltd., "Getting Started with Check Point™ RealSecure™, Version 4.1," Jan. 2000.
Chip Andrews, "Block, Then Tackle," May 1, 2000, Redmondmag.com.
Chirillo, John, "Hack Attacks Testing: How to Conduct Your Security Audit," 2003, Wiley Publishing Inc.
Cisco Systems, Inc., "Cisco IDS Sensor Software Version 4.0 Product Requirements Documents ("IDS-PRD"), (Cisco_IntelMcAfeeSub00000011) Designated Outside Counsel Eyes Only," 2002.
Cisco Systems, Inc., "Exodus EMODE Intrusion Detection Configuration Guide ("Exodus"), (Cisco_IntelMcAfeeSub00000004) Designated Outside Counsel Eyes Only," 2001.
Cisco Systems, Inc., "NetRanger User's Guide Version 2.1.1 ("NetRanger UG")," 1998.
Citadel Security Software Inc., "Citadel Announces Release of Hercules™ at RSA 2002™," Feb. 19, 2002.
Citadel Security Software Inc., "Citadel Hercules Automated Vulnerability Remediation: Installation Guide Hercules v2.2.0 ("2.2 Installation Guide")," 2003-2004.
Citadel Security Software Inc., "Citadel Hercules Automated Vulnerability Remediation: Users Guide ("2.0 Users Guide")," 2003.
Citadel Security Software Inc., "Citadel Hercules Automated Vulnerability Remediation: Users Guide Hercules v2.2.0 ("2.2 Users Guide")," 2004.
Citadel Security Software Inc., "Citadel Hercules Automated Vulnerability Remediation: Vulnerability Assessment and Remediation Guide Hercules v2.2.0 ("2.2 Vulnerability Assessment and Remediation Guide")," 2004.
Citadel Security Software Inc., "Citadel Hercules Network Vulnerability Remediation: Vulnerability and Remediation Guide ("2.0 Vulnerability and Remediation Guide")," 2003.
Citadel Security Software Inc., "Citadel Security Software Chosen by the Texas Hospital Association as the Recommended Security Solution for Member Hospitals," May 30, 2002.
Action Summary for U.S. Appl. No. 14/834,102 dated Aug. 24, 2018.
Action Summary for U.S. Appl. No. 15/608,978 dated Nov. 5, 2018.
Action Summary for U.S. Appl. No. 15/608,981 dated Nov. 5, 2018.

REAL-TIME VULNERABILITY MONITORING

CROSS-REFERENCE TO RELATED APPLICATIONS

This application is a continuation of, and claims priority to U.S. patent application Ser. No. 14/834,102 filed Aug. 24, 2015, titled "REAL-TIME VULNERABILITY MONITORING", which in turn is a continuation of U.S. patent application Ser. No. 14/138,014 filed Dec. 21, 2013, now U.S. Pat. No. 9,117,069, which, in turn, is a continuation of U.S. patent application Ser. No. 10/882,852, filed Jul. 1, 2004 which, in turn, claims the benefit of U.S. Provisional Application No. 60/484,085, titled SECURITY MANAGEMENT PROXY SYSTEM AND METHODS and filed Jul. 1, 2003, all of which are incorporated herein by reference in their entirety for all purposes. This application is also related to issued U.S. Pat. No. 8,266,699, titled MULTIPLE-PATH REMEDIATION, as well as applications titled POLICY PROTECTION PROXY (U.S. patent application Ser. No. 10/882,853), VULNERABILITY AND REMEDIATION DATABASE (U.S. patent application Ser. No. 10/882,788), AUTOMATED STAGED PATCH AND POLICY MANAGEMENT (U.S. patent application Ser. No. 10/884,329), and CLIENT CAPTURE OF VULNERABILITY DATA (U.S. patent application Ser. No. 10/883,376), all filed on Jul. 1, 2004. All of these applications are hereby incorporated herein by reference as if fully set forth.

FIELD OF THE INVENTION

The present invention relates to computer systems, and more particularly to management of security of computing and network devices that are connected to other such devices.

BACKGROUND

With the growing popularity of the Internet and the increasing reliance by individuals and businesses on networked computers, network security management has become a critical function for many people. Furthermore, with computing systems themselves becoming more complex, security vulnerabilities in a product are often discovered long after the product is released into general distribution. Improved methods are needed, therefore, for managing updates and patches to software systems, and for managing configurations of those systems.

The security management problem is still more complex, though. Often techniques intended to remediate vulnerabilities (such as configuration changes, changes to policy settings, or application of patches) add additional problems. Sometimes patches to an operating system or application interfere with operation of other applications, and can inadvertently disable mission-critical services and applications of an enterprise. At other times, remediation steps open other vulnerabilities in software. There is, therefore, a need for improved security management techniques.

SUMMARY

An apparatus is provided including at least one platform; an intrusion prevention system configured to communicative couple with the at least one platform; a firewall configured to communicative couple with the at least one platform; at least one first data storage configured to communicative couple with the at least one platform; and at least one second data storage configured to communicative couple with the at least one platform. The at least one platform is configured to receive a result of at least one operation in connection with at least one of a plurality of networked devices, the at least one operation based on first information from the at least one first data storage identifying a plurality of potential vulnerabilities including at least one first potential vulnerability and at least one second potential vulnerability. The at least one operation is configured for: identifying at least one configuration associated with the at least one networked device, and determining that the at least one networked device is actually vulnerable to at least one actual vulnerability, based on the identified at least one configuration and the first information from the at least one first data storage identifying the plurality of potential vulnerabilities, such that second information associated with the result is stored in the at least one second data storage separate from the at least one first data storage, the second information relating to the at least one actual vulnerability to which the at least one networked device is actually vulnerable. The at least one platform is further configured to cause display, via at least one user interface, a plurality of techniques including a first technique for utilizing the intrusion prevention system for occurrence mitigation, a second technique for utilizing the firewall for occurrence mitigation. Further, the at least one platform is further configured to allow receipt of: user input causing selection of the first technique for utilizing the intrusion prevention system for occurrence mitigation, and user input causing selection of the second technique for utilizing the firewall for occurrence mitigation. Still yet, the at least one platform is further configured to, based on the user input causing selection of the first technique for utilizing the intrusion prevention system for occurrence mitigation, automatically apply the first technique for utilizing the intrusion prevention system for occurrence mitigation; and based on the user input causing selection of the second technique for utilizing the firewall for occurrence mitigation, automatically apply the second technique for utilizing the firewall for occurrence mitigation. Even still, the at least one platform is further configured to cause identification of: in connection with the at least one networked device, a first occurrence including at least one first occurrence packet directed to the at least one networked device, and in connection with the at least one networked device, a second occurrence including at least one second occurrence packet directed to the at least one networked device. Even still yet, the at least one platform is further configured to determine: that the first occurrence including the at least one first occurrence packet directed to the at least one networked device is capable of taking advantage of the at least one of the actual vulnerability to which the at least one networked device is actually vulnerable; and that the second occurrence including the at least one second occurrence packet directed to the at least one networked device is not capable of taking advantage of the at least one of the actual vulnerability to which the at least one networked device is actually vulnerable. Further, the at least one platform is configured to cause a reporting of at least the first occurrence based on the determination that the first occurrence including the at least one first occurrence packet directed to the at least one networked device is capable of taking advantage of the at least one of the actual vulnerability to which the at least one networked device is actually vulnerable.

DESCRIPTION

Figure 1:
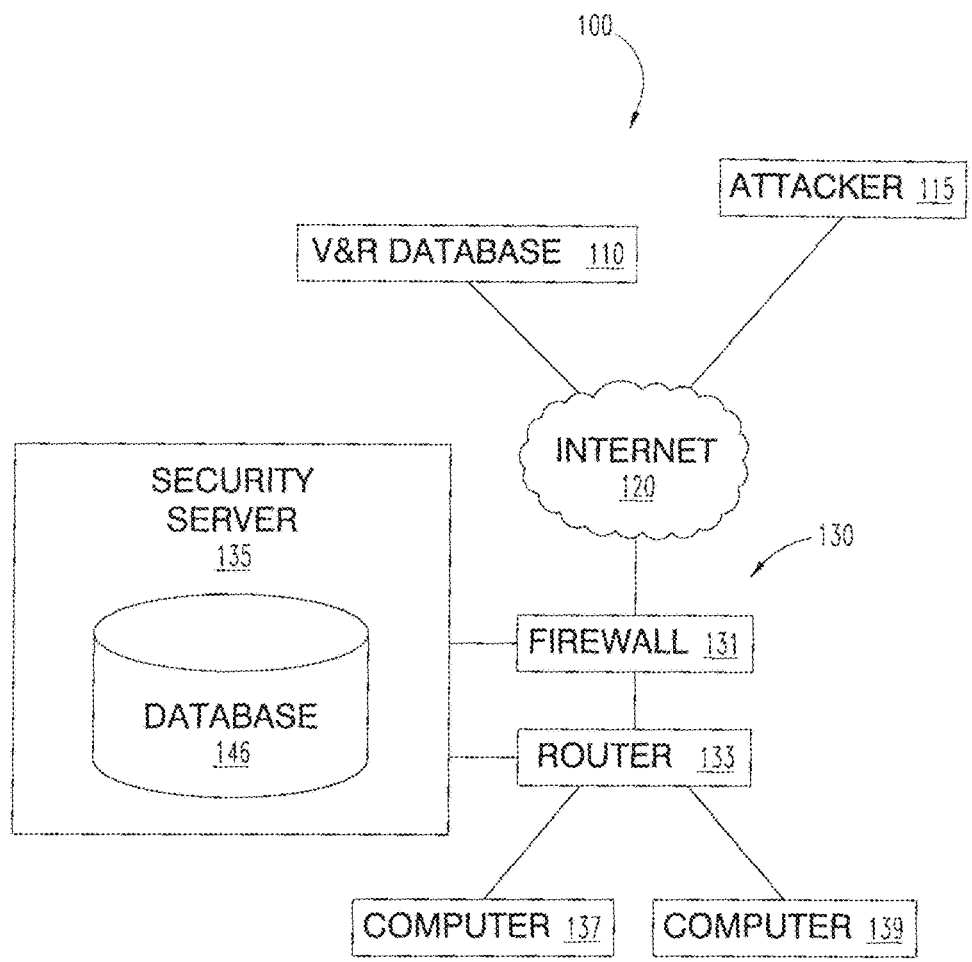
FIG. 1 is a block diagram of a networked system of computers in one embodiment of the present invention.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Generally, the present invention in one embodiment operates in the context of a network as shown in FIG. 1. System 100 includes a vulnerability and remediation database 110 connected by Internet 120 to subnet 130. In this exemplary embodiment, firewall 131 serves as the gateway between Internet 120 and the rest of subnet 130. Router 133 directs connections between computers 137 and each other and other devices on Internet 120. Server 135 collects certain information and provides certain data services that will be discussed in further detail herein.

In particular, security server 135 includes processor 142, and memory 144 encoded with programming instructions executable by processor 142 to perform several important security-related functions. For example, security server 135 collects data from devices 131, 133, 137, and 139, including the software installed on those devices, their configuration and policy settings, and patches that have been installed. Security server 135 also obtains from vulnerability and remediation database 110 a regularly updated list of security vulnerabilities in software for a wide variety of operating systems, and even in the operating systems themselves. Security server 135 also downloads a regularly updated list of remediation techniques that can be applied to protect a device from damage due to those vulnerabilities. In one embodiment, each vulnerability in remediation database 110 is identified by a vulnerability identifier, and the vulnerability identifier can be used to retrieve remediation information from database 110 (and from database 146, discussed below in relation to FIG. 2).

In one embodiment, computers 137 and 139 each comprise a processor 152, 162, memory 154, 164, and storage 156, 166. Computer 137 executes a client-side program (stored in storage 156, loaded into memory 154, and executed by processor 152) that maintains an up-to-date collection of information regarding the operating system, service pack (if applicable), software, and patches installed on computer 137, and the policies and configuration data (including configuration files, and elements that may be contained in files, such as *.ini and *.conf files and registry information, for example), and communicates that information on a substantially real-time basis to security server 135. In an alternative embodiment, the collection of information is not retained on computer 137, but is only communicated once to security server 135, then is updated in real time as changes to that collection occur.

Computer 139 stores, loads, and executes a similar software program that communicates configuration information pertaining to computer 139 to security server 135, also substantially in real time. Changes to the configuration registry in computer 139 are monitored, and selected changes are communicated to security server 135 so that relevant information is always available. Security server 135 may connect directly to and request software installation status and configuration information from firewall 131 and router 133, for embodiments wherein firewall 131 and router 133 do not have a software program executing on them to communicate this information directly.

This collection of information is made available at security server 135, and combined with the vulnerability and remediation data from source 110. The advanced functionality of system 100 is thereby enabled as discussed further herein.

Figure 2:
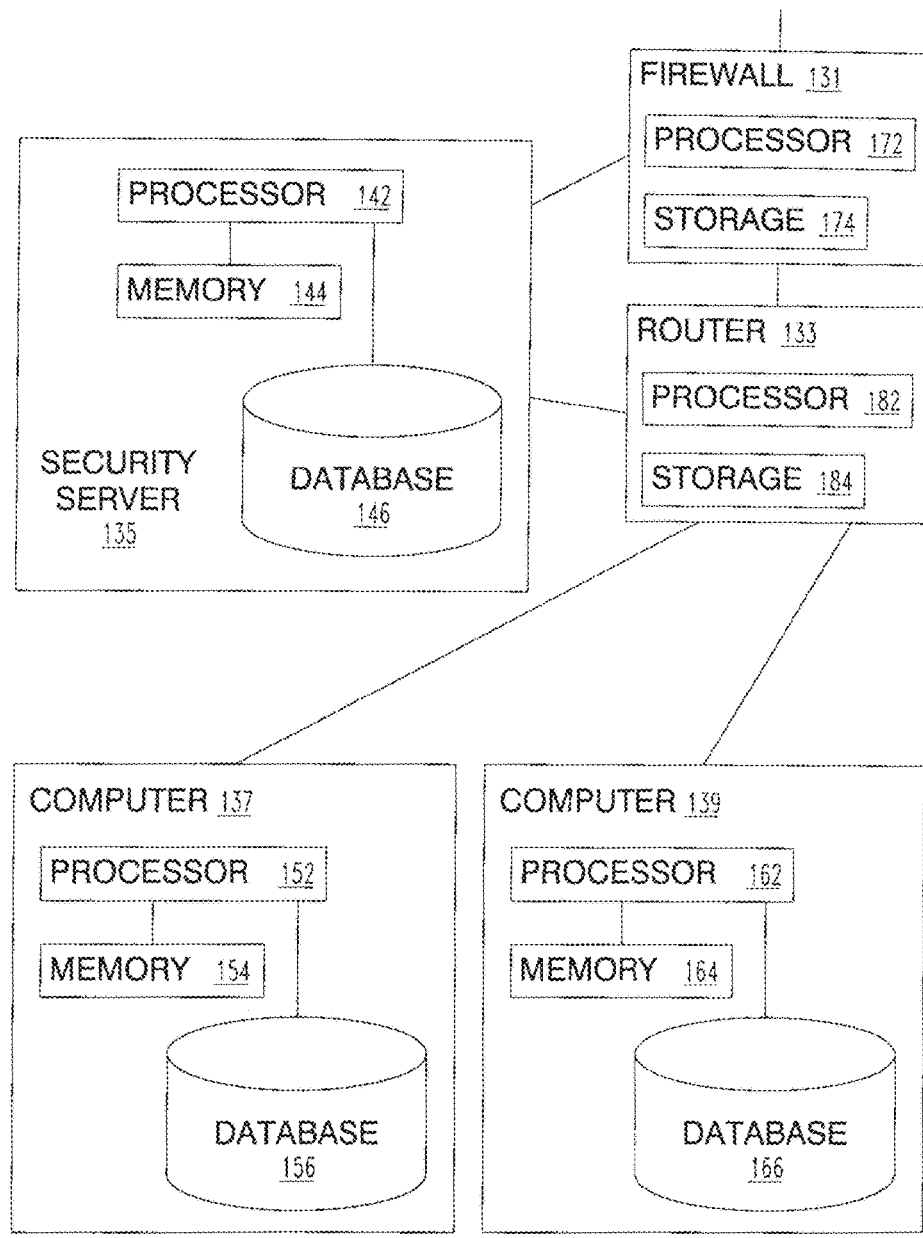
FIG. 2 is a block diagram showing components of several computing devices in the system of FIG. 1.

Turning to FIG. 2, one sees additional details and components of the devices in subnet 130. Computers 137 and 139 are traditional client or server machines, each having a processor 152, 162, memory 154, 164, and storage 156, 166. Firewall 131 and router 133 also have processors 172, 182 and storage 174, 184, respectively, as is known in the art. In this embodiment, devices 137 and 139 each execute a client-side program that continuously monitors the software installation and configuration status for that device. Changes to that status are communicated in substantially real time to security server 135, which continuously maintains the information in database 146. Security server 135 connects directly to firewall 131 and router 133 to obtain software installation and configuration status for those devices in the absence of a client-side program running thereon.

Processors 142, 152, 162 may each be comprised of one or more components configured as a single unit. Alternatively, when of a multi-component form, processor 142, 152, 162 may each have one or more components located remotely relative to the others. One or more components of processor 142, 152, 162 may be of the electronic variety defining digital circuitry, analog circuitry, or both. In one embodiment, processor 142, 152, 162 are of a conventional, integrated circuit microprocessor arrangement, such as one or more PENTIUM 4 or XEON processors from INTEL Corporation of 2200 Mission College Boulevard, Santa Clara, Calif., 95052, USA, or ATHLON XP processors from Advanced Micro Devices, One AMD Place, Sunnyvale, Calif., 94088, USA.

Memories 144, 154, 164 may include one or more types of solid-state electronic memory, magnetic memory, or optical memory, just to name a few. By way of non-limiting example, memory 40b may include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); an optical disc memory (such as a DVD or CD ROM); a magnetically encoded hard drive, floppy disk, tape, or cartridge media; or a combination of any of these memory types. Also, memories 144, 154, 164 may be volatile, nonvolatile, or a hybrid combination of volatile and nonvolatile varieties.

In this exemplary embodiment, storage 146, 156, 166 comprises one or more of the memory types just given for memories 144, 154, 164, preferably selected from the non-volatile types.

Figure 3:
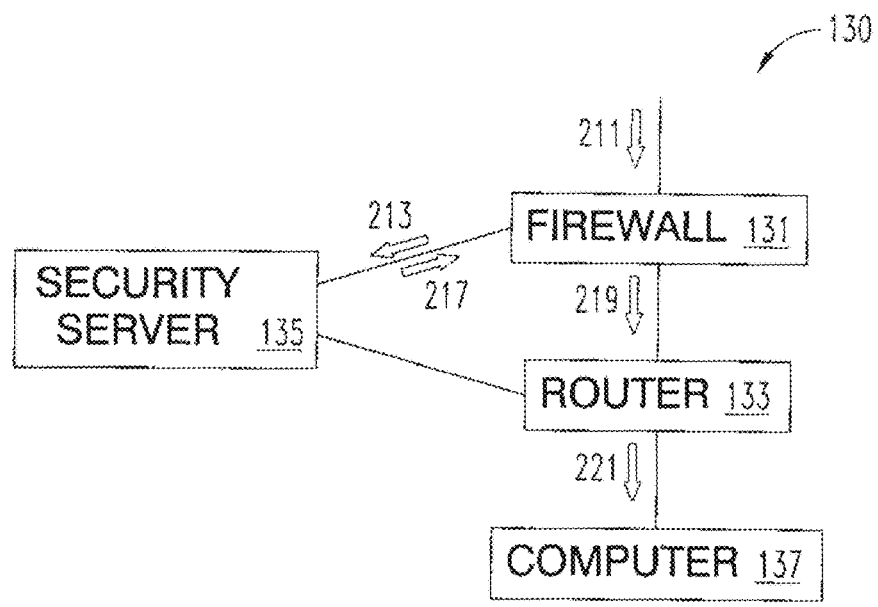
FIGS. 3 and 4 trace signals that travel through the system of FIGS. 1 and 2 and the present invention is applied to them.

This collection of information is used by system 100 in a wide variety of ways. With reference to FIG. 3, assume for example that a connection request 211 arrives at firewall 131 requesting that data be transferred to computer 137. The payload of request 211 is, in this example, a probe request for a worm that takes advantage of a particular security vulnerability in a certain computer operating system. Based on characteristics of the connection request 211, firewall 131 sends a query 213 to security server 135. Query 213 includes information that security server 135 uses to determine (1) the intended destination of connection request 211, and (2) some characterization of the payload of connection request 211, such as a vulnerability identifier. Security server 135 uses this information to determine whether connection request 211 is attempting to take advantage of a particular known vulnerability of destination machine 137, and uses information from database 146 (see FIG. 2) to determine whether the destination computer 137 has the vulnerable software installed, and whether the vulnerability has been patched on computer 137, or whether computer 137 has been configured so as to be invulnerable to a particular attack.

Security server 135 sends result signal 217 back to firewall 131 with an indication of whether the connection request should be granted or rejected. If it is to be granted, firewall 131 passes the request to router 133 as request 219, and router 133 relays the request as request 221 to computer 137, as is understood in the art. If, on the other hand, signal 217 indicates that connection request 211 is to be rejected, firewall 131 drops or rejects the connection request 211 as is understood in the art.

Figure 4:
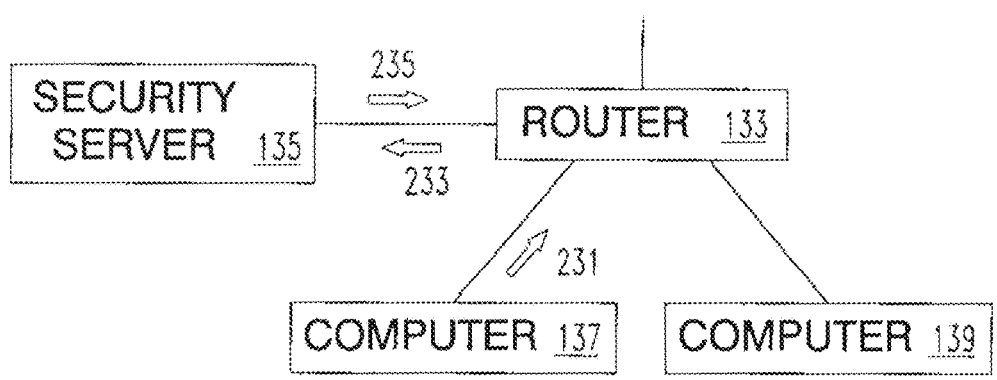

Analogous operation can protect computers within subnet 130 from compromised devices within subnet 130 as well. For example, FIG. 4 illustrates subnet 130 with computer 137 compromised. Under the control of a virus or worm, for example, computer 137 sends connection attempt 231 to router 133 in an attempt to probe or take advantage of a potential vulnerability in computer 139. On receiving connection request 231, router 133 sends relevant information about request 231 in a query 233 to security server 135. Similarly to the operation discussed above in relation to FIG. 3, security server 135 determines whether connection request 231 poses any threat, and in particular any threat to software on computer 139. If so, security server 135 determines whether the vulnerability has been patched, and if not, it determines whether computer 139 has been otherwise configured to avoid damage due to that vulnerability. Security server 135 replies with signal 235 to query 233 with that answer. Router 133 uses response 235 to determine whether to allow the connection attempt.

In some embodiments, upon a determination by security server 135 that a connection attempt or other attack has occurred against a computer that is vulnerable (based on its current software, patch, policy, and configuration status), security server 135 selects one or more remediation techniques from database 146 that remediate the particular vulnerability. Based on a prioritization previously selected by an administrator or the system designer, the remediation technique(s) are applied (1) to the machine that was attacked, (2) to all devices subject to the same vulnerability (based on their real-time software, patch, policy, and configuration status), or (3) to all devices to which the selected remediation can be applied.

In various embodiments, remediation techniques include the closing of open ports on the device; installation of a patch that is known to correct the vulnerability; changing the device's configuration; stopping, disabling, or removing services; setting or modifying policies; and the like. Furthermore, in various embodiments, events and actions are logged (preferably in a non-volatile medium) for later analysis and review by system administrators. In these embodiments, the log also stores information describing whether the target device was vulnerable to the attack.

A real-time status database according to the present invention has many other applications as well. In some embodiments, the database 146 is made available to an administrative console running on security server 135 or other administrative terminal. When a vulnerability is newly discovered in software that exists in subnet 130, administrators can immediately see whether any devices in subnet 130 are vulnerable to it, and if so, which ones. If a means of remediation of the vulnerability is known, the remediation can be selectively applied to only those devices subject to the vulnerability.

In some embodiments, the database 146 is integrated into another device, such as firewall 131 or router 133, or an individual device on the network. While some of these embodiments might avoid some failures due to network instability, they substantially increase the complexity of the device itself. For this reason, as well as the complexity of maintaining security database functions when integrated with other functions, the network-attached device embodiment described above in relation to FIGS. 1-4 is one possible embodiment.

In one embodiment, a software development kit (SDK) allows programmers to develop security applications that access the data collected in database 146. The applications developed with the SDK access information using a defined application programming interface (API) to retrieve vulnerability, remediation, and device status information available to the system. The applications then make security-related determinations and are enabled to take certain actions based on the available data.

In these exemplary systems, "configuration information" for each device may take the form of initialization files (often named *.ini or *.conf), configuration registry (such as, the Windows Registry on Microsoft WINDOWS operating systems), or configuration data held in volatile or non-volatile memory. Such configuration information often determines what and how data is accepted from other devices, sent to other devices, processed, stored, or otherwise handled, and in many cases determines what routines and sub-routines are executed in a particular application or operating system.

In one embodiment, security information management system is provided, wherein a database of potential vulnerabilities is maintained, along with data describing remediation techniques (patches, policy settings, and configuration options) available to protect against them. At least one vulnerability is associated in the database with multiple available remediation techniques. In one embodiment, the system presents a user with the list of remediation techniques available to protect against a known vulnerability, accepts the user's selection from the list, and executes the selected technique. In other embodiments, the system uses a predetermined prioritization schedule to automatically select among the available remediation techniques, then automatically executes the selected technique.

One embodiment of the present invention is a database of information about a plurality of devices, updated in real-time and used by an application to make a security-related decision. The database stores data indicating the installed operating system(s), installed software, patches that have been applied, system policies that are in place, and configuration information for each device. The database answers queries by one or more devices or applications attached by a network to facilitate security-related decision making. In one form of this embodiment, a firewall or router handles a connection request or maintenance of a connection based on the configuration information stored in the database that relates to one or both of the devices involved in the transmission.

In one embodiment, database 146 includes vulnerability and remediation information such that, for at least one vulnerability, multiple methods of remediating the vulnerability are specified. When the system has occasion to implement or offer remediation of a vulnerability, all known alternatives are presented that are relevant to the device or machine's particular configuration or setup. For example, when a vulnerability of a device is presented to an administrator, the administrator is given a choice among the plurality of remediation options to remediate the vulnerability. In some embodiments, the administrator can select a preferred type of remediation that will be applied if available and a fallback type. For example, an administrator may select application of a policy setting over installation of a software patch, so that the risk of disruption of critical business systems is minimized.

In other embodiments, an administrator or other user is presented with a set of user interface elements that identify multiple options for remediating and identifying the vulnerability. The administrator or user selects the method to be used, and that remediation is applied to the vulnerable device(s).

Figure 5A:
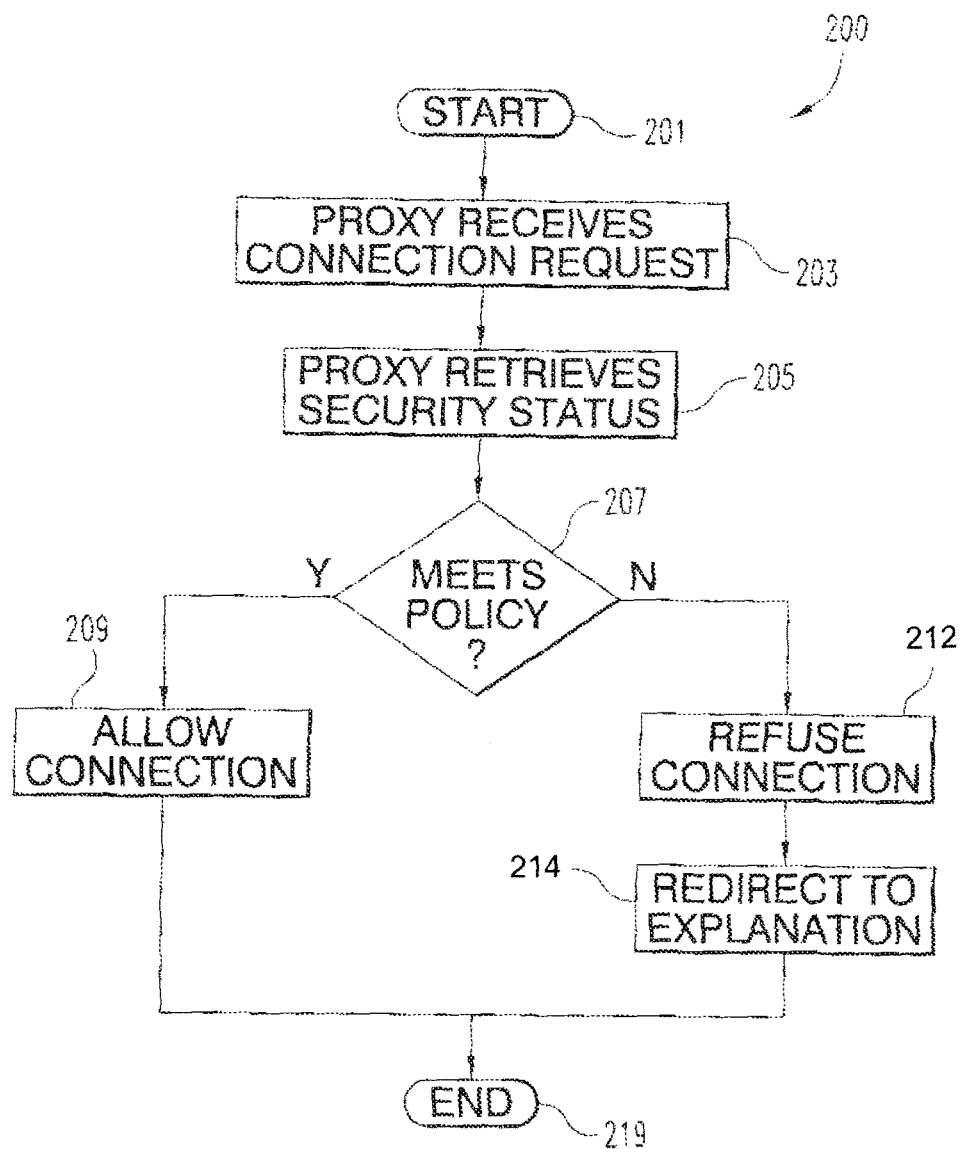
FIG. 5A is a flow chart of a filtering proxy method according to one embodiment of the present invention.

FIG. 5A is a flow chart of a filtering proxy method according to one embodiment of the present invention.

In use, a database maintains security status information on each device in a network, based on whether the device's operating system, software, and patches are installed and configured to meet a baseline level of security. A network gateway proxy blocks connection attempts from devices for which the database indicates a substandard security status, but allows connections from other devices to pass normally. The database is preferably updated on a substantially real-time basis by client-side software run by each device in the network.

Another form of the present embodiment includes a connection proxy that filters connections originating within the network. In particular, one embodiment employs a proxy that denies connection attempts originating with devices in the network when the originating device has a status, reflected in the database, that fails to meet predetermined security characteristics in terms of installed operating system and software, patch levels, and system policy and configuration registry information.

In this embodiment, router 133 serves as a connection proxy for devices and subnet 130, as will be understood by those skilled in the art. In addition to basic proxy functionality, however, router 133 accesses database 146 on security server 135 via the SDK at each connection attempt. If, for example, device 137 attempts to connect to any device where the connection must pass through the proxy server (router 133 in this example), such as a device on Internet 120, router 133 checks the security status of device 137 in database 146, using the real-time status therein to determine whether device 137 complies with one or more predetermined security policies. If it does, router 133 allows the connection to be made. If it does not, router 133 prevents the connection, preferably redirecting the connection to a diagnostic page that explains why the connection is not being made.

This system is illustrated by method 200 in FIG. 5A. Method 200 begins with start point 201. The proxy (router 133 in the above example) receives a connection request at block 203, then retrieves the security status of the source device at block 205. This preferably uses the real-time updated status information from database 146 (see FIG. 2) at decision block 207. If the security status indicates that the source device complies with the predetermined security policy, the proxy allows the connection at block 209. If not, the proxy refuses the connection at block 212 and redirects the connection to an explanation message (such as a locally generated web page or other message source) at block 214. In either case, method 200 ends at end point 219.

In possible embodiments, the determination and decision at block 207 apply a comprehensive minimum policy set that protects other devices in subnet 130 (see FIG. 1) from viruses, trojans, worms, and other malware that might be inadvertently and/or carelessly acquired due to the requested connection.

In another embodiment, a security information management system is provided, wherein client-side devices preferably collect and monitor information describing the operating system, software, and patches installed on the device(s), as well as configuration thereof. A database of this information is maintained, along with data describing vulnerabilities of available software and associated remediation techniques available for it. The system exposes an API to support security-related decisions by other applications. For example, an intrusion detection system (IDS) accesses the database to determine whether an actual threat exists and should be (or has been) blocked.

In another form of this embodiment, client software runs on each monitored device and reports configuration information to the database, so that the database has substantially real-time-current information.

The present embodiment of the present invention advantageously acquires the real-time status information from each client using client-side software. In this manner, a resource burden of monitoring is spread among the devices being monitored, and uses far fewer network resources in the process.

In these exemplary systems, "configuration information" for each device may take the form of initialization files (often named *.ini or *.conf), configuration registry (such as the Windows Registry on Microsoft Windows operating systems), or configuration data held in volatile or non-volatile memory. Such configuration information often determines what and how data is accepted from other devices, sent to other devices, processed, stored, or otherwise handled, and in many cases determines what routines and sub-routines are executed in a particular application or operating system.

In one embodiment, a system maintains a database of vulnerabilities and associated remediation techniques. The remediation techniques include software patches, policy settings or changes, and registry settings or changes. This multi-faceted provides novel flexibility in management of security issues, and convenience for security administrators in both determining available options and selecting remediation steps for vulnerable systems.

In another embodiment of the present invention, patches, policy changes, software updates, and configuration changes are rolled out to devices on a network using a staged roll-out technique. In this technique, the change is applied to a selected device or set of devices identified by an administrator. After a predetermined amount of time passes, unless the administrator has canceled the roll-out, the change is applied to an additional group of devices on the network. Third- and fourth-tier groups may also be identified by the administrator, where implementation of the remediation or upgrade is automatically effected in subsequent stages a predetermined amount of time after the preceding stage roll-out. Thus, if no failures are noted following a more limited roll-out (on a first set of devices), then the remediation or upgrade is automatically applied to other devices. If, on the other hand, an error or failure is observed, the subsequent roll-out can be canceled so that further failures and problems are avoided.

Figure 5B:
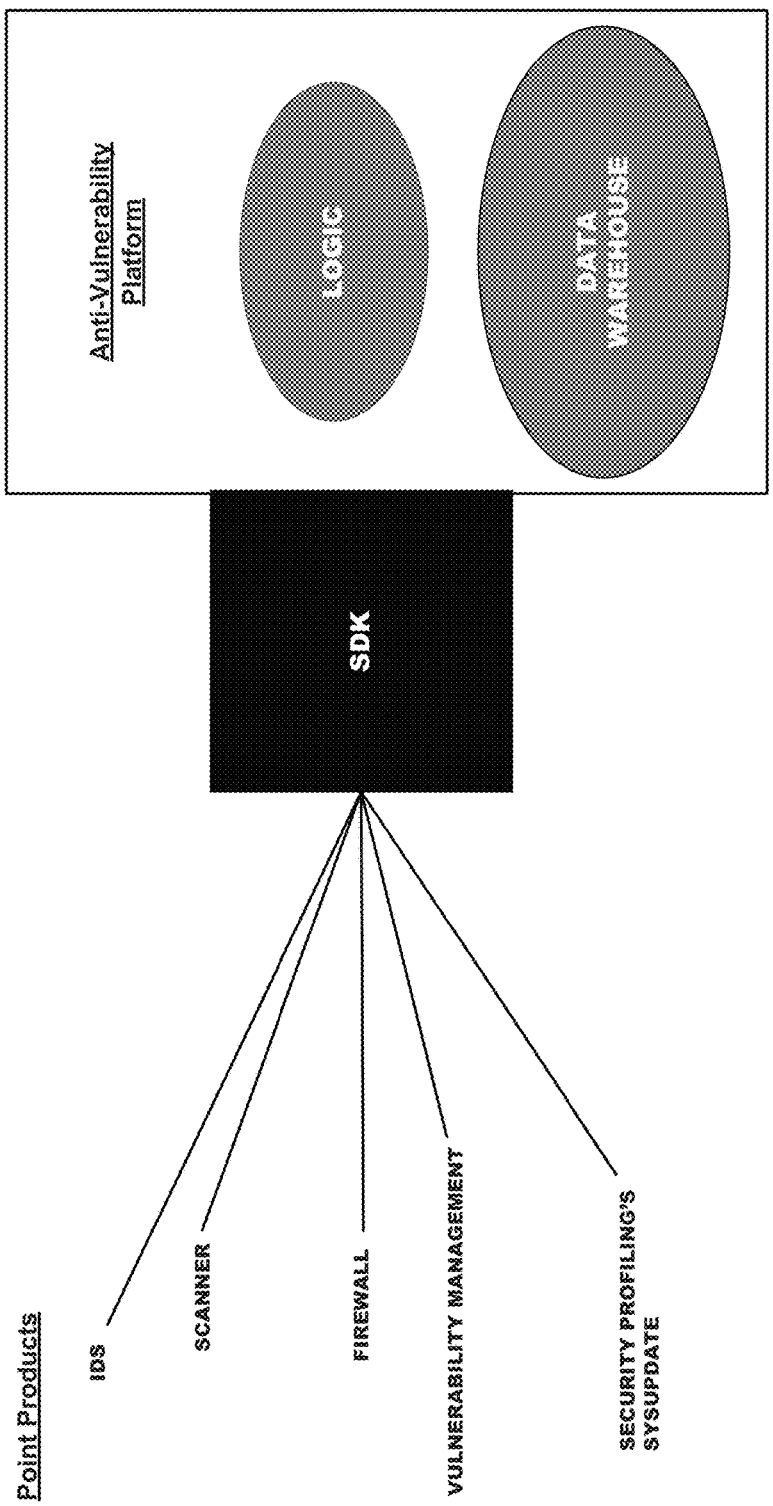
FIGS. 5B and 6 illustrate a platform, in accordance with possible embodiments.
Figure 6:
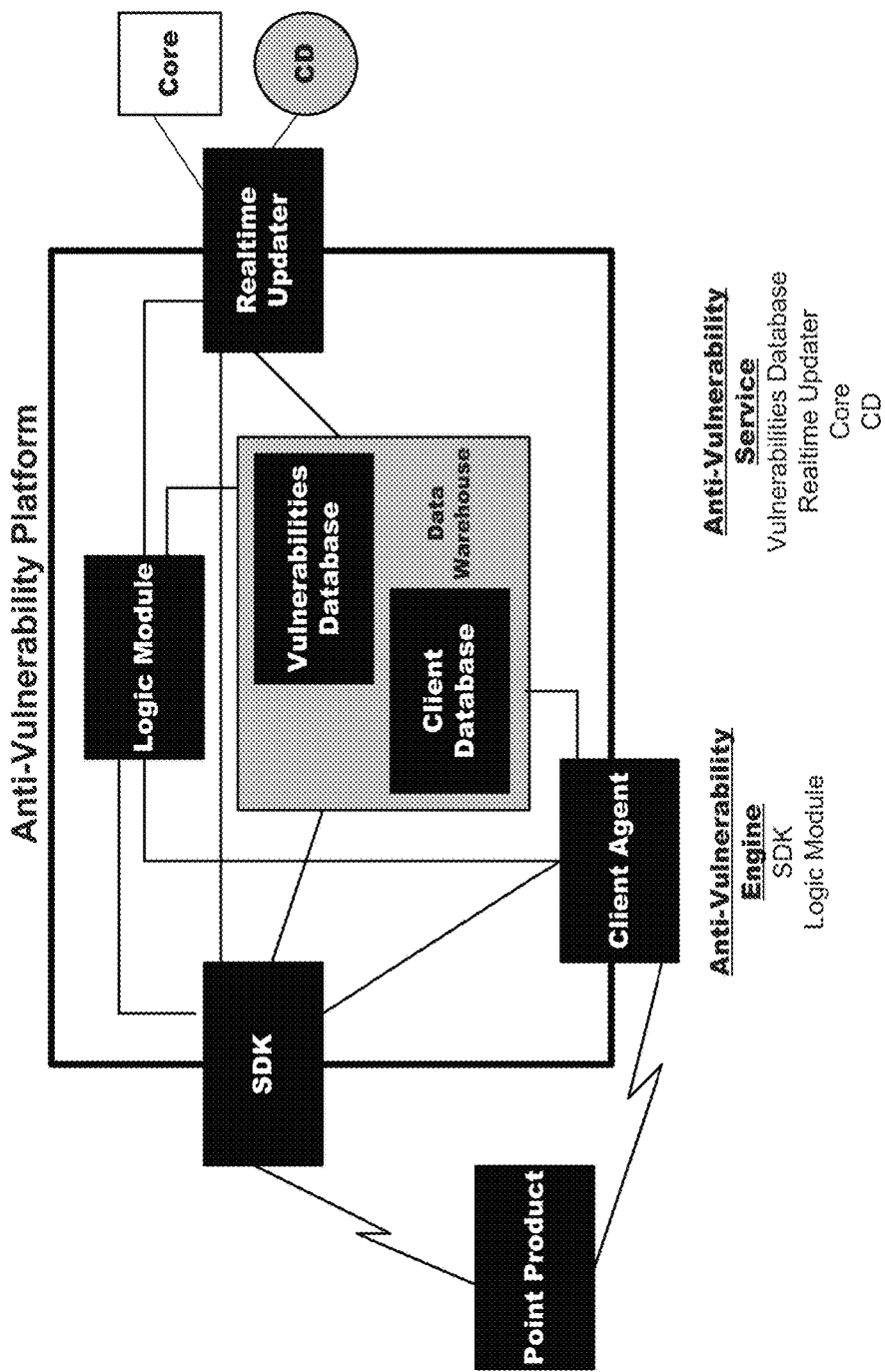

FIGS. 5B and 6 illustrate a platform, in accordance with possible embodiments.

In one possible embodiment, provided is a platform and underlying back end that includes a logic engine and vulnerability data warehouse. It may easily integrate with and enable network security products such as IDS, scanners, or firewalls to intelligently reference and share the same vulnerability data set, and independently provide complete vulnerability remediation (patching) functionalities such as that provided by the patch management and vulnerability remediation application. Thereby, the technology may improve system accuracy and efficiencies, minimize false positives and false negatives, and provide policy compliance and enforcement capabilities.

The latest network compromises are combining qualities of viruses, worms, and denial of service attacks into new blended attacks. Additionally, blended attacks may now utilize metamorphic or polymorphic abilities to change their signatures to avoid detection. To mitigate these new risks, organizations are now deploying a multi-tiered network defense strategy comprised of a variety of network security components layered at the perimeter and to internal network machines and devices. The security components are managed separately, and possibly their data is ported into a Security Information Management System (SIMS) correlation engine.

However, network security components and correlation engines rely on signatures or anomalies, producing an ever-increasing quantity of data, including false positive, benign, and erroneous events. They also lack the intelligence to identify, reference, or remediate the vulnerabilities targeted by the attack. Furthermore, the time and cost to acquire, manage, and maintain these numerous network security components is overwhelming the end user. Therefore, more sophisticated technology is provided to resolve these performance and management issues.

In one embodiment, technology may be provided that addresses these requirements by making each security component smarter and provides managers with remote remediation options. Thereby, improving system performance and streamlining management processes.

In one embodiment, an intelligent integration platform and SDK are provided to meet the above requirements.

In one embodiment, security products are enhanced and system intelligence may be provided. The same vulnerability data warehouse information is shared with the products so that more intelligent actions may then be taken to mitigate complex threats.

One embodiment cross-references the threat's identifier with the target's configuration. The threat's CVE ID, or other identifier, and the destination IP address are fed into the logic engine where it cross-references the threat with the machine's existing OS, application, and patch configuration profile. An answer is returned accurately indicating if the machine is vulnerable.

In one embodiment, network vulnerabilities are identified. The platform may independently identify which network machines and devices have vulnerabilities by querying a client agent, or a device's OS or firmware directly.

One embodiment proactively remediates the vulnerability. Once a vulnerability is identified, a remediation function may be provided that may remotely and automatically deploy the appropriate update to each machine or device, install it, and document it with change tracking and audit trail reports.

Examples of Anti-Vulnerability applications that may be integrated into network security products for enterprise and small office home office (SOHO) networks when integrated with one embodiment, via the SDK, will be described.

In one embodiment, update or patch deployment are provided, which remotely remediate network vulnerabilities and provide policy compliance and enforcement capabilities. And, for the consumer market, it may additionally support non-security related updates such as application version, performance, and bug-fix upgrades.

In one embodiment, an IDS may be provided that accurately determines if the targeted machine is actually vulnerable to an attack; virtually eliminates false positives and false negatives; and adds vulnerability remediation and policy compliance and enforcement functionalities.

In one embodiment, a scanner may be provided that virtually eliminates false positive and false negatives, and adds vulnerability remediation and policy compliance and enforcement functionalities.

In one embodiment, a firewall may be provided that virtually eliminates false positive and false negatives, preventing the security system from denying valid traffic to the organization—self-inflicted denial of service attacks—and adds vulnerability remediation, and policy compliance and enforcement functionalities.

In one embodiment, vulnerability management may be provided, as set forth above.

In one embodiment, multiple products are provided including an IDS, scanner, and firewall. Each may communicate with the same back-end data warehouse, sharing the same vulnerability information, attaining intelligence and more accurate information about the target and its vulnerabilities, thereby more effectively mitigating complex threats.

In one embodiment, change management may be provided, which may automatically create a change request in the system, specifying what update/patch is applicable to what system or groups of systems by vulnerability. After approval of the request, they may automatically deploy and install the update/patch. Finally, they may also verify correct operation after installation and automatically provide all necessary documentation and logging required.

Lastly, the platform may also provide product upgrades and signature updates to each of these various security products.

The platform is comprised of the following software components: SDK, client agent, logic engine, and data warehouse stored on a dedicated on-site server. Network operations center (NOC) Servers periodically synchronize the customers' servers with the latest vulnerability and update data. See FIG. 5B.

The same client agent and on-site server support all security applications that are integrated onto the platform, thereby providing the added anti-vulnerability functionalities presented in the previous section.

There are two system requirements: TCP/IP connectivity, and supported network machines and devices. In one embodiment, platforms supported are set forth below in Table 1.

TABLE 1

| All Windows Operating Systems and their applications |
| All UNIX variants |
| Cisco routers and firewalls |
| Toshiba network devices |
| Netgear network devices |
| Linksys network devices, including wireless access points |

Platform support is scalable to any network size or architecture; consumer, small office home office (SOHO), enterprise, and distributed networks.

In one embodiment, technology may be provided that includes a backend platform that includes a logic engine and vulnerability data warehouse. It may easily integrate with and enable network security products such as IDS, scanners, or firewalls to intelligently reference and share the same vulnerability data set, and independently provide complete vulnerability remediation (patching) functionalities such as that provided by the patch management and vulnerability remediation application, update application and the intelligent IDS. Thereby, the technology may improve system accuracy and efficiencies, minimize false positives and false negatives, and provide policy compliance and enforcement capabilities.

As shown in FIG. 5B, the technology may meet market requirements, presented in the next section.

For example, networks are probed at an ever-increasing frequency for vulnerabilities, which may be exploited with compromise attacks. To protect the network, administrators have traditionally set up perimeter defense strategies.

These strategies generally call for network managers to lock down core servers, and monitor/scan/filter all incoming and outgoing traffic at the network perimeter with several network security products such as antivirus and firewalls to identify and attempt to neutralize hackers and malicious code. In the past, these strategies worked well, however new threats are becoming more complex.

The latest malicious code may combine qualities of viruses, worms, and direct compromise attacks into new blended attacks. Virus payloads are becoming more complex and by using metamorphic or polymorphic abilities, viruses are able to change their signatures to avoid the fingerprint-type filtering that most applications employ.

To mitigate these new risks, organizations deploy a multi-tiered network defense strategy comprised of a variety of additional network security products layered at the perimeter and to internal network machines and devices. Such network security products include antivirus, firewall, scanners, and network and host based intrusion detection systems.

Each of these systems is based on specific signatures, rules, or anomalies of each attack and their variants, and do not identify and remediate the specific network vulnerabilities the attack is targeting. So each attack, and its variants, must be identified and analyzed, a signature prepared, then finally deployed to each point product on each customer's network. This process is uncoordinated among multiple disparate systems, and creates an ever-increasing number of signatures producing more and more attack alerts requiring immediate attention—many of which are erroneous. The security components are managed separately, and possibly their data is ported into a security information management system (SIMS) correlation engine.

Additionally, to proactively remediate the vulnerabilities the malicious code is targeting, administrators quickly and diligently update or "patch" each network machine and device, which is a time-consuming and costly process. Further compounding the burden on administrators, best practice and government compliance directives may require higher standards of network security and integrity to protect consumer privacy, and they are documented with change tracking and audit trail reports.

Therefore, it is increasingly difficult and costly to effectively mitigate new threats and manage numerous systems—particularly in an environment of rising security standards and policy compliance requirements.

Thus, the multi-tiered network defense strategy is falling short primarily for four reasons. First, there is an inability of multi-tiered network security products to communicate and share information necessary to mitigate blended threats, and minimize false positives and false negatives. The vulnerabilities targeted by malicious code are not accurately identified nor proactively remediated. The associated excessive aggregate cost of ownership of multiple systems. The excessive administrative burden and cost of managing and maintaining multiple systems.

Hence, there is a need to integrate systems, share information intelligently to better defend against blended threats, reduce management and cost requirements, and automate vulnerability identification and remediation functionalities, as presented in the high-level requirements.

In one embodiment, technology is provided to meet the following market requirements: integrate network security products to share information; provide system intelligence; and remediate network vulnerabilities.

In one embodiment, technology may integrate with and enable network security products to intelligently reference and share information from the same vulnerability data set, provide vulnerability identification and remediation functionalities, and efficiently meet policy compliance and enforcement requirements.

In one embodiment, the platform is a complimentary network security technology. When integrated into the defense strategy, it adds intelligence that more accurately and efficiently mitigates blended threats and offloads the time-consuming functions that burden network administrators.

In one embodiment, the platform enables network security products to share information via its proprietary logic engine to automatically cross-reference the threat identifier with the targeted machine's configuration to determine if it is actually vulnerable to that threat. Previously separate and uncoordinated processes are now more intelligent and automated, resulting in improved system accuracy and efficiency. Therefore the need to layer more and more point products and add a SIMS is reduced, in-turn decreasing the amount of data—particularly erroneous data—to manage. Subsequently, the costs to acquire, operate, and manage the additional multiple point products, and the need to implement a SIMS, are also reduced.

In one embodiment, the platform may also remotely and proactively remediate vulnerabilities by first determining which updates are needed and compatible with each machine or device, taking into account the OS, applications, or firmware installed. Then, the updates may be deployed, installed, and validated. Thereby, policy compliance is effectively and efficiently enforced, and documented.

In one embodiment, the present technology fulfills market requirements noted in the previous section. For example, it may integrate network security products and provides system intelligence. The same vulnerability data warehouse information is shared with all products so that more intelligent actions may then be taken to mitigate complex threats.

Still yet, it may cross-reference the threat's identifier with the target's configuration. The threat's CVE ID, or other identifier, and the destination IP address are fed into the logic engine where it cross-references the threat with the machine's existing OS, application, and patch configuration profile. An answer is returned accurately indicating if the machine is vulnerable. Thereby, minimizes erroneous, benign, and false positive data produced by each security product.

One embodiment identifies network vulnerabilities. The platform may independently identify which network machines and devices have vulnerabilities by querying a client agent, or a device's OS or firmware directly.

One embodiment proactively remediates the vulnerability. Once a vulnerability is identified, a remediation function may be provided that may remotely and automatically deploy the appropriate update to each machine or device, install it, and document it with change tracking and audit trail reports.

Various possible benefits include blended attacks being more effectively mitigated and the overwhelming management and maintenance burden on administrators to purchase, operate, and maintain multiple network security products being reduced, while increasing productivity, reducing costs, and more effectively and efficiently meeting policy compliance and enforcement requirements.

Table 2 illustrates a plurality of end user details.

TABLE 2

Supplements existing technology to better defend against blended attacks
Intelligently accesses the vulnerability data warehouse, and remediates vulnerabilities.
Offers policy compliance and enforcement functionality
Vulnerabilities may be automatically remediated, verified and documented, therefore enforcing compliance.
No additional software or hardware implementation costs
Anti-Vulnerability functionalities may be integrated into existing product platforms.
Reduces cost of ownership of multi network security products
Shared vulnerability data sets and added vulnerability remediation functionalities may reduce the number of network security products needed to adequately attain defense strategy requirements.
Reduces management and maintenance costs
Increased accuracy of vulnerability identification, remediation and policy enforcement, and reduction of false positives, false negatives and denial of service (DoS), significantly reduces management time and costs.
Manage more machines and devices on the network through one portal
Vulnerability remediation and policy compliance and enforcement may be integrated with existing security network security products, and their respective interfaces.
Minimize end user education/ absorntion costs
Anti-Vulnerability applications are transparently integrated, retaining pre-existing architecture, processes, and interfaces. Therefore, the end user experience remains the same, or improved with simplified or automated processes.
User experience remains the same - additional time or costs to understand and execute new technologies are minimized
Anti-Vulnerability applications may be integrated transparently and seamlessly, and the pre-existing operational processes and user interfaces are virtually unchanged.

TABLE 2-continued

Supports both the enterprise and SOHO networks
Data warehouse contains vulnerabilities and updates for many machines and devices that operate on both enterprise and SOHO networks.
Applications presented hereinafter Examples of applications that may be made available for enterprise and small office home office (SOHO) networks when integrated with Anti-Vulnerability technology via the SDK will now be set forth.

In one embodiment, update or patch deployment is provided. In one embodiment, a patch management and vulnerability remediation solution is provided. The technology enables products to add accurate vulnerability identification, remediation, verification, and policy compliance functions. With such technology, products may gain intelligence, accuracy and efficiency, eliminate false positives and false negatives, and ensure policy compliance, thereby saving the organization time and money. Such functionalities and benefits are available for both the enterprise and SOHO networks. And, for the consumer market, it may additionally support non-security related updates such as application version, performance, and bug-fix updates for widely distributed programs, which may optimize system performance and enhance the consumer experience.

In one embodiment, an IDS is provided. IDS products attempt to identify malicious code by signatures at both the network and host client level. While they may be able to identify malicious code by CVE ID or other identifier, and targeted machines by IP address, but they generally do not have the intelligence to determine if the any of the machines on the network are susceptible to that attack, or with finer granularity, if any machine has a specific vulnerability to that specific attack, or if the targeted vulnerability has already been patched. For example, if the malicious code has been written as a Windows based attack targeting a Windows vulnerability, is the Destination IP actually running Windows, or a UNIX variant? And, if Windows, is it vulnerable to the attack, or has it already been patched? IDS do not have the intelligence to answer these questions, and incident alerts are generated indiscriminately. Lastly, even if the targeted machine is vulnerable—it remains unremediated—an IDS does not have the capability to remediate it.

With the present embodiment, a product architect can integrate functionalities listed in the previous section to enable the IDS to access the Anti-Vulnerability logic engine and platform. It may then have the intelligence to determine if any machine on the network is susceptible to the attack, remediate the vulnerability, mitigate the attack, and verify policy compliance. Now, if no machines were susceptible to the attack, it is identified as an event but not an incident, no further data or alert is generated, and a management response is not required. Integrated products may gain intelligence, accuracy, and efficiency, eliminate false positives and false negatives, and ensure policy compliance, thereby saving the organization time and money. Such functionalities and benefits are available for both the enterprise and SOHO networks.

In one embodiment, scanners may be provided. Vulnerability scanners assess each machine on the network for vulnerabilities, and create lists of potential vulnerabilities to the system managers. The lists commonly contain many false positives and false negatives, burdening the system and managers with inaccuracies.

With the present embodiment, a product architect can integrate functionalities listed in the previous section to enable the scanner to access the logic engine and platform, and then have the intelligence to determine if the machine has actual vulnerabilities, remediate them, and verify policy compliance. Integrated products may gain intelligence, accuracy, and efficiency, eliminated false positives and false negatives, and ensured policy compliance, thereby saving the organization time and money.

In one embodiment, a firewall may be provided. "Smart" firewalls are based in part on signatures and other similar functionalities as the IDS products described above.

With the present embodiment, the firewall can determine whether an attack is valid or a false positive, thereby preventing the security system from denying valid traffic to the organization—self-inflicted DoS attacks. Such functionalities and benefits may be available for both the enterprise and SOHO networks.

In one embodiment, vulnerability management may be provided. Vulnerability management products enable managers to set policy and identify potential network vulnerabilities. They typically do not accurately identify each vulnerability on each network machine and device, nor remediate each vulnerability, meeting policy compliance enforcement requirements.

The present embodiment offers similar functionalities and benefits as the patch deployment products described above. In short, it enables products to add accurate vulnerability identification, remediation, verification, and policy compliance and enforcement. Such functionalities and benefits are available for both the enterprise and SOHO networks.

To this end, multiple products may be provided: IDS, scanner, firewall, and vulnerability management. Each product functions as the individual products noted above. Each may be deployed and operated on the network in a multi-tiered network defense strategy. They may be disparate system, and their signatures and update deployment schedules may vary. Therefore, the probability of mitigating a new and complex threat decreases, while management requirements and cost increases.

In one embodiment, they each may communicate with the same backend data warehouse, sharing the same vulnerability information, attaining intelligence and more accurate information about the target and its vulnerabilities, thereby more effectively mitigating complex threats. It may also enable the products to add accurate vulnerability identification, remediation, verification, and policy compliance and enforcement functionalities.

In one embodiment, change management (CM) may be provided. Existing CM applications control the documentation and logging of change throughout the enterprise. These applications ensure that an organization maintains consistent records of what happened and when. Currently administrators must independently recognize that a security patch/update must be deployed to a computer or group of computers.

The user enters the request in the system, through the pipelined process of change management the request would be approved, the patch/update would be manually installed by a user, then documented in the change management software that the process has been completed. While CM software assists in documentation, very little if any assistance may be provided to identify the patches/updates needed, nor verifying correct function after the update/patch is installed.

With the current possible embodiment, change management integration may greatly streamline this process further reducing total cost of ownership, ease of use, and a higher standard of documentation. The products may then automatically create a change request in the system, specifying what update/patch is applicable to what system or groups of systems by vulnerability. After approval of the request, they may automatically deploy and install the update/patch. Finally, they may also verify correct operation after installation and automatically provide all necessary documentation and logging required.

Lastly, one possible embodiment may also provide product upgrades and signature updates to each of these various security products—including all of the technology benefits such as ensuring compliance of signature versions, logging, reporting, and verification of installation.

Thus, one possible embodiment includes an intelligent platform that may supplement any existing defense strategy. Once integrated with the technology, security products may share the same vulnerability data set to improve automation and accuracy—increasing efficiencies and minimizing false positives and false negatives. It also enables remote identification, management, and remediation of network vulnerabilities, and provides update deployment, validation, and reporting capabilities. Thereby, the technology improves network security and integrity, mitigation of blended threats, while increasing productivity, reducing total cost ownership, and more effectively and efficiently attaining policy compliance and enforcement requirements.

One embodiment provides IDS intelligence, accuracy and remote patching functions—IDS data output integrated with the aforementioned platform via the SDK. The platform's underlying backend including a logic engine and vulnerability data warehouse provides the added functions and performance.

Conventional IDS produce an ever-increasing quantity of alert data, including erroneous and false positive data. They also lack the intelligence to identify or remediate the vulnerabilities targeted by the attack. Furthermore, the cost of the acquiring, managing, and maintaining conventional IDS is overwhelming the end user.

Therefore, a more sophisticated, intelligent technology is provided to resolve these issues. In one embodiment, an intelligent IDS is provided to meet market requirements. The alert data output from a distribution of Snort is integrated with the platform via the SDK, which may add the following functions.

In one embodiment, it cross-references the threat's identifier with the target's configuration. The CVE ID, or other identifier, and the Destination IP address are fed into the logic engine where it cross-references the threat with the machine's configuration profile.

In one embodiment, it virtually eliminates false positives and false negatives. The backend accurately determines in real time if the targeted machine is susceptible to the attack. And, if the machine is not susceptible, it is filtered and reported back as an event and not an incident. No further data or alert is generated, and a management response is not required.

In one embodiment, it remotely remediates the vulnerability. When a machine is identified as vulnerable to an attack, an incident, a remediation function may be provided to the administrator to remotely deploy the appropriate update to the machine or device, install it, verifies the files and hashes, and document it with change tracking and audit trail reports.

Table 3 sets forth a plurality of features.

TABLE 3

Supports Windows and UNIX variants
Determines if targeted machine is vulnerable to an attack in real time
Filters out erroneous, benign and false positive alerts
Remotely patches targeted vulnerabilities in one click
Installs in minutes To this end, erroneous, benign, and false positive data is filtered out, and incidents may be remotely remediated. Therefore, complex threats are more effectively and efficiently mitigated. Correspondingly, the management and maintenance burden on administrators is reduced, saving time and effort.

Figure 7:
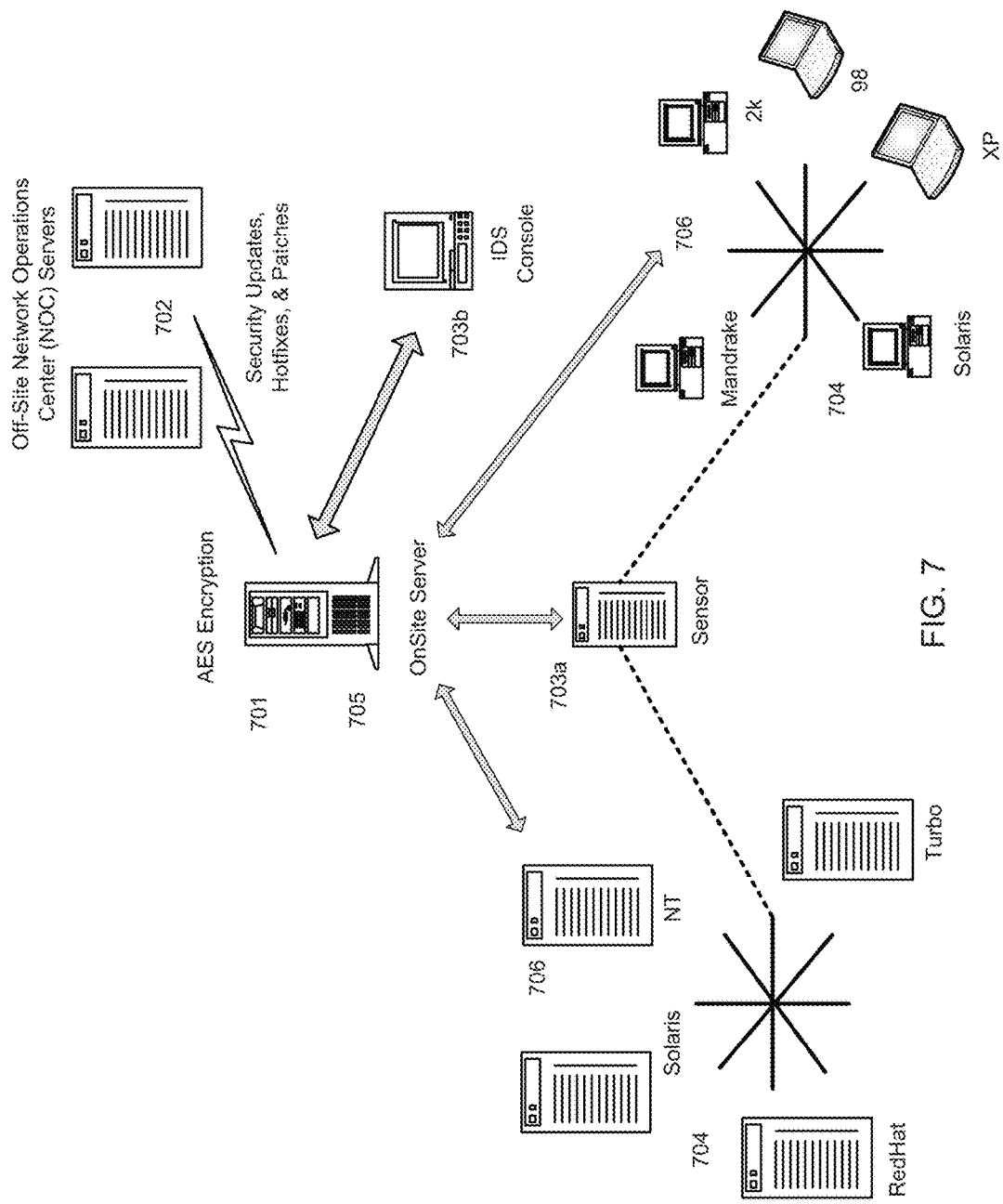
FIG. 7 illustrates an intelligent IDS, in accordance with one embodiment.

FIG. 7 illustrates an intelligent IDS, in accordance with one embodiment. As shown in 701, the on-site server periodically initiates communication with the NOC servers. In 702, updates are pulled from the NOC servers to the on-site server. In 703a, a sensor monitors and processes network traffic, and sends real time alert data to the on-site server where it cross-references the data with the backend. In 703b, centralized IDS console filters alerts; separating events from incidents. It also offers administrators remote patching function. In 704, agents are deployed to each client, accurately identifying which OS, apps, and updates are installed. In 705, the logic engine automatically determines which updates are needed to remediate the targeted machine. As shown in 706, appropriate updates are remotely deployed, installed, and validated on each client.

In one embodiment, the intelligent patch management and vulnerability remediation application automatically updates computer OS and application vulnerabilities before they can be exploited by hackers and viruses.

Networks are probed at an ever-increasing frequency for vulnerabilities, which may be exploited with directed compromise attacks. To protect the network, administrators must diligently update or "patch" server and workstation vulnerabilities, which is a time-consuming and costly process. Further compounding the burden on administrators, best practice and government compliance directives now require higher standards of network security to protect consumer privacy and proprietary data, which must be documented with change tracking and audit trail reports. Therefore, fully automated technology is provided to resolve these issues.

In one embodiment, a intelligent application called SysUpdate—the first technology to fully automate the updating and reporting processes, as described below.

In terms of function, one possible embodiment automatically researches updates. In collaboration with software development companies, it receives updates and their respective compatibility and installation guidelines, which are thoroughly reviewed and tested in a lab for system compatibility and stability. One embodiment automatically and securely downloads, and archives, all updates. Once the updates and guidelines are thoroughly reviewed and tested, they are automatically downloaded to each customer's on-site server, verified with MD5 hashes, and archived in a self-populating patch repository database.

One possible embodiment automatically determines the update and dependency requirements for all computers on a network, based on their individual operating systems, applications, and previously installed updates. The logic engine automatically matches the tested updates and their guidelines across each computer's configuration profile.

One possible embodiment remotely, securely, and automatically deploys updates to each computer and device. Updates may be tested on a test group, and then queued for release to each computer on the network, consistently in accordance with the policy determined by the network administrator.

One possible embodiment automatically verifies the updates are installed and running correctly. Each computer's client agent installs the updates, and verifies the files and hashes.

One possible embodiment automatically generates change tracking and audit trail reports. Change tracking and audit trail reports may be selected and printed from the management console reporting modules. Additionally, application license audit reports may be generated, which lists software installed on each machine, by license key.

Table 4 illustrates possible features in one embodiment.

TABLE 4

Figure 8:
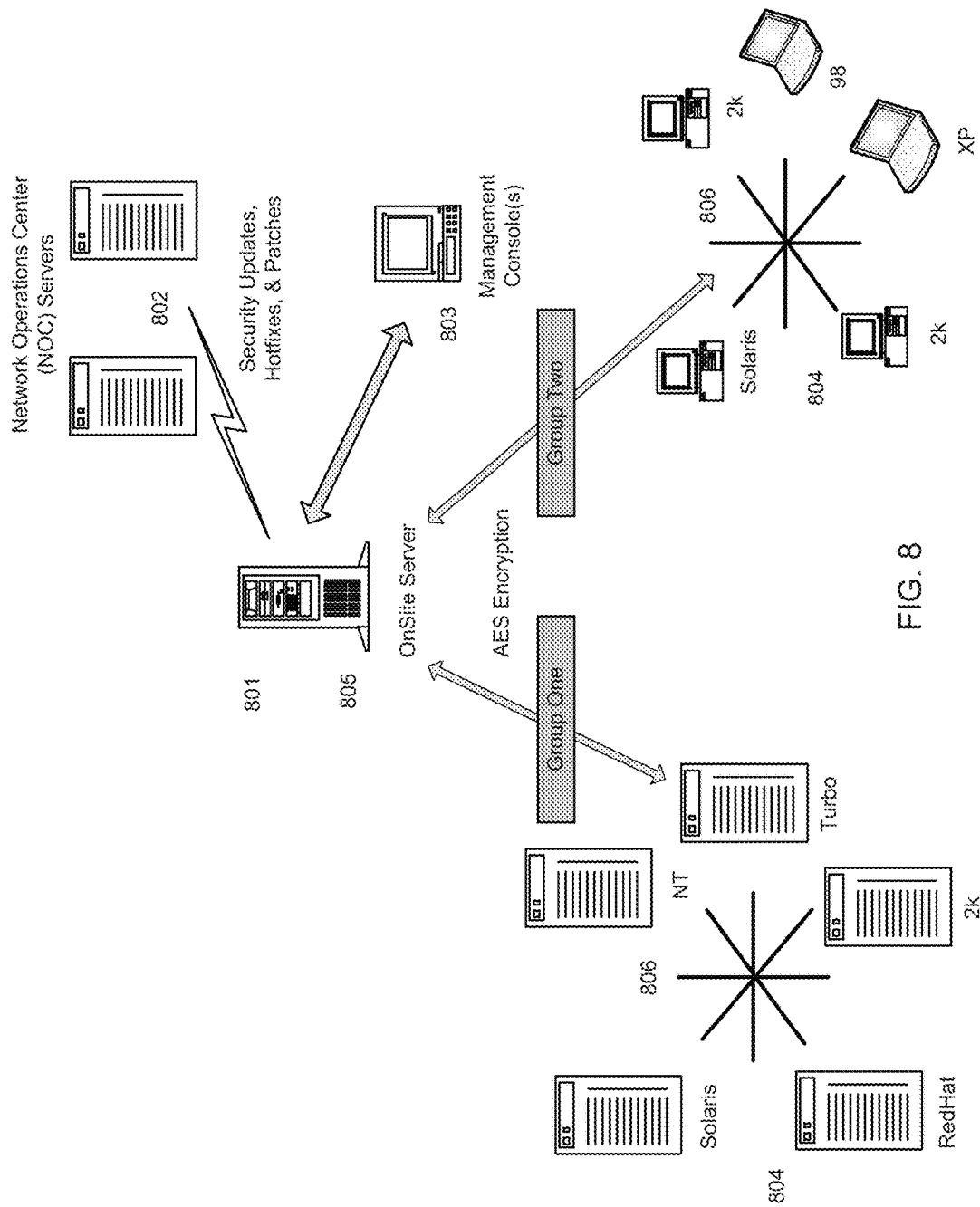
FIG. 8 illustrates an update system, in accordance with one embodiment.

Supports Windows, UNIX variants, and network devices
Supports non-Microsoft applications
Logic engine provides system intelligence
Files verified with SHA 1 or MD5 hashes
MMC snap-in console with Crystal Reports
AES encryption FIG. 8 illustrates an update system, in accordance with one embodiment. As shown in 801, the on-site server periodically initiates communication with the off-site NOC servers. In 802, updates are pulled from the NOC servers to the on-site server. In 803, the centralized MMC snap-in console offers flexible security policy options and comprehensive reporting capabilities. In 804, agents accurately identifies OS, apps, and updates installed on each client by file versions and hashes. In 805, logic engine automatically determines which updates are needed on each client, taking into account OS, app, and update dependencies. In 806, appropriate updates are automatically deployed, installed, and validated on each client.

In one embodiment, a secure computer log management application is provided with fully automated archiving, querying, and reporting options.

Best practice directives and government compliancy regulations now require administrators to archive log events over an extended period of time, and extensively document log and audit trail reports. With existing tools, these are time-consuming processes. Furthermore, existing tools transfer logs in clear text and are subject to malicious manipulation, and logs may be lost since few utilize guaranteed delivery protocols. Therefore, the integrity and security of the log data is not assured. In the event of an internal or external compromise, logs may be deleted, manipulated, or the network flooded with decoy log data.

The present possible embodiment automatically and continuously transfers logs from each computer into a self-configuring, self-populating, maintenance-free database where they may be archived for years on end. The transfer process utilizes AES encryption for authentication between the client and server, and a guarantee delivery protocol—ensuring no data is compromised or lost. Flexible cross-correlation queries may be run from a single, remote viewer console, and the data is then automatically formatted into reports.

In one embodiment, cross-correlation query type descriptions are provided. Such embodiment may provide the following three flexible cross-correlation queries in Table 5, which provide increasing detail and breadth of filtering/sorting capabilities, respectively.

TABLE 5

General Queries - This is the default query. It filters or sorts the logs of any one computer, by any one of the three log types.
Specific Queries - Detailed queries across all machines, and all log types.
Advanced Queries - Query across any combination of machines, by any combination of sources, events, and log types, over any period of time.

In one embodiment, features shown in Table 6 may be provided.

TABLE 6

Continuously pulls all logs into a central database, which may be archived for years on end
AES encryption and a guarantee delivery protocol ensure logs are not compromised or lost
Queries may be across any computer, for any log type, over any time frame
Automatically generates event log reports - ideal for documenting audit and compliance requirements
Easy download installation In one embodiment, automated reports may be provided. Query data is automatically formatted into professional reports Also, a separate reporting interface is available to generate general, machine, and user statistics. The present embodiment quickly and easily fulfills best practice and government compliance requirements for log event archiving and reporting.

Figure 9:
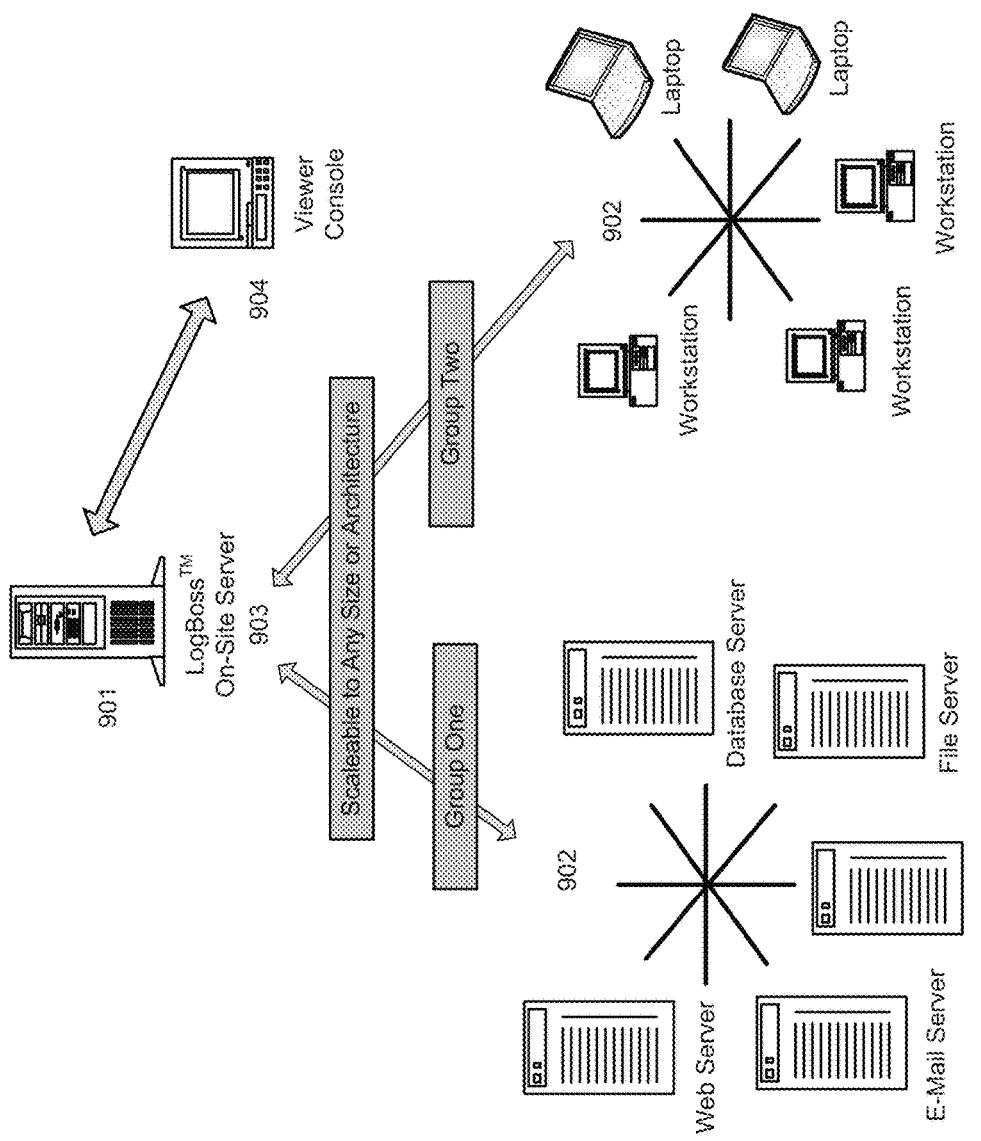
FIG. 9 shows a configured network, in accordance with one embodiment.

FIG. 9 shows a configured network, in accordance with one embodiment.

As shown in 901, the server component automatically configures the application, and the database and communicates with the client agents. In 902, client agents are deployed, which then identifies, manages, and continuously transfers all logs to the server. In 903, all client log data may be automatically archived the self-populating database, for years on end. In 904, from the centralized viewer, general, specific, or advanced cross-correlation queries may be run. See Table 7. Query and statistics data is automatically formatted into professional reports to easily document audit and compliance requirements.

TABLE 7

| Filter/Sort By: | General | Specific | Advanced |
| --- | --- | --- | --- |
| # of Computers | Any One | Any One | Any |
| # of Log Types | Any One | All | Any |
| Period of Time | Last or All | Last or All | Any |
| # of Event Detail Fields * | By ID Only | Any One | Any |

* Defined as Time/Date Written, UserID, ComputerID, EventID, Source, Type, and Category One possible embodiment provides best practice security policy templates to proactively and remotely manage and enforce enterprise security compliance policies.

Best practice and government compliance directives require higher standards of network security to protect consumer privacy and proprietary data, which must be consistently enforced, and documented with change tracking and audit trail reports for compliance verification. Therefore, a fully automated technology is provided to resolve these issues.

One embodiment offers an intelligent application to manage and enforce security policies—the first technology to fully automate the policy configuration, enforcement, and reporting processes, as described below.

In one embodiment, centralized, remote management is provided. The policy compliance and enforcement module is managed via the centralized management console—in MMC format, and automates the deployment, assessment, and enforcement of the policy chosen.

One embodiment provides standardized policies selected from many standardized policy templates recommended by NSA, SANS, US Navy, and ISO 17799, or custom policy options to formulate policies that meet the individual needs of any organization.

One possible embodiment automatically determines out-of-compliance parameters for all computers and devices on a network. Based on each client's individual policy parameter settings and configuration profile, the system's logic engine automatically reports back each client's out-of-compliance parameters.

In one embodiment, it remotely, securely, and automatically enforces policy to each computer or device. Policy changes may be automatically enforced to each computer or device individually, or by group, consistently in accordance with the policy selected by the network administrator. Policy configuration profiles are transmitted between client agent and server in an AES encrypted format for security and privacy. Policy options may be rolled back with one-click.

Automatically generates change tracking and audit trail reports. Change tracking and audit trail reports may be selected and printed from the Management Console's Reporting Center. Table 8 sets forth some possible features.

TABLE 8

Figure 10:
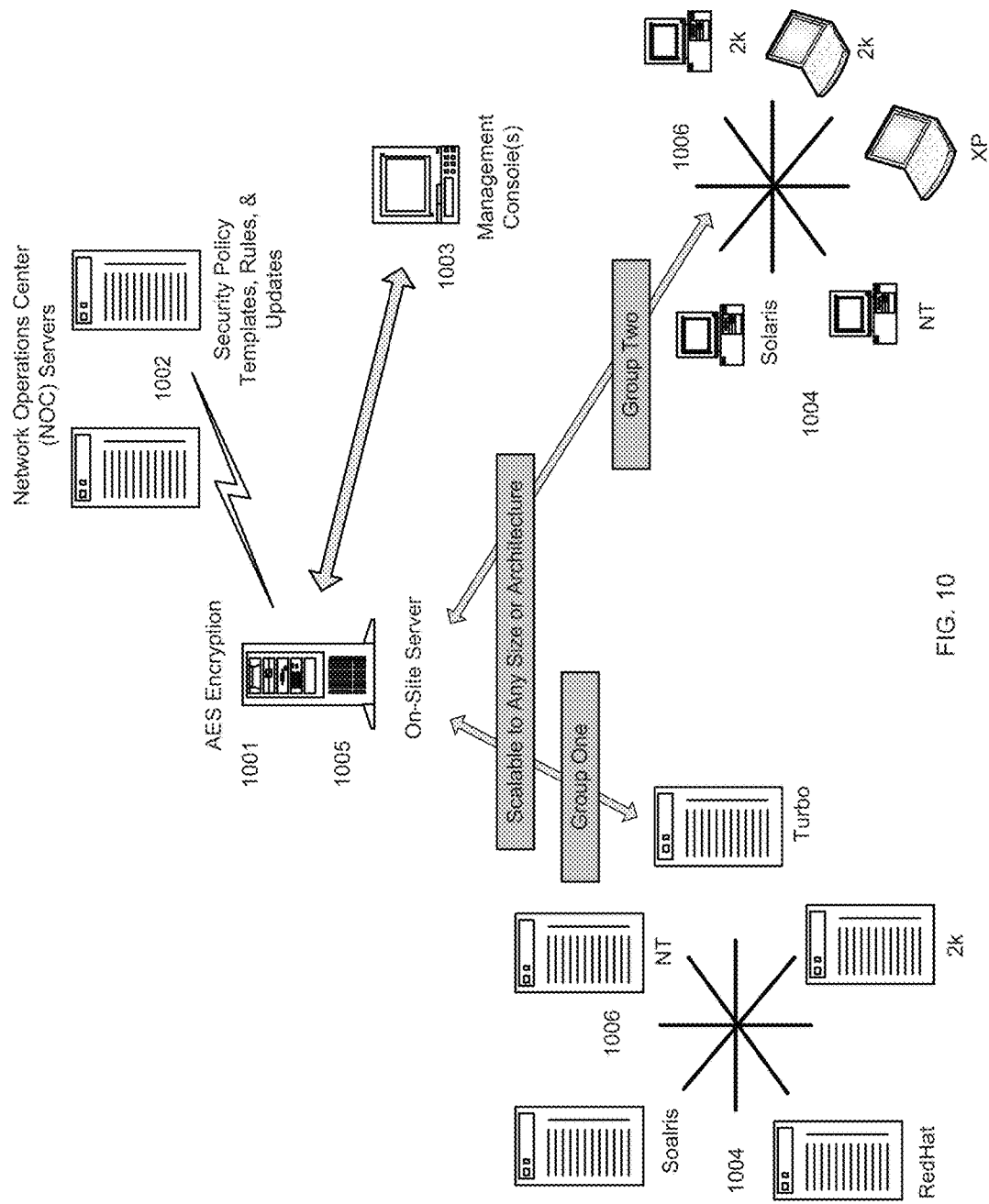
FIG. 10 shows policy compliance and enforcement, in accordance with one embodiment.

Supports Windows, UNIX variants, and network devices
Supports NSA, SANS, Navy, ISO 17799 and other standardized policies
Logic engine provides system intelligence
One-click policy rollback
Automatically generates change tracking and audit trail reports FIG. 10 shows policy compliance and enforcement, in accordance with one embodiment.

As shown in 1001, the on-site server periodically initiates communication with the off-site NOC servers. In 1002, templates, rules, and updates are pulled from the NOC servers to the on-site server. In 1003, a centralized management console offers flexible security policy templates, options, and comprehensive reporting capabilities. In 1004, agents are automatically deployed to each client, accurately identifying which policy parameters, OS, apps, and updates are applied or installed. In 1005, a logic engine automatically determines which clients are out of compliance. In 1006, appropriate policy changes are automatically enforced on each client.

In one embodiment an intelligent IPS may be provided that provides intelligence, accuracy, real-time prevention, and remote patching functions. In one embodiment, it accurately identifies and prevents malicious code from reaching their destination at the in-line IPS Sensor. Thereafter, a security officer may remotely patch the targeted vulnerability.

Conventional IDS/IPS produce an ever-increasing quantity of alert data, including erroneous and false positive data. They also lack the intelligence to identify or remediate the vulnerabilities targeted by the attack. Furthermore, the cost of the acquiring, managing, and maintaining conventional IPS is overwhelming the end user.

Therefore, a more sophisticated, intelligent technology is provided to resolve these issues, by offering an intelligent IPS to meet market requirements. The alert data output from a standard distribution of Snort is integrated with the platform via the SDK which accurately identifies attacks, and the attack is terminated at the in-line sensor—as described in the following functions.

One embodiment cross-references the threat's identifier with the target's configuration. The in-line Sensor monitors and processes traffic and sends alert data to the on-site server where its logic engine queries the backend in real-time to determine if the destination IP is vulnerable to the attack.

One possible embodiment provides enhanced flex response. If the destination IP is vulnerable to the attack, the in-line Sensor is commanded to immediately drop the exploit packets—preventing the attack. Further, it remotely remediates the vulnerability. When a machine is identified as vulnerable to an attack, an incident, a remediation function is also provided to the administrator to remotely deploy the appropriate update to the machine or device, install it, verifies the files and hashes, and documents it with change tracking and audit trail reports.

In one embodiment, attacks are accurately identified and mitigated before they reach their targets, and targeted vulnerabilities may be remotely remediated. Therefore, complex threats are more effectively and efficiently mitigated. Correspondingly, the management and maintenance burden on administrators is reduced, saving time and effort.

Table 9 illustrates some possible features.

TABLE 9

Figure 11:
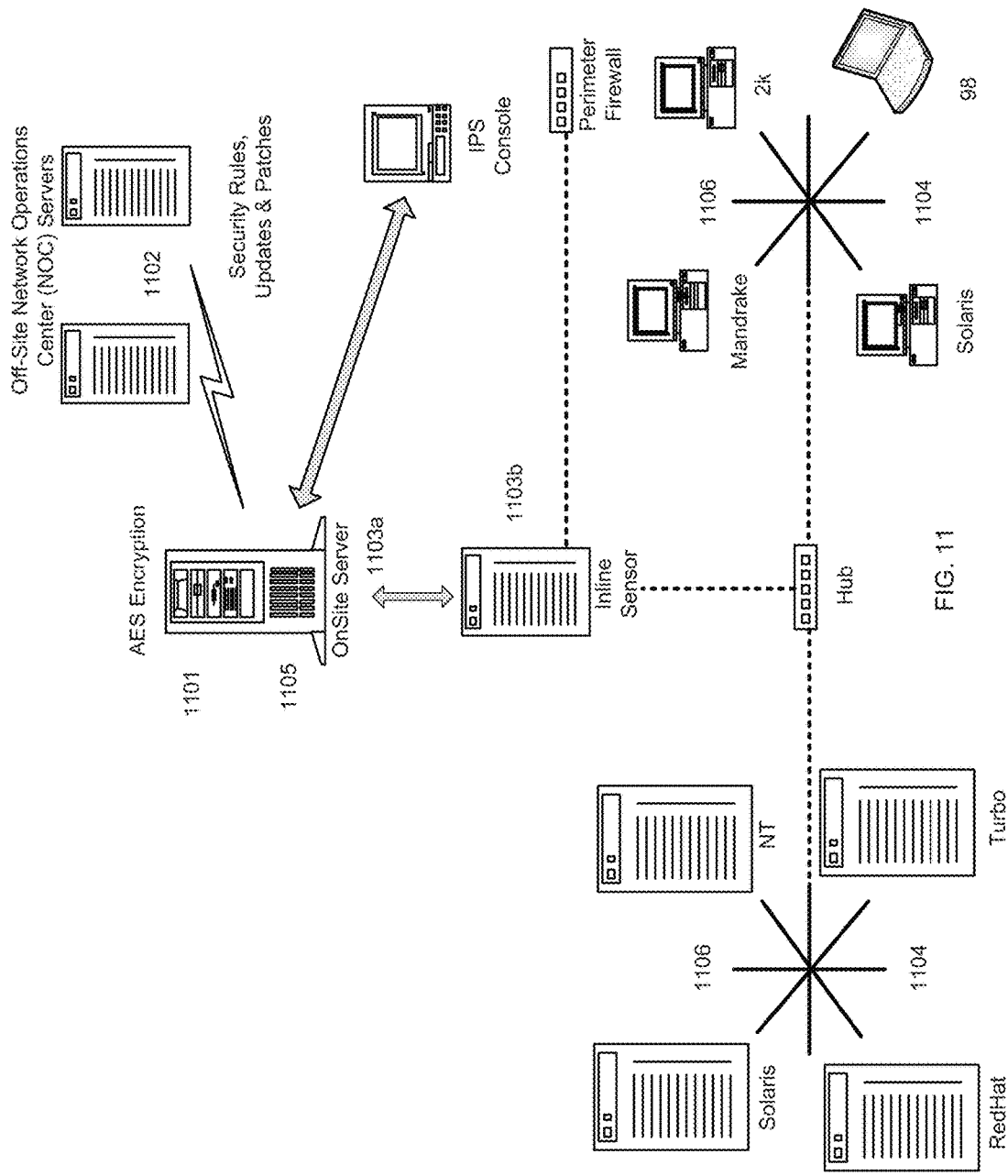
FIG. 11 illustrates an intelligent IPS, in accordance with one embodiment.

Supports Windows and UNIX variants
Determines in real-time if targeted machine is vulnerable to an attack, virtually eliminating false positives
in-line Sensor flex response terminates the attack
Remotely patches targeted vulnerabilities in one click
Installs in minutes FIG. 11 illustrates an intelligent IPS, in accordance with one embodiment.

As shown in 1101, the on-site server periodically initiates communication with the NOC servers. In 1102, updates are pulled from the NOC servers to the on-site server.

In 1103*a*, an IPS in-line sensor monitors and processes network traffic, and sends real time alert data to the on-site server where it cross-references the data with the backend. In 1103*b*, if the destination IP is vulnerable to the attack, the in-line Sensor is commanded in real-time to drop the malicious packets. As shown in 1104, agents are deployed to each client, accurately identifying which OS, apps, and updates are installed. In 1105, the logic engine automatically determines which updates are needed to remediate the targeted machine, and may be remotely deployed from the IPS console. In 1106, appropriate updates are remotely deployed, installed, and validated on each client.

In one embodiment, an anti-vulnerability SDK is provided. The SDK was designed to be a simple integration pathway to the Anti-Vulnerability platform backend. The SDK is documented and deliverable. The SDK is compatible with many different programming languages such as C, C++, VB, Java, and others.

The technology is sophisticated, yet all of the details of managing the communications are implemented in the library, requiring the developer to only learn a simple function calls as detailed hereinafter. A product architect chooses the functionality desired, inserts the provided functionality SDK code into the product code. The SDK code may then query—via the logic engine—the data warehouse, and in turn may return an answer to the point product. The architect can then show the results in any format desired in the product's interface. Full vulnerability remediation and policy compliance and enforcement functionalities may be integrated as well.

Figure 12:
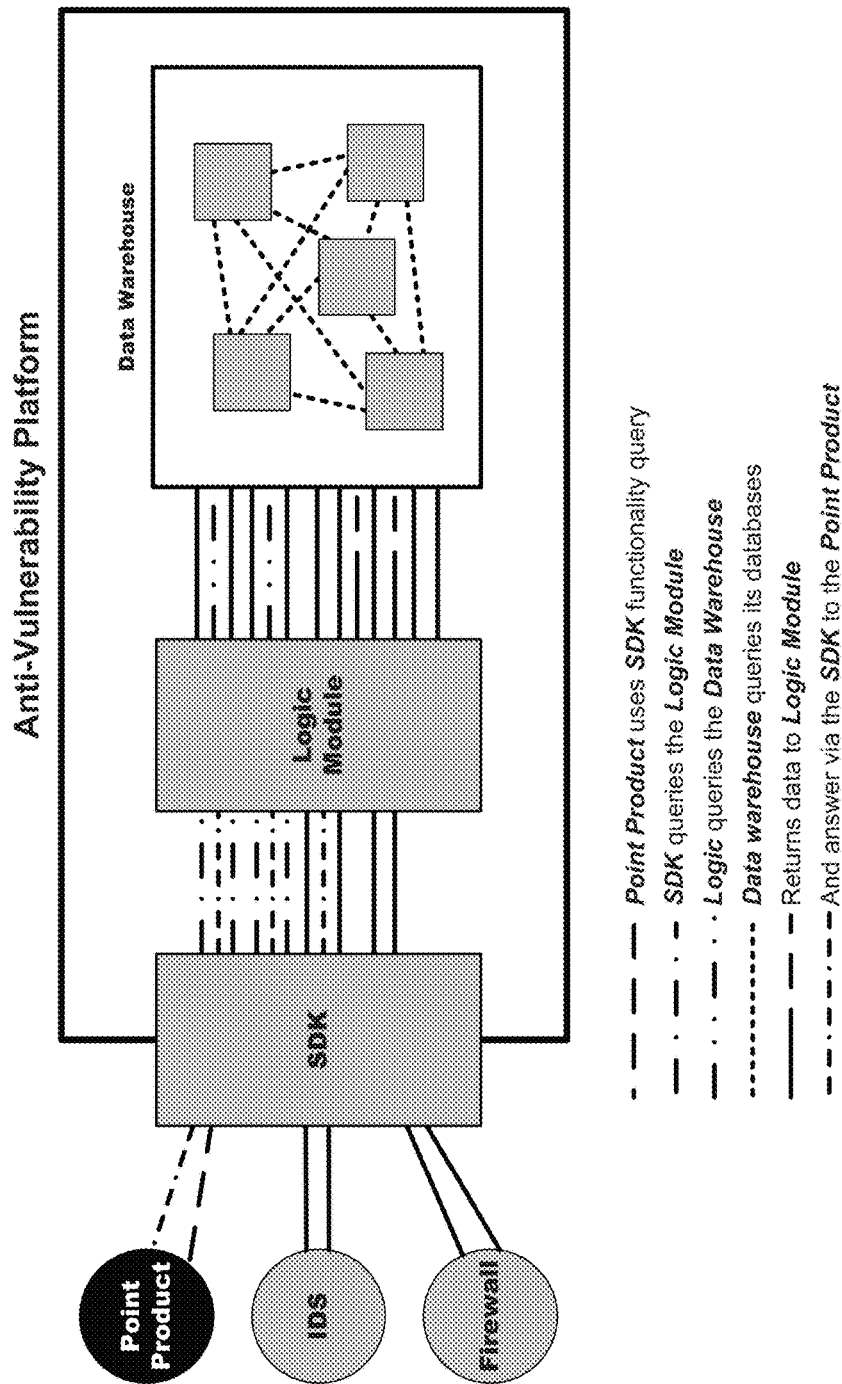
FIG. 12 illustrates an SDK function call flow, in accordance with one embodiment.

FIG. 12 illustrates an SDK function call flow, in accordance with one embodiment.

Hence, the SDK serves as the architect's tool belt or building blocks needed to quickly and transparently access the Anti-Vulnerability backend and seamlessly integrate the desired functionality into the product without changing or complicating the end user experience.

Furthermore, the SDK enables system architects to use the Anti-Vulnerability platform to integrate multiple security products and functionalities. Products may then share the same vulnerability data set, improve system automation and accuracy—increasing efficiencies and minimizing false positives and false negatives, and coordinate policy compliance and enforcement functionalities.

Anti-Vulnerability functions that are accessible via the SDK. The functions are presented in groups, as follows in Table 10.

TABLE 10

Session Management
Group Management Functions
Client Management Functions
Patch Management Functions
Polling Functions
User Management Functions
Miscellaneous Functions
Policy Compliance Functions
Session Management Functions Table 11 sets forth Session Management Functions

TABLE 11

OpenSession-Parameters: HOST name or IP address, LOGIN and PASSWORD for host
Returns: new SESSION
Description: This function opens a new session to the OnSite Server
CloseSession-Parameters: SESSION to close
Returns: None
Description: Closes a session that is no longer needed
IsSessionGood-Parameters: SESSION to test
Returns: TRUE or FALSE
Description: returns TRUE if the session is still valid FALSE if it is not
SUGetLastError-Parameters: None
Returns: Error code of last error in the thread
Description: Returns the error code of the last SDK error to occur in this thread
SUSetLastError-Parameters: ERROR code to set
Returns: None
Description: Sets the error code for the thread to be returned by SUGetLastError
GetSDKVersion-Parameters: None
Returns: a WORD containing the version of the SDK
Description: the MSB of the returned value is the major version number, the LSB is the minor version number
Ping-Parameters: SESSION to use, VALUE to ping with
Returns: VALUE on success 0 on failure
Description: attempts to pass VALUE to the OnSite Server, which should pass it back.

Table 12 sets forth Group Management Functions.

TABLE 12

CreateGroup-Parameters: Group NAME and Description
Returns: GROUP that was just created or 0 on failure
Description: This function creates a new group with the provided name and Description
GetGroups-Parameters: None
Returns: A LIST of GROUPs.
Description: This function Returns a list of all configured groups.
GetGroupsEx-Parameters: None
Returns: A LIST of GROUPINFO structures
Description: This function Returns a list of all configured groups' information
DeleteGroup-Parameters: GROUP to be deleted.
Returns: Success or failure
Description: This function permanently removes a group.
EditGroup-Parameters: GROUP to be edited, GROUPINFO to be applied
Returns: Success or failure
Description: This function changes a GROUP's information
GetGroupPolicyOSCategories-Parameters: GROUP to get information about
Returns: A LIST of OPERATINGSYSYTEMCATEGORYs that have group policies
configured
Description: This function retrieves a list of operating system categories that have
group policies configured
GetGroupPolicyOSSubCategories-Parameters: GROUP to get information about,
OPERATINGSYSTEMCATEGORY to get sub category information about
Returns: A LIST of OPERATINGSYSTEMSUBCATEGORYs
Description: This function retrieves a list of operating system sub-categories of
OPERATINGSYSTEMCATEGORY that have policies for the GROUP
GetGroupPolicyInfo-Parameters: GROUPPOLICY to get information about,
GROUPPOLICYINFO pointer to receive the information
Returns: Success or Failure
Description: This function fills the passed GROUPPOLICYINFO structure with the
information for the GROUPPOLICY
GetGroupPolicyInfoByOSCat-Parameters: GROUP to get information about,
OPERATINGSYSTEMCATEGORY to get the policy for, GROUPPOLICYINFO
pointer to receive the information
Returns: Success or failure
Description: This function retrieves the information for a policy for the
OPERATINGSYSTEMCATEGORY in the GROUP
GetGroupPolicyInfoByOSSubCat-Parameters: GROUP to get information about,
OPERATINGSYSTEMSUBCATEGORY to get the policy for, GROUPPOLICYINFO
pointer to receive the information
Returns: Success or failure
Description: This function retrieves the information for a policy for the
OPERATINGSYSTEMSUBCATEGORY in the GROUP
DeleteGroupPolicy-Parameters: GROUPPOLICY to delete
Returns: Success or failure
Description: This function permanently deletes the GROUPPOLICY
EditGroupPolicy-Parameters: GROUPPOLICYINFO with new information
Returns: Success or failure
Description: This function updates the group policy (contained in
GROUPPOLICYINFO) with the information in GROUPPOLICYINFO
AddGroupPolicy-Parameters: GROUP to add the policy to, GROUPPOLICYINFO
containg the policy information
Returns: Success or Failure
Description: This function creates a new group policy and applies it to the GROUP
GetClientsInGroup-Parameters: GROUP to retrieve the clients from
Returns: LIST of CLIENTs belonging to the group
Description: This function retrieves a list of clients that are members of a specific
group
GetClientsInGroupEx-Parameters: GROUP to retrieve the clients from
Returns: LIST of CLIENTINFOs for clients belonging to the group
Description: This function Returns a list of CLIENTINFO structures containing
information for the clients that belong to this group
AddClientToGroup-Parameters: CLIENT to add to a group, GROUP to add the client to.
Returns: Success or failure
Description: This function adds a client to a group
RemoveClientFromGroup-Parameters: CLIENT to remove from group, GROUP to
remove the client from
Returns: Success or failure.
Description: This function removes a client from a group.
MoveClientToGroup-Parameters: CLIENT to move, GROUP to move client to
Returns: Success or Failure
Description: This function moves CLIENT to GROUP
GetUngroupedClients-Parameters: None
Returns: LIST of ungrouped clients
Description: This function Returns a LIST of the clients that do not belong to any
group
GetUngroupedClientsEx-Parameters: None
Returns: LIST of CLIENTINFO structures
Description: This function Returns a LIST of CLIENTINFO structures for the clients TABLE 12-continued that do not belong to any group
GetGroupInfo-Parameters: GROUP to get information about, GROUPINFO pointer to
receive the information
Returns: Success or failure
Description: This function retrieves the information for the GROUP Table 13 sets forth Client Management Functions.

TABLE 13

GetClientInstalledSoftware-Parameters: CLIENT to get information about
Returns: LIST of SOFTWARE installed on the client
Description: This function retrieves a list of the software that has been detected on the
client
GetClientInstalledSoftwareEx-Parameters: CLIENT to get information about
Returns: LIST of SOFTWAREINFO for software installed on the client
Description: This function returns a LIST of SOFTWAREINFO structures describing
the software detected on the client
GetClientInstalledPatches-Parameters: CLIENT to get information from.
Returns: LIST of PATCHes corresponding to the installed patches on the client
Description: This function retrieves a list of patches that were verified as installed on
the last polling
GetClientInstalledPatchesEx-Parameters: CLIENT to get information from
Returns: LIST of PATCHINFO structures corresponding to the installed patches on the
client
Description: This function retrieves a LIST of PATCHINFO structures for patches that
were verified as installed on the last polling
GetClientPendingPatches-Parameters: CLIENT to get information from.
Returns: LIST of PATCHes corresponding to the pending patches for the client
Description: This function returns a list of patches that the client needs (according to
group policy) as of the last polling.
GetClientPendingPatchesEx-Parameters: CLIENT to get information from
Returns: A LIST of PATCHINFO structures corresponding to the pending patches for
the client
Description: This function returns a LIST of PATCHINFO structures for patches that
the client needs (according to group policy) as of the last polling.
GetClientPendingServicePack-Parameters: CLIENT to get information from
Returns: SERVICEPACK if a service pack is pending or 0 if not
Description: This function returns a SERVICEPACK if there is a service pack pending
for the client (according to group policy) as of the last polling. If there is no service
pack pending it returns 0
GetClientPendingSoftware -Parameters: CLIENT to get information from
Returns: LIST of SOFTWARE that is pending
Description: This function returns a list of software that is pending for the client
(according to group policy) as of the last polling
GetClientLogs-Parameters: CLIENT to get information from
Returns: LIST of LOGs for the client.
Description: This function returns a list of logs for a particular client.
GetClientLogsEx-Parameters: CLIENT to get information from
Returns: LIST of LOGINFO structures
Description: This function returns a list of LOGINFO structures containing log entries
for a particular client.
DeleteClient-Parameters: CLIENT to delete.
Returns: Success or failure.
Description: This function removes all information pertaining to this client from the
SysUpdate database.
GetClientOS-Parameters: CLIENT to get information from
Returns: OPERATINGSYSTEM installed on client
Description: This function returns the OPERATINGSYSTEM installed on the client
GetClientServicePack-Parameters: CLIENT to get information from
Returns: SERVICEPACK installed on client or 0
Description: This function returns the service pack installed on the client or 0 if the
client does not have a service pack installed, or if service packs are not applicable to the
client's platform
GetClientInfo-Parameters: CLIENT to get information from CLIENTINFO pointer to
receive the information
Returns: Success or failure
Description: This function fills the passed CLIENTINFO structure with information
pertaining to the passed CLIENT
GetClientFromIP-Parameters: IP address of client
Returns: CLIENT that corresponds to the passed IP address
Description: This function maps IP addresses to clients Table 14 sets forth Patch Management Functions.

TABLE 14

GetPatchInfo-Parameters: PATCH to get information about, PATCHINFO pointer to receive information
Returns: Success or failure
Description: This function fills the passed patch info structure with information about the passed patch
InstallPatchForClient-Parameters: CLIENT to install the patch on, PATCH to install
Returns: Success or failure
Description: This function deploys the patch to the client. Installation proceeds asynchronously
InstallPatchForGroup-Parameters: GROUP to install the patch on, PATCH to install
Returns: Success or failure
Description: This function deploys the patch to all clients in the group
InstallAllPendingForClient-Parameters: CLIENT to install patches on
Returns: Success or failure
Description: This function deploys all pending patches for a client to the client
InstallAllPendingForGroup-Parameters: GROUP to install patches on
Returns: Success or failure
Description: This function deploys all pending patches to all clients in a group
RejectPatchForClient-Parameters: CLIENT to reject patch for, PATCH to reject
Returns: Success or failure
Description: This function rejects a patch for a client. This patch will not be queued down or installed
RejectPatchForGroup-Parameters: GROUP to reject patch for, PATCH to reject
Returns: Success or failure
Description: This function rejects a patch for every client in a group. This patch will not be queued down or installed
RequeuePatchForClient-Parameters: CLIENT to requeue the patch for, PATCH to requeue
Returns: Success or failure
Description: This function requeues a previously rejected patch for a client
RequeuePatchForGroup-Parameters: GROUP to requeue the patch for, PATCH to requeue
Returns: Success or failure
Description: This function requeues a previously rejected patch for every client in a group
RemovePatchFromClient-Parameters: CLIENT to remove patch from, PATCH to remove
Returns: Success or failure
Description: This function will uninstall a patch from a client
RemovePatchFromGroup-Parameters: GROUP to remove patch from, PATCH to remove
Returns: Success or failure
Description: This function will uninstall a patch for every client in a group
InstallServicePackForClient-Parameters: CLIENT to install service pack on, SERVICEPACK to install on client
Returns: Success or failure
Description: This function will install a service pack on a client
InstallServicePackForGroup-Parameters: GROUP to install service pack on, SERVICEPACK to install
Returns: Success or failure
Description: This function will install a service pack on every client in a group
InstallSoftwareForClient-Parameters: CLIENT to install software update on, SOFTWARE to install
Returns: Success or failure
Description: This function will install a software update on a client
InstallSoftwareForGroup-Parameters: GROUP to install software update on, SOFTWARE to install
Returns: Success or failure
Description: This function will install a software update on every client in a group.
GetCveIDsFromPatch -Parameters: PATCH to get CveIDs from
Returns: A LIST of CVEIDs
Description: This function returns a list of CVEIDs the correspond to the PATCH Table 15 sets forth Polling Functions.

TABLE 15

PollClient-Parameters: CLIENT to poll
Returns: Success or failure.
Description: This function causes a client to be polled by the OnSite Server immediately.
PollGroup-Parameters: GROUP to poll
Returns: Success or failure.
Description: This function causes all the clients in a particular group to be polled immediately.
PollAll-Parameters: NONE
Returns: Success or failure.
Description: This function causes all clients to be polled immediately.

Table 16 sets forth User Management Functions.

TABLE 16

GetUsers-Parameters: None
Returns: A LIST of USERs
Description: This function returns a list of all users for the system
GetUserInfo-Parameters: USER to get information about, USERINFO pointer to receive the information
Returns: Success or failure
Description: This function populates the passed USERINFO structure with information about the passed USER
GetUserGroupPrivileges-Parameters: USER to get information about
Returns: A LIST of USERGROUPPRIVILEGEs
Description: This function returns a LIST of USERGROUPPRIVILEGES representing the privileges that a particular user has
GetUserGroupPrivilegesEx-Parameters: USER to get information about
Returns: A LIST of USERGROUPPRIVILEGEINFO structures
Description: This function returns a LIST of USERGROUPPRIVILEGEINFO structures representing the privileges that a particular user has
GetUserGroupPrivilegeInfo-Parameters: USERGROUPPRIVILEGE to get information about, USERGROUPPRIVILEGEINFO pointer to receive information
Returns: Success or failure
Description: This function populates the passed USERGROUPPRIVILEGEINFO structure with the details of the particular privilege
GetUserGroupPrivilegeInfoByGroup-Parameters: USER to get information about, GROUP to get information for, USERGROUPPRIVILEGEINFO pointer to populate
Returns: Success or Failure
Description: This function populates the passed USERGROUPPRIVILEGEINFO structure with the detailed information regarding the permissions that the passed user has on the passed group
AddUserGroupPrivilege-Parameters: USERGROUPPRIVILEGEINFO structure to add
Returns: Success or failure
Description: This function adds a USERGROUPPRIVILEGE
EditUserGroupPrivilege-Parameters: USERGROUPPRIVILEGEINFO with new values
Returns: Success or failure
Description: This function edits the USERGROUPPRIVILEGEINFO structure passed in, assign it the new values
DeleteUserGroupPrivilege-Parameters: USERGROUPPRIVILEGE to delete
Returns: Success or failure
Description: This function deletes the passed USERGROUPPRIVILEGE from the system
AddUser-Parameters: USERNAME, PASSWORD, and USERTYPE
Returns: USER representing the user that was just created
Description: This function creates a new user with the provided username, password, and type, and returns a USER representing the new user or 0 in the case of an error
DeleteUser-Parameters: USER to delete
Returns: Success or failure
Description: This function permanently deletes the USER from the system along with any privileges the user may have had
ChangeUserPassword-Parameters: USER to change password for, new PASSWORD
Returns: Success or failure
Description: This function changes the password for a user
ChangeUserRole-Parameters: USER to change role, ROLE to change to
Returns: Success or failure
Description: This Function changes a user's role
GetUserFromName-Parameters: USERNAME
Returns: USER corresponding to the passed user name
Description: This function provides a mapping from user names to USERs Table 17 sets forth Miscellaneous Functions.

TABLE 17

CreateList-Parameters: None
Returns: A new, empty, LIST
Description: This functions creates a new LIST that is initially empty
GetListItemEx-Parameters: LIST to retrieve item from, INDEX of item to retrieve, VOID pointer to receive item
Returns: Success or failure
Description: This function populates the memory pointed to by VOID with the contents of the LIST item at INDEX
GetListSize-Parameters: LIST to get the size of
Returns: the size of the LIST
Description: This function returns the number of elements currently in the list
AddItemToList-pointer to LIST to add the item to, LONG item to add
Returns: None
Description: This function adds an "item" (such as a GROUP or a CLIENT) to a LIST
AddClientInfoExToList-See AddItemToList
AddGroupInfoToList-See AddItemToList

TABLE 17-continued

AddPatchInfoExToList-See AddItemToList
AddSoftwareInfoToList-See AddItemToList
AddSoftwareCategoryInfoToList-See AddItemToList
AddUserGroupPrivilegeInfoExToList-See AddItemToList
RemoveItemFromList-Parameters: pointer to LIST to remove the item from, INDEX of item to remove
Returns: None
Description: This function removes the item at INDEX from the LIST
FreeList-LIST to deallocate
Returns: None
Description: This function deallocates the resources used by LIST
GetSoftwareInfo-Parameters: SOFTWARE to get information for, SOFTWAREINFO pointer to hold the information
Returns: Success or failure
Description: This function populates the SOFTWAREINFO structure pointed at with information regarding the SOFTWARE
GetLogInfo-Parameters: LOG to get information about, LOGINFO pointer to contain the information
Returns: Success or failure
Description: This function populates the LOGINFO structure pointed at with information regarding the LOG
GetSoftwareCategories-Parameters: None
Returns: A LIST of SOFTWARECATEGORYs
Description: This function returns a LIST of SOFTWARECATEGORYs
GetSoftwareCategoriesEx-Parameters: None
Returns: A LIST of SOFTWARECATEGORYINFO structures
Description: This function returns LIST of SOFTWARECATEGORYINFO structures for every software category known on the system
GetSoftwareCategoriesForOperatingSystemCategory-Parameters: an OPERATINGSYSTEMCATEGORY to get information for
Returns: A LIST of SOFTWARECATEGORYs
Description: This function returns a LIST of software categories for the passed operating system category.
GetSoftwareCategoriesForOperatingSystemCategoryEx-As above only, returning the appropriate "info9" structures in the list
GetSoftwareCategoryInfo-Parameters: SOFTWARECATEGORY to get information for, SOFT WARECATEGORYIFNO pointer to contain the information
Returns: Success or failure Table 18 sets forth Policy Compliance Functions.

These functions are provided in a separate source tree (policy tree) for the Policy Compliance and Enforcement module. Function include: Password/system access policies, log configurations, audit settings, user/group privilege rights, general service settings, service permissions, registry values, registry permissions, file permissions. It can also perform deltas on and get information about: groups, users, services, and all the "Run" registry keys.

The function calls are being integrated into the live production tree and subject to change.

TABLE 18

GetPolicyItemInfo-As GetOperatingSystemInfo for POLICYITEM and POLICYITEMINFO
InstallPolicyItemForClient-As InstallPatchForClient for POLICYITEM
InstallPolicyItemForGroup-As InstallPatchForGroup for POLICYITEM
InstallAllPendingPolicyItemsForClient-As InstallAllPendingPatchesForClient for POLICYITEM
InstallAllPendingPolicyItemsForGroup-As InstallAllPendingPatchesForGroup for POLICYITEM
RemovePolicyItemFromClient-As RemovePatchForClient for POLICYITEM
RemovePolicyItemFromGroup-As RemovePatchFromGroup for POLICYITEM All publications, prior applications, and other documents cited herein are hereby incorporated by reference in their entirety as if each had been individually incorporated by reference and fully set forth.

While the invention has been illustrated and described in detail in the drawings and foregoing description, the same is to be considered as illustrative and not restrictive in character, it being understood that only the preferred embodiments have been shown and described and that all changes and modifications that would occur to one skilled in the relevant art are desired to be protected.

The invention claimed is:

1. An apparatus, comprising:
an intrusion prevention system;
said intrusion prevention system:
receives a result of at least one operation performed on at least one of a plurality of networked devices; the at least one operation based on first information from at least one first data storage identifying a plurality of existent vulnerabilities including at least one first existent vulnerability and at least one second existent vulnerability, the at least one operation configured for:
identifying at least one configuration associated with the at least one networked device, and
associating the at least one networked device with at least one particular vulnerability, based on the identified at least one configuration and the first information from the at least one first data storage identifying the plurality of existent vulnerabilities, such that second information associated with the result is stored, the second information relating to the association between the at least one particular vulnerability and the at least one networked device;

causes to display, via at least one user interface, a plurality of techniques including a first technique for utilizing an intrusion prevention system component for occurrence mitigation, and a second technique for utilizing a firewall for occurrence mitigation;

allows receipt of:
  user input causing selection of the first technique for utilizing the intrusion prevention system component for occurrence mitigation;
  user input causing selection of the second technique for utilizing the firewall for occurrence mitigation;

applies, based on the user input causing selection of the first technique for utilizing the intrusion prevention system component for occurrence mitigation, the first technique for utilizing the intrusion prevention system component for occurrence mitigation;

applies, based on the user input causing selection of the second technique for utilizing the firewall for occurrence mitigation, the second technique for utilizing the firewall for occurrence mitigation;

identifies:
  for the at least one networked device, a first occurrence including at least one first occurrence packet, and
  for the at least one networked device; a second occurrence including at least one second occurrence packet;

determines:
  that the first occurrence including the at least one first occurrence packet directed to the at least one networked device is capable of taking advantage of the at least one particular vulnerability associated with the at least one networked device;
  that the second occurrence including the at least one second occurrence packet directed to the at least one networked device is not capable of taking advantage of the at least one particular vulnerability; and causes a reaction to at least the first occurrence based on the determination that the first occurrence including the at least one first occurrence packet is capable of taking advantage of the at least one particular vulnerability associated with the at least one networked device.

2. The apparatus of claim 1, wherein the intrusion prevention system includes integrated intrusion prevention functionality for supporting the first technique and firewall functionality for supporting the second technique, such that the intrusion prevention functionality and the firewall functionality are both supported by a security component of the intrusion prevention system that in turn supports at least one aspect of the determination that the first occurrence including the at least one first occurrence packet directed to the at least one networked device is capable of taking advantage of the at least one particular vulnerability associated with the at least one networked device, the intrusion prevention system further including logic that receives the second information and utilizes the second information to conditionally cause the display of, as a function of the at least one particular vulnerability, one or more of the plurality of techniques to allow selective utilization of the intrusion prevention functionality and the firewall functionality, so that only relevant techniques are displayed for selection to reduce false positives in connection with both the intrusion prevention functionality and the firewall functionality.

3. The apparatus of claim 1, wherein the intrusion prevention system includes integrated intrusion prevention functionality for supporting the first technique and firewall functionality for supporting the second technique, such that the intrusion prevention functionality and the firewall functionality are both supported by a security component of the intrusion prevention system that in turn supports at least one aspect of the determination that the first occurrence including the at least one first occurrence packet directed to the at least one networked device is capable of taking advantage of the at least one particular vulnerability associated with the at least one networked device, the intrusion prevention system further including logic that receives particular vulnerability information and utilizes the particular vulnerability information to relevantly cause the display of, as a function of one or more particular vulnerabilities identified utilizing the particular vulnerability information, multiple of the plurality of techniques to allow selective utilization of the intrusion prevention functionality and the firewall functionality.

4. The apparatus of claim 1, wherein the intrusion prevention system is configured such that different user selections are capable of being received for different devices, for allowing different techniques including the first technique and the second technique to be selectively applied to the different devices for different particular vulnerabilities, such that the different user selections are capable of resulting in: only the first technique being selectively applied to at least one first device, only the second technique being selectively applied to at least one second device, and both the first technique and the second technique being selectively applied to at least one third device.

5. The apparatus of claim 1, wherein the intrusion prevention system is configured such that the first technique is automatically applied utilizing a first communication, and the second technique is automatically applied utilizing a second communication; wherein the intrusion prevention system includes intrusion prevention functionality for supporting the first technique and firewall functionality for supporting the second technique, the intrusion prevention system further configured to receive the second information to conditionally cause display of, as a function of an existence of the at least one particular vulnerability, the plurality of techniques to allow selective utilization of the intrusion prevention functionality and the firewall functionality, so that only relevant techniques are caused to be displayed to reduce false positives in connection with both the intrusion prevention functionality and the firewall functionality; wherein the apparatus is further configured such that different user selections are capable of being received for different devices, for allowing different techniques including the first technique and the second technique to be selectively applied to the different devices for different particular vulnerabilities, such that the different user selections are capable of resulting in: only the first technique being selectively applied to at least one first device, only the second technique being selectively applied to at least one second device, and both the first technique and the second technique being selectively applied to at least one third device.

6. An apparatus, comprising:
  at least one platform;
  an intrusion prevention system configured and communicatively coupled with the at least one platform;
  a firewall configured and communicatively coupled with the at least one platform;
  at least one first data storage configured and communicatively coupled with the at least one platform; and said at least one platform:
  receives a result of at least one operation in connection with at least one of a plurality of networked devices, the at least one operation based on first information from the at least one first data storage identifying a plurality of existent vulnerabilities including at least one first existent vulnerability and at least one second existent vulnerability, the at least one operation configured for:
    identifying at least one configuration associated with the at least one networked device, and
    associating the at least one networked device with at least one particular vulnerability, based on the identified at least one configuration and the first information from the at least one first data storage identifying the plurality of existent vulnerabilities, such that second information associated with the result is stored, the second information relating to the association between the at least one particular vulnerability to which the at least one networked device;
  causes to display, via at least one user interface, a plurality of techniques including a first technique for utilizing the intrusion prevention system for occurrence mitigation, a second technique for utilizing the firewall for occurrence mitigation;
  allows receipt of:
    user input causing selection of the first technique for utilizing the intrusion prevention system for occurrence mitigation, and
    user input causing selection of the second technique for utilizing the firewall for occurrence mitigation;
  based on the user input causing selection of the first technique for utilizing the intrusion prevention system for occurrence mitigation, automatically applies the first technique for utilizing the intrusion prevention system for occurrence mitigation;
  based on the user input causing selection of the second technique for utilizing the firewall for occurrence mitigation, automatically apply the second technique for utilizing the firewall for occurrence mitigation;
  causes identification of:
    in connection with the at least one networked device, a first occurrence including at least one first occurrence packet directed to the at least one networked device, and
    in connection with the at least one networked device, a second occurrence including at least one second occurrence packet directed to the at least one networked device;
  determines:
    that the first occurrence including the at least one first occurrence packet directed to the at least one networked device is capable of taking advantage of the at least one particular vulnerability associated with the at least one networked device;
    that the second occurrence including the at least one second occurrence packet directed to the at least one networked device is not capable of taking advantage of the at least one particular vulnerability associated with the at least one networked device; and
  causes a reaction to at least the first occurrence based on the determination that the first occurrence including the at least one first occurrence packet directed to the at least one networked device is capable of taking advantage of the at least one particular vulnerability associated with the at least one networked device.

7. The apparatus of claim 6, wherein the intrusion prevention system includes integrated intrusion prevention functionality for supporting the first technique and firewall functionality for supporting the second technique, such that the intrusion prevention functionality and the firewall functionality are both supported by a security component of the intrusion prevention system that in turn supports at least one aspect of the determination that the first occurrence including the at least one first occurrence packet directed to the at least one networked device is capable of taking advantage of the at least one particular vulnerability associated with the at least one networked device, the intrusion prevention system further including logic that receives the second information and utilizes the second information to conditionally cause the display of, as a function of an existence of one or more particular vulnerabilities, one or more of the plurality of techniques to allow selective utilization of the intrusion prevention functionality and the firewall functionality, so that only relevant techniques are displayed for selection to reduce false positives in connection with both the intrusion prevention functionality and the firewall functionality.

8. The apparatus of claim 6, wherein the intrusion prevention system includes integrated intrusion prevention functionality for supporting the first technique and firewall functionality for supporting the second technique, such that the intrusion prevention functionality and the firewall functionality are both supported by a security component of the intrusion prevention system that in turn supports at least one aspect of the determination that the first occurrence including the at least one first occurrence packet directed to the at least one networked device is capable of taking advantage of the at least one particular vulnerability associated with the at least one networked device, the intrusion prevention system further including logic that receives particular vulnerability information and utilizes the particular vulnerability information to relevantly cause the display of, as a function of one or more particular vulnerabilities identified utilizing the particular vulnerability information, multiple of the plurality of techniques to allow selective utilization of the intrusion prevention functionality and the firewall functionality.

9. The apparatus of claim 6, wherein the intrusion prevention system is configured such that different user selections are capable of being received for different devices, for allowing different techniques including the first technique and the second technique to be selectively applied to the different devices for different particular vulnerabilities, such that the different user selections are capable of resulting in: only the first technique being selectively applied to at least one first device, only the second technique being selectively applied to at least one second device, and both the first technique and the second technique being selectively applied to at least one third device.

10. The apparatus of claim 6, wherein the intrusion prevention system is configured such that the first technique is automatically applied utilizing a first communication, and the second technique is automatically applied utilizing a second communication; wherein the intrusion prevention system includes intrusion prevention functionality for supporting the first technique and firewall functionality for supporting the second technique, the intrusion prevention system further configured to receive the second information to conditionally cause display of, as a function of an existence of the at least one particular vulnerability, the plurality of techniques to allow selective utilization of the intrusion prevention functionality and the firewall functionality, so that only relevant techniques are caused to be displayed to reduce false positives in connection with both the intrusion prevention functionality and the firewall functionality; wherein the apparatus is further configured such that different user selections are capable of being received for different devices, for allowing different techniques including the first technique and the second technique to be selectively applied to the different devices for different particular vulnerabilities, such that the different user selections are capable of resulting in: only the first technique being selectively applied to at least one first device, only the second technique being selectively applied to at least one second device, and both the first technique and the second technique being selectively applied to at least one third device.

11. The apparatus of claim 6, wherein the intrusion prevention system is configured such that which of the networked devices have weaknesses is determined by directly querying a firmware or operating system thereof.

12. The apparatus of claim 1, wherein the apparatus is configured such that one or more of the plurality of techniques is capable of being identified based on an identification of an application.

13. The apparatus of claim 6, wherein the intrusion prevention system is configured such that at least one of:
    said result includes the second information;
    said at least one first data storage includes at least one first database;
    said at least one first data storage is a component of a network operations center (NOC) server;
    said first information is received from the at least one first data storage via at least one of: receiving at least one update therefrom; pulling at least one update therefrom, communicating therewith, or synchronizing therewith;
    said at least one operation includes a vulnerability scan operation;
    said at least one operation is automatic;
    said apparatus is configured to perform the at least one operation;
    said identifying the at least one configuration is automatic;
    said at least one particular vulnerability is one that may be attacked;
    said at least one particular vulnerability includes at least one actual vulnerability;
    said platform operates to eliminate false positives or false negatives;
    said platform operates to eliminate false positives and false negatives;
    said at least one particular vulnerability includes at least one of the existent vulnerabilities associated with the at least one networked device based on identified at least one configuration;
    said at least one configuration includes at least one of: service pack information, one or more elements contained in files including at least one of an *.ini or *.conf file, registry information, identification of an operating system, identification of a software version, or identification of software;
    said associating the at least one networked device with the at least one particular vulnerability includes at least one of: matching the identified at least one configuration with a guideline associated with at least one update, or cross-referencing an identifier with the configuration;
    said associating the at least one networked device with the at least one particular vulnerability includes determining that the at least one networked device is vulnerable to the at least one particular vulnerability;
    said associating the at least one networked device with the at least one particular vulnerability includes determining that the at least one networked device is actually vulnerable to the at least one particular vulnerability;
    said associating the at least one networked device with the at least one particular vulnerability indicates that the at least one networked device may be attacked;
    said associating the at least one networked device with the at least one particular vulnerability indicates that the at least one networked device may be attacked via the at least one particular vulnerability;
    said second information identifies the association;
    said second information identifies the at least one particular vulnerability;
    said second information is stored in at least one second storage;
    said first technique and second technique are of different types;
    at least one of said first or second techniques include at least one of remediation techniques, mitigation techniques, attack mitigation techniques, or vulnerability mitigation techniques;
    said occurrence mitigation includes at least one of removing the at least one particular vulnerability, occurrence prevention, or reducing an effect of a particular occurrence;
    said first technique for utilizing the intrusion prevention system for occurrence mitigation and the second technique for utilizing the firewall for occurrence mitigation are displayed via the same user interface;
    said first technique for utilizing the intrusion prevention system for occurrence mitigation and the second technique for utilizing the firewall for occurrence mitigation are displayed via different user interface elements;
    said first technique for utilizing the intrusion prevention system for occurrence mitigation, and the second technique for utilizing the firewall for occurrence mitigation, are displayed via the at least one user interface utilizing at least one of options or graphical user interface elements;
    said first technique for utilizing the intrusion prevention system for occurrence mitigation results in the first technique being automatically applied at a later time;
    at least one of said first or second techniques, after the user selection thereof, is automatically applied at a later time;
    said user input causing selection of the first technique for utilizing the intrusion prevention system for occurrence mitigation results in the first technique being automatically applied at a later time;
    said user input causing selection of the first technique and the user input causing selection of the second technique including separate user inputs;
    said automatic application of the first technique puts a policy in place for being utilized at a later time;
    said automatic application of the second technique puts a policy in place for being utilized at a later time;
    at least one of said first or second techniques, after the automatic application thereof, is utilized at a later time for the occurrence mitigation;
    said user input selecting the first technique is received utilizing the at least one user interface;
    said user input causing selection of the first technique for utilizing the intrusion prevention system for occurrence mitigation specifically identifies the first technique;

said user input causing selection of the second technique for utilizing the firewall for occurrence mitigation specifically identifies the second technique;

said user input causing selection of the first technique for utilizing the intrusion prevention system for occurrence mitigation is received in response to the display of the first technique;

said user input causing selection of the second technique for utilizing the firewall for occurrence mitigation is received in connection with the display of the second technique;

said first technique for utilizing the intrusion prevention system for occurrence mitigation involves an intrusion prevention system action that prevents an attack;

said second technique for utilizing the firewall for occurrence mitigation includes a firewall action that blocks an attack;

said first technique for utilizing the intrusion prevention system for occurrence mitigation utilizes the intrusion prevention system to deploy a patch utilizing an update component;

said second technique for utilizing the firewall for occurrence mitigation utilizes the firewall to deploy a patch utilizing an update component;

said automatic application of the first technique for utilizing the intrusion prevention system for occurrence mitigation includes the determination that the first occurrence including the at least one first occurrence packet directed to the at least one networked device is capable of taking advantage of the at least one of the particular vulnerability associated with the at least one networked device;

said automatic application of the first technique for utilizing the intrusion prevention system for occurrence mitigation results in the determination that the first occurrence including the at least one first occurrence packet directed to the at least one networked device is capable of taking advantage of the at least one of the particular vulnerability associated with the at least one networked device;

said automatic application of the first technique for utilizing the intrusion prevention system for occurrence mitigation results from the determination that the first occurrence including the at least one first occurrence packet directed to the at least one networked device is capable of taking advantage of the at least one of the particular vulnerability the at least one networked device;

said intrusion prevention system and the firewall are separate;

said intrusion prevention system and the firewall are integrated on the same single platform;

said first occurrence includes an attack;

said first occurrence includes an incident and said second occurrence includes an event;

said determination that the first occurrence including the at least one first occurrence packet directed to the at least one networked device is capable of taking advantage of the at least one of the particular vulnerability associated with the at least one networked device, is carried out utilizing at least one of vulnerability identifiers, profiles, threat information, or the second information;

said reaction includes reporting of the first occurrence;

said reaction includes display of at least one of the first technique or the second technique;

said reaction includes application of at least one of the first technique or the second technique;

said reaction includes utilizes at of at least one of the first technique or the second technique;

said reaction is carried out utilizing a log; or said at least one first occurrence packet of the first occurrence is prevented by terminating or dropping the same.

* * * * *

(12) EX PARTE REEXAMINATION CERTIFICATE (11950th)
United States Patent
Oliphant et al.

(10) Number: US 10,547,631 C1
(45) Certificate Issued: *Dec. 1, 2021

(54) REAL-TIME VULNERABILITY MONITORING

(71) Applicant: SecurityProfiling, LLC, Woodville, TX (US)

(72) Inventors: Brett M. Oliphant, Plano, TX (US); John P. Blignaut, West Lafayette, IN (US)

(73) Assignee: SECURITYPROFILING, LLC, Garland, TX (US)

Reexamination Request:
No. 90/014,773, Jul. 12, 2021

Reexamination Certificate for:
Patent No.: 10,547,631
Issued: Jan. 28, 2020
Appl. No.: 15/608,983
Filed: May 30, 2017

(*) Notice: This patent is subject to a terminal disclaimer.

Related U.S. Application Data

(63) Continuation of application No. 14/834,102, filed on Aug. 24, 2015, now Pat. No. 10,154,055, which is a continuation of application No. 14/138,014, filed on Dec. 21, 2013, now Pat. No. 9,117,069, which is a continuation of application No. 10/882,852, filed on Jul. 1, 2004, now abandoned.

(60) Provisional application No. 60/484,085, filed on Jul. 1, 2003.

(51) Int. Cl.
*H04L 29/06* (2006.01)
*G06F 21/50* (2013.01)

(52) U.S. Cl.
CPC ......... *H04L 63/1416* (2013.01); *G06F 21/50* (2013.01); *H04L 63/1433* (2013.01); *H04L 63/20* (2013.01); *H04L 63/0263* (2013.01)

(58) Field of Classification Search
None
See application file for complete search history.

(56) References Cited

To view the complete listing of prior art documents cited during the proceeding for Reexamination Control Number 90/014,773, please refer to the USPTO's public Patent Application Information Retrieval (PAIR) system under the Display References tab.

*Primary Examiner* — Matthew E Heneghan

(57) ABSTRACT

An apparatus is provided including at least one platform; an intrusion prevention system configured to communicative couple with the at least one platform; a firewall configured to communicative couple with the at least one platform; at least one first data storage configured to communicative couple with the at least one platform; and at least one second data storage configured to communicative couple with the at least one platform. The at least one platform is configured to perform a plurality of operations that collective protect one or more networked devices, by causing a reporting of at least a first occurrence based on a determination that the first occurrence includes at least one first occurrence packet that is capable of taking advantage of at least one of the actual vulnerability to which the at least one networked device is actually vulnerable.

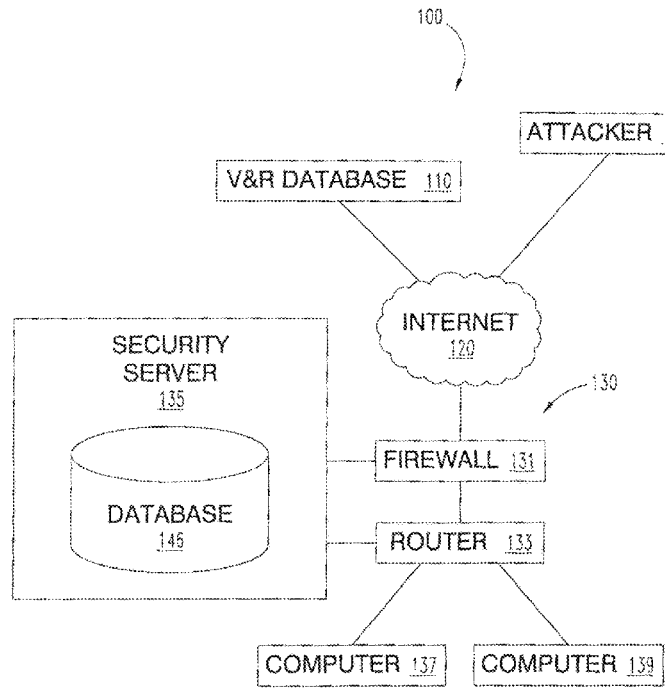

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1 and 6 is confirmed.

Claims 2-5 and 7-13 were not reexamined.

\* \* \* \* \*